United States Patent
Chino et al.

(10) Patent No.: US 10,793,697 B2
(45) Date of Patent: Oct. 6, 2020

(54) THERMOPLASTIC ELASTOMER COMPOSITION AND METHOD FOR PRODUCING THE SAME

(71) Applicant: ENEOS CORPORATION, Chiyoda-ku, Tokyo (JP)

(72) Inventors: Keisuke Chino, Tokyo (JP); Hiroaki Suzuki, Tokyo (JP); Tatsuo Yamaguchi, Tokyo (JP); Ryuichi Ueno, Tokyo (JP); Tsuyoshi Yamaguchi, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 15/562,743

(22) PCT Filed: Mar. 4, 2016

(86) PCT No.: PCT/JP2016/056831
§ 371 (c)(1),
(2) Date: Sep. 28, 2017

(87) PCT Pub. No.: WO2016/158205
PCT Pub. Date: Oct. 6, 2016

(65) Prior Publication Data
US 2018/0079887 A1   Mar. 22, 2018

(30) Foreign Application Priority Data

Mar. 31, 2015   (JP) ................. 2015-073798

(51) Int. Cl.
| | | |
|---|---|---|
| C08K 3/34 | (2006.01) | |
| C08J 3/20 | (2006.01) | |
| C08F 8/30 | (2006.01) | |
| C08F 8/46 | (2006.01) | |
| C08F 210/02 | (2006.01) | |
| C08L 101/02 | (2006.01) | |
| C08L 51/06 | (2006.01) | |
| C08J 5/18 | (2006.01) | |
| C08J 3/00 | (2006.01) | |
| C08K 9/04 | (2006.01) | |

(52) U.S. Cl.
CPC ............... C08K 3/346 (2013.01); C08F 8/30 (2013.01); C08F 8/46 (2013.01); C08F 210/02 (2013.01); C08J 3/005 (2013.01); C08J 3/20 (2013.01); C08J 3/203 (2013.01); C08J 5/18 (2013.01); C08K 9/04 (2013.01); C08L 51/06 (2013.01); C08L 101/02 (2013.01); *C08J 2323/08* (2013.01); *C08J 2351/06* (2013.01); *C08L 2205/025* (2013.01); *C08L 2207/04* (2013.01)

(58) Field of Classification Search
CPC ................. C08K 3/34; C08J 3/20; C08F 8/30
USPC ........................................................ 524/445
See application file for complete search history.

(56) References Cited

U.S. PATENT DOCUMENTS

| | | | | |
|---|---|---|---|---|
| 2003/0191224 A1* | 10/2003 | Maruyama | ............... | C08K 9/04 524/445 |
| 2006/0094829 A1 | 5/2006 | Chino et al. | | |
| 2006/0213605 A1* | 9/2006 | Kakubo | ............. | B29C 65/5057 156/110.1 |
| 2008/0103287 A1* | 5/2008 | Chino | ..................... | C08C 19/22 528/421 |
| 2008/0319119 A1 | 12/2008 | Waddell et al. | | |
| 2009/0165915 A1 | 7/2009 | Galimberti et al. | | |
| 2010/0240809 A1* | 9/2010 | Yamada | ............... | C08L 23/0815 524/81 |

FOREIGN PATENT DOCUMENTS

| | | |
|---|---|---|
| CN | 101326238 A | 12/2008 |
| CN | 101486847 A | 7/2009 |
| CN | 101855290 A | 10/2010 |
| EP | 3351595 A1 | 7/2018 |
| JP | 2004-307576 A | 11/2004 |
| JP | 2006-131663 A | 5/2006 |
| JP | 2006-232983 A | 9/2006 |
| JP | 2008-88194 A | 4/2008 |
| JP | 2009-520049 A | 5/2009 |
| JP | 2011-144364 A | 7/2011 |

OTHER PUBLICATIONS

Oct. 3, 3017 International Preliminary Report on Patentability issued in International Patent Application No. PCT/JP2016/056831.
Apr. 5, 2016 Search Report issued in International Patent Application No. PCT/JP2016/056831.

(Continued)

*Primary Examiner* — Deve V Hall
(74) *Attorney, Agent, or Firm* — Oliff PLC

(57) ABSTRACT

A thermoplastic elastomer composition having at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; and a clay, wherein an amount of the clay contained is 20 parts by mass or less relative to 100 parts by mass of the elastomer component.

15 Claims, 3 Drawing Sheets

(56) References Cited

OTHER PUBLICATIONS

Nov. 9, 2018 Search Report issued in European Patent Application No. 16772089.5.
Apr. 3, 2019 Office Action issued in Chinese Patent Application No. 201680019579.3.
Sep. 25, 2015 Office Action issued in Japanese Patent Application No. 2015-073798.
Dec. 16, 2019 Office Action issued in Chinese Patent Application No. 201680019579.3.

* cited by examiner

THERMOPLASTIC ELASTOMER COMPOSITION AND METHOD FOR PRODUCING THE SAME

TECHNICAL FIELD

The present invention relates to a thermoplastic elastomer composition, and a method for producing the same.

BACKGROUND ART

Recently, it has been desirable to reuse used materials from the standpoints of environmental protection, resource saving, and the like. Cross-linked rubbers (vulcanized rubbers) have stable three-dimensional network structures in which a polymer substance and a cross-linking agent (a vulcanizing agent) are covalently bonded to each other. Hence, the cross-linked rubbers exhibit very high strength, but are difficult to reshape because of the cross-linking by the strong covalent bonds. On the other hand, thermoplastic elastomers utilize physical cross-linking, and can be easily shaped by being melt under heating, without requiring complicated vulcanizing and shaping steps including preliminary shaping and the like.

As a typical example of the thermoplastic elastomers, a thermoplastic elastomer is known which comprises a resin component and a cross-linking rubber component, wherein plastic deformation is prevented at normal temperature by the crystallization of the resin component, whereas plastic deformation is allowed at elevated temperature because of the softening or melting of the resin component. However, since such a thermoplastic elastomer contains a resin component, the rubber elasticity is easily lowered, and the mechanical strength such as tensile strength or the like is not necessarily sufficient.

Under such a circumstance, thermoplastic elastomer materials excellent in physical properties such as mechanical strengths, especially, tensile strength have been developed. For example, Japanese Unexamined Patent Application Publication No. 2006-131663 (PTL 1) discloses a thermoplastic elastomer comprising an elastomeric polymer which has a side chain containing a hydrogen-bond cross-linkable moiety having a carbonyl-containing group and a nitrogen-containing heterocycle and another side chain containing a covalent-bond cross-linking moiety, and which has a glass-transition point of 25° C. or below. The thermoplastic elastomer described in Patent Document 1 has a sufficiently high level of tensile strength, and is highly valued in industrial application and in environmental protection.

CITATION LIST

Patent Literature

[PTL 1] Japanese Unexamined Patent Application Publication No. 2006-131663

SUMMARY OF INVENTION

Technical Problem

In the field of thermoplastic elastomers, however, there has been a demand for development of a thermoplastic elastomer composition which has a higher level of tensile stress than the thermoplastic elastomer described in Patent Document 1, and which can have a sufficiently high level of heat resistance based on the 5% weight loss temperature and the like.

The present invention has been made in view of the conventional techniques, and an object of the present invention is to provide a thermoplastic elastomer composition which can have a sufficiently high level of tensile stress and a sufficiently high heat resistance, and a method for producing the same.

Solution to Problem

The present inventors have conducted intensive study to achieve the above-described object, and consequently have found that a thermoplastic elastomer composition can have a sufficiently high level of tensile stress and a sufficiently high heat resistance when the thermoplastic elastomer composition comprises: at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; and a clay, wherein an amount of the clay contained is 20 parts by mass or less relative to 100 parts by mass of the elastomer component. This finding has led to the completion of the present invention.

Specifically, a thermoplastic elastomer composition of the present invention comprises at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; and a clay, wherein an amount of the clay contained is 20 parts by mass or less relative to 100 parts by mass of the elastomer component.

In the thermoplastic elastomer composition of the present invention, the hydrogen-bond cross-linkable moiety contained in the side chain of the elastomeric polymer (B) is preferably a hydrogen-bond cross-linkable moiety having a carbonyl-containing group and/or a nitrogen-containing heterocycle, and is more preferably a hydrogen-bond cross-linkable moiety having a carbonyl-containing group and a nitrogen-containing heterocycle.

In addition, in the thermoplastic elastomer composition of the present invention, the clay is preferably at least one selected from the group consisting of clays mainly containing silicon and magnesium, and organically modified clays, and is more preferably an organically modified clay.

In addition, in the thermoplastic elastomer composition of the present invention, a cross-linkage at the covalent-bond cross-linking moiety contained in the side chain of the elastomeric polymer (B) is preferably formed by at least one bond selected from the group consisting of amide, ester, lactone, urethane, ether, thiourethane, and thioether.

In addition, in the thermoplastic elastomer composition of the present invention, the hydrogen-bond cross-linkable moiety of the side chain (a) preferably contains a structural portion represented by the following general formula (1):

[Chem. 1]

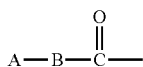
(1)

[in the formula (1), A is a nitrogen-containing heterocycle, and B is a single bond; an oxygen atom, an amino group NR' (where R' is a hydrogen atom or an alkyl group having 1 to 10 carbon atoms), a sulfur atom; or an organic group optionally containing any of the atoms or groups], and more preferably contains a structural portion represented by the following general formula (101):

[Chem. 2]

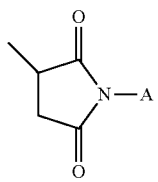
(101)

[in the formula (101), A is a nitrogen-containing heterocycle].

Moreover, in the thermoplastic elastomer composition of the present invention, the nitrogen-containing heterocycle is preferably a 5-membered ring and/or a 6-membered ring. In addition, in the thermoplastic elastomer composition of the present invention, the nitrogen-containing heterocycle is preferably at least one selected from a triazole ring, a thiadiazole ring, a pyridine ring, an imidazole ring, a triazine ring, an isocyanurate ring, and a hydantoin ring.

In addition, in the thermoplastic elastomer composition of the present invention, a cross-linkage at the covalent-bond cross-linking moiety contained in the side chain of the elastomeric polymer (B) is preferably formed by a reaction of a cyclic acid anhydride group with a hydroxy group or an amino group and/or an imino group.

In addition, in the thermoplastic elastomer composition of the present invention, main chains of the elastomeric polymers (A) and (B) each preferably comprise at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers.

Moreover, in the thermoplastic elastomer composition of the present invention, the elastomer component is preferably at least one selected from the group consisting of reaction products of a maleic anhydride-modified elastomeric polymer with at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, and polyether polyols, and the clay is preferably an organically modified clay.

Meanwhile, a method for producing a thermoplastic elastomer composition of the present invention comprises:

a first step of mixing a clay into an elastomeric polymer having a cyclic acid anhydride group in a side chain to obtain a mixture; and a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining the thermoplastic elastomer composition, wherein the thermoplastic elastomer composition comprises:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; and a clay, and in the first step, the clay is mixed into the elastomeric polymer having a cyclic acid anhydride group in a side chain at such a ratio that the amount of the clay contained in the thermoplastic elastomer composition is 20 parts by mass or less relative to 100 parts by mass of the elastomer component.

In addition, in the method for producing a thermoplastic elastomer composition of the present invention, the elastomeric polymer having a cyclic acid anhydride group in a side chain is preferably a maleic anhydride-modified elastomeric polymer.

Moreover, in the method for producing a thermoplastic elastomer composition of the present invention, it is preferable to use, as the compound (I) and/or (II), a compound that forms both a hydrogen-bond cross-linkable moiety and a covalent-bond cross-linking moiety upon a reaction with the cyclic acid anhydride group. When such a compound that forms both a hydrogen-bond cross-linkable moiety and a covalent-bond cross-linking moiety is used, the reaction with an elastomeric polymer having a cyclic acid anhydride group in a side chain makes it possible to simultaneously form both the hydrogen-bond cross-linkable moiety and the covalent-bond cross-linking moiety more efficiently, so that the elastomeric polymer (B) tends to be formed efficiently.

In addition, in the method for producing a thermoplastic elastomer composition of the present invention, it is preferable that the elastomeric polymer having a cyclic acid anhydride group in a side chain be a maleic anhydride-modified elastomeric polymer, the raw material compound be at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, and polyether polyols, the elastomer component be at least one selected from the group consisting of reaction products of the maleic anhydride-modified elastomeric polymer with the raw material compound, and the clay be an organically modified clay.

Note that although it is not exactly clear why the above-described object is achieved by the thermoplastic elastomer composition of the present invention, the present inventors speculate as follows. Specifically, first, the clay is contained together with the elastomer component in the present invention. The clay results in plane cross-linking of the elastomer component, so that the tensile stress is sufficiently improved. This point is discussed more specifically. The elastomer component comprises an elastomeric polymer containing a side chain having at least a hydrogen-bond cross-linkable moiety, and a hydrogen bond at the hydrogen-bond cross-linkable moiety of the side chain interacts with the clay. For this reason, the clay is uniformly dispersed in the elastomer component in the present invention. Then, the thus dispersed clay and the hydrogen-bond cross-linkable moiety further interact with each other by further formation of a hydrogen bond therebetween, or the like. The elastomer component is thus plane cross-linked by utilizing the surface of the clay. The present inventors speculate that the formation of the plane cross-linking then makes it possible to suppress the stress concentration at cross-linking points, enabling expression of an extremely high level of tensile stress, and enabling expression of sufficiently high heat resistance, which originates from the structure. Especially when the hydrogen-bond cross-linkable moiety is "a hydrogen-bond cross-linkable moiety having a carbonyl-containing group and/or a nitrogen-containing heterocycle (more preferably, a hydrogen-bond cross-linkable moiety having a carbonyl-containing group and a nitrogen-containing heterocycle)" as described for the side chain (a), hydrogen bonds can be formed at a larger number of points. In addition to hydrogen bonds between elastomer molecules at a larger number of points, hydrogen bonds are also formed with the clay at a larger number of points. Hence, plane cross-linking can be formed more strongly, and higher effects tend to be obtained in terms of tensile strength and heat resistance. In addition, in the present invention, an amount of the clay contained is 20 parts by mass or less relative to 100 parts by mass of the elastomer component. The present inventors speculate that since the plane cross-linking can be formed sufficiently even with such a content ratio, because the clay is dispersed sufficiently uniformly as described above (note that a case where the ratio of the clay dispersed as single layers is increased can be regarded as a more preferred mode, because more plane cross-linkages tend to be formed in the elastomer), and this enables a sufficiently high level of tensile stress and a sufficiently high heat resistance to be exhibited. In addition, in the present invention, it is also possible to provide flowability (formability), for example, by the hydrogen bonds formed by the hydrogen-bond cross-linkable moieties in the side chains, in addition to the sufficiently high level of tensile stress and a sufficiently high heat resistance. Moreover, a higher mechanical strength, sufficient self-repairing properties, and the like can also be expressed depending on its constitution. Moreover, the present inventors speculate that, in the present invention, the resistance to compression set can also be expressed at a higher level, when an elastomer component (elastomeric polymer (B) or the like) containing a covalent-bond cross-linking moiety in a side chain is contained, since the side chain containing the covalent-bond cross-linking moiety can inhibit the flowability of rubber molecule chains.

Note that, in the present invention, at least one of the elastomeric polymers (A) and (B) each having a hydrogen-bond cross-linking moiety in a side chain as described above is used as the elastomer component. When, however, such an elastomeric polymer is not used, but a different elastomer component is used, it is not possible to obtain a sufficiently high level of tensile stress or a sufficiently high level of heat resistance as can be achieved by the present invention, even when the different elastomer component is used in combination with a clay. In this respect, the present inventors speculate as follows. Specifically, first, ordinary thermoplastic elastomers can be roughly classified into two types: a type utilizing pseudo-cross-linking based on physical interaction between molecular chains of a polymer (a type in which weak bonds are physically formed by interaction based on intermolecular force of a polymer and the like), and a type in which a rubber is dispersed in a matrix of a thermoplastic resin. Representative ones of thermoplastic elastomers of the type utilizing the pseudo-cross-linking include block polymers such as hydrogenated styrene-based thermoplastic elastomers (SEBS), and polymers having a soft segment and a hard segment such as a urethane elastomer. Here, SEBS is described, for example. SEBS expresses mechanical strength based on interaction of styrene portions. For this reason, when a filler such as a clay is incorporated directly into SEBS without introducing a side chain, as described above, the interaction of styrene portions is inhibited, and the mechanical strength of the polymer rather decreases, making the polymer unsuitable for practical use. When a thermoplastic elastomer of the type utilizing pseudo-cross-linking is used in combination with a clay, the formation of the pseudo-cross-linking is inhibited in the composition, and the mechanical strength (tensile stress or the like) of the composition decreases, as described above. On the other hand, a thermoplastic elastomer of the type in which a rubber is dispersed in a matrix of a thermoplastic resin, the filler such as a clay is introduced only in the matrix phase, as is apparent from the constitution of the thermoplastic elastomer, and it is difficult to uniformly incorporate the clay all over the composition. Specifically, simple introduction of a filler into a thermoplastic elastomer of the type in which a rubber is dispersed in a matrix of a thermoplastic resin results in a state where the filler is introduced at high concentrations in some portions, while the filler is not introduced at all in other portions. Hence, the difference in concentration of the filler causes a difference in hardness, so that the mechanical strength decreases. For this reason, even when a clay is simply introduced into a thermoplastic elastomer of the type in which a rubber is dispersed in a matrix of a thermoplastic resin, the mechanical strengths (tensile stress and the like) of the composition decrease after all, and especially the tearing strength and the tensile stress decrease. The present inventors speculate that, from such a viewpoint, when the elastomeric polymer (A) or (B) is not used as the elastomer component, not only the interaction with the clay cannot be created, but also the presence of the clay rather decreases the mechanical strength, so that a sufficiently high level of tensile stress or heat resistance cannot be obtained.

As described above, in the present invention, the use of at least one selected from the group consisting of the elastomeric polymers (A) and (B) as an elastomer component and a predetermined amount of the clay in combination therewith enables the exhibition of a sufficiently high level of tensile stress and a sufficiently high heat resistance.

Advantageous Effects of Invention

According to the present invention, it is possible to provide a thermoplastic elastomer composition which can have a sufficiently high level of tensile stress and a sufficiently high heat resistance, and a method for producing the same.

DESCRIPTION OF EMBODIMENTS

Figure 1:
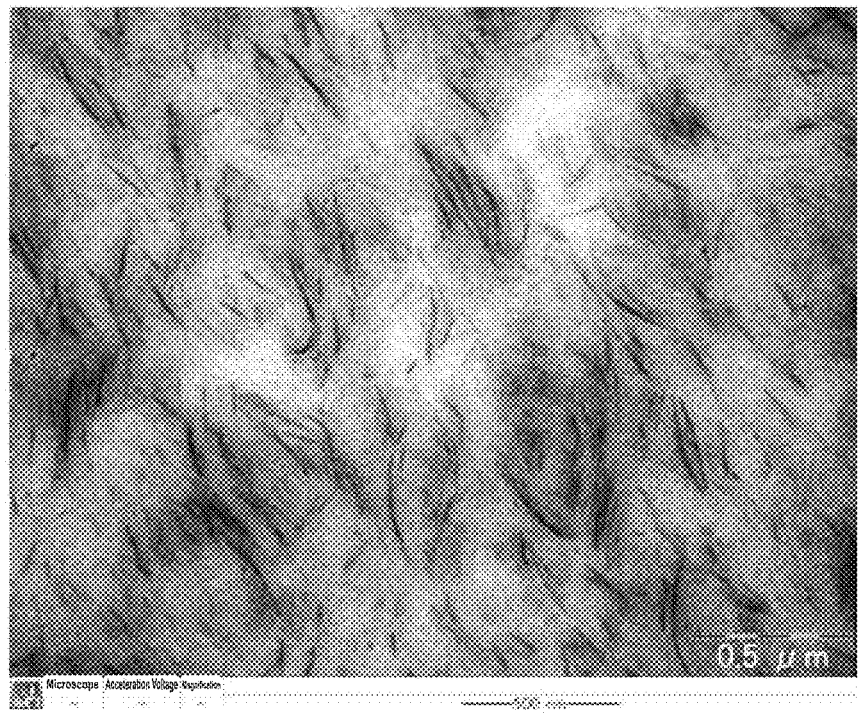
FIG. 1 is an electron micrograph (TEM photograph) showing a surface state of a thermoplastic elastomer composition obtained in Example 1.

Hereinafter, the present invention will be described in detail based on preferred embodiments thereof.

[Thermoplastic Elastomer Composition]

A thermoplastic elastomer composition of the present invention comprises:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; and a clay, wherein an amount of the clay contained is 20 parts by mass or less relative to 100 parts by mass of the elastomer component. First, components contained in the thermoplastic elastomer composition of the present invention are described separately here.

(Elastomer Component)

The elastomer component is at least one selected from the group consisting of the above-described elastomeric polymers (A) and (B). In each of the elastomeric polymers (A) and (B), the "side chain" refers to a side chain and a terminal of the elastomeric polymer. In addition, "a side chain (a) containing a hydrogen-bond cross-linkable moiety having a carbonyl-containing group and/or a nitrogen-containing heterocycle" means that a carbonyl-containing group and/or a nitrogen-containing heterocycle (more preferably a carbonyl-containing group and a nitrogen-containing heterocycle) serving as a hydrogen-bond cross-linkable moiety is chemically stably bonded (covalently bonded) to an atom (generally, a carbon atom) forming a main chain of the elastomeric polymer. In addition, the "containing a hydrogen-bond cross-linkable moiety and a covalent-bond cross-linking moiety in a side chain" is a concept including a case where side chains of both a side chain having a hydrogen-bond cross-linkable moiety (hereinafter, sometimes referred to as "side chain (a')" for convenience) and a side chain having a covalent-bond cross-linking moiety (hereinafter, sometimes referred to as "side chain (b)" for convenience) are contained, so that the side chains of the polymer contain both a hydrogen-bond cross-linkable moiety and a covalent-bond cross-linking moiety, as well as a case where a side chain having both a hydrogen-bond cross-linkable moiety and a covalent-bond cross-linking moiety (a single side chain containing both a hydrogen-bond cross-linkable moiety and a covalent-bond cross-linking moiety therein: hereinafter, such a side chain is sometimes referred to as "side chain (c)" for convenience) is contained, so that the side chain of the polymer contain both a hydrogen-bond cross-linkable moiety and a covalent-bond cross-linking moiety.

The main chain (polymer forming a main chain portion) of each of the elastomeric polymers (A) and (B) may be generally a known natural polymer or a synthetic polymer, wherein the polymer has a glass-transition point of room temperature (25° C.) or lower (the main chain may be a so-called elastomer), and is not particularly limited. Accordingly, the elastomeric polymers (A) and (B) may be, for example, those which have an elastomeric polymer being a natural polymer, a synthetic polymer, or the like and having a glass-transition point of room temperature (25° C.) or lower as a main chain, and which contain a side chain (a) containing a hydrogen-bond cross-linkable moiety having a carbonyl-containing group and/or a nitrogen-containing heterocycle; those which have an elastomeric polymer being a natural polymer, a synthetic polymer, or the like and having a glass-transition point of room temperature (25° C.) or lower as a main chain, and which contain a side chain (a') having a hydrogen-bond cross-linkable moiety and a side chain (b) having a covalent-bond cross-linking moiety as side chains; those which have an elastomeric polymer being a natural polymer, a synthetic polymer, or the like and having a glass-transition point of room temperature (25° C.) or lower as a main chain, and which contain a side chain (c) containing both a hydrogen-bond cross-linkable moiety and a covalent-bond cross-linking moiety; or the like.

Examples of the main chains (polymers forming main chain portions) of these elastomeric polymers (A) and (B) include diene-based rubbers such as natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), and ethylene-propylene-diene rubber (EPDM), as well as hydrogenated products thereof; olefin-based rubbers such as ethylene-propylene rubber (EPM), ethylene-acrylic rubber (AEM), ethylene-butene rubber (EBM), chlorosulfonated polyethylene, acrylic rubber, fluororubber, polyethylene rubber, and polypropylene rubber; epichlorohydrin rubber; polysulfide rubbers; silicone rubbers; urethane rubbers; and the like.

The main chains of the elastomeric polymers (A) and (B) (polymers forming main chain portions) may also be those formed of an elastomeric polymer containing a resin component, and examples thereof include optionally hydrogenated polystyrene-based elastomeric polymers (for example, SBS, SIS, SEBS, and the like), polyolefin-based elastomeric polymers, polyvinyl chloride-based elastomeric polymers, polyurethane-based elastomeric polymers, polyester-based elastomeric polymers, polyamide-based elastomeric polymers, and the like.

The main chains of the elastomeric polymers (A) and (B) are each preferably at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers. In addition, the main chains of the elastomeric polymers (A) and (B) are each preferably a hydrogenated product of a diene-based rubber or an olefin-based rubber from the viewpoint of the absence of a double bond susceptible to ageing, and preferably a diene-based rubber from the viewpoints of the low cost and the high reactivity (the presence of many double bonds capable of an ene reaction with a compound such as maleic anhydride).

Moreover, the elastomeric polymers (A) and (B) may be liquid or solid, and the molecular weights thereof are not particularly limited. The molecular weights may be selected, as appropriate, according to the application for which the thermoplastic elastomer composition of the present invention is used, a required physical property, or the like.

When the flowability upon heating (de-cross-linking, or the like) of the thermoplastic elastomer composition of the present invention is important, the above-described elastomeric polymers (A) and (B) are preferably liquid. For example, when the main chain portion is a diene-based rubber such as isoprene rubber or butadiene rubber, the weight average molecular weight of the main chain portion is preferably 1,000 to 100,000 and is particularly preferably about 1,000 to 50,000 to make the elastomeric polymers (A) and (B) liquid.

On the other hand, when the strength of the thermoplastic elastomer composition of the present invention is important, the elastomeric polymers (A) and (B) are preferably solid. For example, when the main chain portion is a diene-based rubber such as isoprene rubber or butadiene rubber, the weight average molecular weight of the main chain portion is preferably 100,000 or higher, and particularly preferably about 500,000 to 1,500,000 to make the elastomeric polymers (A) and (B) solid.

The weight average molecular weight is a weight average molecular weight (in terms of polystyrene) measured by gel permeation chromatography (GPC). It is preferable to use tetrahydrofuran (THF) as a solvent for the measurement.

In the thermoplastic elastomer composition of the present invention, a mixture of two or more of the elastomeric polymers (A) and (B) can be used. In this case, the mixing ratio of the elastomeric polymers can be any according to the application for which the thermoplastic elastomer composition of the present invention is used, a required physical property, or the like.

In addition, the glass-transition points of the elastomeric polymers (A) and (B) are 25° C. or below as mentioned above. This is because when the glass-transition points of the elastomeric polymers are within this range, the thermoplastic elastomer composition of the present invention exhibits rubber-like elasticity at room temperature. Meanwhile, the "glass-transition point" in the present invention is a glass-transition point measured by differential scanning calorimetry (DSC). For the measurement, the rate of temperature rise is preferably 10° C./min.

The main chains of the elastomeric polymers (A) and (B) are preferably diene-based rubbers such as natural rubber (NR), isoprene rubber (IR), butadiene rubber (BR), 1,2-butadiene rubber, styrene-butadiene rubber (SBR), ethylene-propylene-diene rubber (EPDM), or butyl rubber (IIR); or olefin-based rubbers such as ethylene-propylene rubber (EPM), ethylene-acrylic rubber (AEM), or ethylene-butene rubber (EBM), because the resultant elastomeric polymers (A) and (B) have glass-transition points of 25° C. or below, and a formed article made of the obtained thermoplastic elastomer composition shows rubber-like elasticity at room temperature (25° C.). In addition, when an olefin-based rubber is used as the main chain of each of the elastomeric polymers (A) and (B), the obtained thermoplastic elastomer composition tends to have an improved tensile strength, and degradation of the composition tends to be suppressed more sufficiently because of the absence of double bonds.

The bound styrene content of the styrene-butadiene rubber (SBR) which can be used as the elastomeric polymers (A) and (B), the hydrogenation ratio of the hydrogenated elastomeric polymer which can be used as the elastomeric polymers (A) and (B), and the like are not particularly limited, and can be adjusted to any ratio according to the application for which the thermoplastic elastomer composition of the present invention is used, a physical property required for the composition, or the like.

In addition, when ethylene-propylene-diene rubber (EPDM), ethylene-acrylic rubber (AEM), ethylene-propylene rubber (EPM), or ethylene-butene rubber (EBM) is used as the main chain of the above-described elastomeric polymer (A) or (B), the ethylene content therein is preferably 10 to 90% by mole, and more preferably 30 to 90% by mole. The ethylene content within this range is preferable, because a thermoplastic elastomer (composition) formed therefrom is excellent in compression set and mechanical strengths, especially, tensile strength.

In addition, as described above, the above-described elastomeric polymers (A) and (B) have, as a side chain, at least one of a side chain (a) containing a hydrogen-bond cross-linkable moiety having a carbonyl-containing group and/or a nitrogen-containing heterocycle; a side chain (a') containing a hydrogen-bond cross-linkable moiety and a side chain (b) containing a covalent-bond cross-linking moiety; and a side chain (c) containing a hydrogen-bond cross-linkable moiety and a covalent-bond cross-linking moiety. Note that, in the present invention, the side chain (c) can also be regarded as a side chain functioning as a side chain (a') and also as a side chain (b). Each of the side chains is described below.

<Side Chain (a'): Side Chain Containing Hydrogen-Bond Cross-Linkable Moiety>

The side chain (a') containing a hydrogen-bond cross-linkable moiety may be any, and the structure thereof is not particularly limited, as long as the side chain has a group that can form a cross-linkage by a hydrogen bond (for example, a hydroxy group, a hydrogen-bond cross-linkable moiety contained in the side chain (a) described later, or the like), and forms a hydrogen bond on the basis of the group. Here, the hydrogen-bond cross-linkable moiety is a moiety through which polymer molecules (elastomer molecules) are cross-linked by a hydrogen bond. Note that the cross-linkage by a hydrogen bond is formed only when there are a hydrogen acceptor (a group containing an atom containing lone pair electrons, or the like) and a hydrogen donor (a group having a hydrogen atom covalently bonded to an atom having a high electronegativity, or the like). Hence, when both a hydrogen acceptor and a hydrogen donor are not present in side chains of elastomer molecules, no cross-linkage by a hydrogen bond is formed. For this reason, only when both a hydrogen acceptor and a hydrogen donor are present in side chains of elastomer molecules, a hydrogen-bond cross-linkable moiety can be considered to be present in the system. Note that, in the present invention, if both a portion that can functions as a hydrogen acceptor (for example, a carbonyl group or the like) and a portion that can functions as a hydrogen donor (for example, a hydroxy group or the like) are present in side chains of elastomer molecules, the portion that can functions as a hydrogen acceptor and the portion that can functions as a donor of the side chains are considered to be hydrogen-bond cross-linkable moieties.

The hydrogen-bond cross-linkable moiety in such a side chain (a') is preferably a hydrogen-bond cross-linkable moiety having a carbonyl-containing group and/or a nitrogen-containing heterocycle (a hydrogen-bond cross-linkable moiety contained in the side chain (a)), which will be described below, from the viewpoints of the formation of a stronger hydrogen bond and the like. Specifically, the side chain (a') is more preferably the side chain (a) described later. Moreover, from the same viewpoints, the hydrogen-bond cross-linkable moiety in the side chain (a') is more preferably a hydrogen-bond cross-linkable moiety having a carbonyl-containing group and a nitrogen-containing heterocycle.

<Side Chain (a): Side Chain Containing Hydrogen-Bond Cross-Linkable Moiety Having Carbonyl-Containing Group and/or Nitrogen-Containing Heterocycle>

The side chain (a) containing a hydrogen-bond cross-linkable moiety having a carbonyl-containing group and/or a nitrogen-containing heterocycle may be any, as long as the side chain (a) has a carbonyl-containing group and/or a nitrogen-containing heterocycle, and the other aspect of the structure are not particularly limited. The hydrogen-bond cross-linkable moiety more preferably has a carbonyl-containing group and a nitrogen-containing heterocycle.

The carbonyl-containing group is not particularly limited, as long as the group contains a carbonyl group. Specific examples thereof include amide, ester, imide, carboxy group, carbonyl group, and the like. The carbonyl-containing group may be a group introduced to the main chain (the polymer of the main chain portion) by using a compound capable of introducing a carbonyl-containing group to a main chain. The compound capable of introducing a carbonyl-containing group to a main chain is not particularly limited, and specific examples thereof include ketones, carboxylic acids, derivatives thereof, and the like.

Examples of the carboxylic acids include organic acids having saturated or unsaturated hydrocarbon groups, and the hydrocarbon groups may be any of aliphatic, alicyclic, or aromatic ones, and the like. Specific examples of the carboxylic acid derivatives include carboxylic anhydrides, amino acids, thiocarboxylic acids (mercapto group-containing carboxylic acids), esters, amino acids, ketones, amides, imides, dicarboxylic acids and their monoesters, and the like.

In addition, specific examples of the carboxylic acids, the derivatives thereof, and the like include carboxylic acids such as malonic acid, maleic acid, succinic acid, glutaric acid, phthalic acid, isophthalic acid, terephthalic acid, p-phenylenediacetic acid, p-hydroxybenzoic acid, p-aminobenzoic acid, and mercaptoacetic acid, as well as these carboxylic acids containing substituents; acid anhydrides such as succinic anhydride, maleic anhydride, glutaric anhydride, phthalic anhydride, propionic anhydride, and benzoic anhydride; aliphatic esters such as maleic acid esters, malonic acid esters, succinic acid esters, glutaric acid esters, and ethyl acetate; aromatic esters such as phthalic acid esters, isophthalic acid esters, terephthalic acid esters, ethyl-m-aminobenzoate, and methyl-p-hydroxybenzoate; ketones such as quinone, anthraquinone, and naphthoquinone; amino acids such as glycine, tyrosine, bicine, alanine, valine, leucine, serine, threonine, lysine, aspartic acid, glutamic acid, cysteine, methionine, proline, and N-(p-aminobenzoyl)-β-alanine; amides such as maleamide, maleamidic acid (maleic monoamide), succinic monoamide, 5-hydroxy-valeramide, N-acetylethanolamine, N,N'-hexamethylene bis (acetamide), malonamide, cycloserine, 4-acetamidophenol, and p-acetamidebenzoic acid; imides such as maleimide and succinimide; and the like.

Of these examples, the compound capable of introducing a carbonyl group (carbonyl-containing group) is preferably a cyclic acid anhydride such as succinic anhydride, maleic anhydride, glutaric anhydride, or phthalic anhydride, and is particularly preferably maleic anhydride.

In addition, when the side chain (a) has a nitrogen-containing heterocycle, the structure or the like of the nitrogen-containing heterocycle is not particularly limited, as long as the nitrogen-containing heterocycle is introduced to the main chain directly or through an organic group. It is also possible to use, as the nitrogen-containing heterocycle, one containing a heteroatom other than a nitrogen atom, such as a sulfur atom, an oxygen atom, or a phosphorus atom, in the heterocycle, as long as a nitrogen atom is contained in the heterocycle. Here, the use of the nitrogen-containing heterocycle in the side chain (a) is preferable because the presence of the heterocycle structure results in a stronger hydrogen bond forming the cross-linkage, so that the obtained thermoplastic elastomer composition of the present invention has an improved tensile strength.

In addition, the above-described nitrogen-containing heterocycle may have a substituent, and examples of the substituent include alkyl groups such as a methyl group, an ethyl group, an (iso)propyl group, and a hexyl group; alkoxy groups such as a methoxy group, an ethoxy group, and an (iso)propoxy group; groups consisting of a halogen atom such as a fluorine atom, a chlorine atom, a bromine atom, or an iodine atom; a cyano group; an amino group; an aromatic hydrocarbon group; an ester group; an ether group; an acyl group; a thioether group; and the like, any ones of which can also be used in combination. The position of substitution of such a substituent is not particularly limited, and the number of such substituents is not limited.

Moreover, the above-described nitrogen-containing heterocycle may have aromatic properties, but does not necessarily have to have aromatic properties. A nitrogen-containing heterocycle having aromatic properties is preferable, because the obtained thermoplastic elastomer composition of the present invention is further improved in compression set and mechanical strength.

In addition, such a nitrogen-containing heterocycle is preferably, but not particularly limited to, a 5-membered ring or a 6-membered ring, from the viewpoints that the hydrogen bond becomes more strongly, and the compression set and the mechanical strength are further improved. Specific examples of the nitrogen-containing heterocycle include pyrrololine, pyrrolidone, oxindole (2-oxindole), indoxyl (3-oxindole), dioxindole, isatin, indolyl, phthalimidine, β-isoindigo, monoporphyrin, diporphyrin, triporphyrin, azaporphyrin, phthalocyanine, hemoglobin, uroporphyrin, chlorophyll, phylloerythrin, imidazole, pyrazole, triazole, tetrazole, benzimidazole, benzopyrazole, benzotriazole, imidazoline, imidazolone, imidazolidone, hydantoin, pyrazoline, pyrazolone, pyrazolidone, indazole, pyridoindole, purine, cinnoline, pyrrole, pyrroline, indole, indoline, oxylindole, carbazole, phenothiazine, indolenine, isoindole, oxazole, thiazole, isoxazole, isothiazole, oxadiazole, thiadiazole, oxatriazole, thiatriazole, phenanthroline, oxazine, benzoxazine, phthalazine, pteridine, pyrazine, phenazine, tetrazine, benzoxazole, benzoisoxazole, anthranyl, benzothiazole, benzofurazan, pyridine, quinoline, isoquinoline, acridine, phenanthridine, anthrazoline, naphthyridine, thiazine, pyridazine, pyrimidine, quinazoline, quinoxaline, triazine, histidine, triazolidine, melamine, adenine, guanine, thymine, cytosine, hydroxyethyl isocyanurate, derivatives thereof, and the like. Of these examples, preferred examples of particularly the 5-membered nitrogen-containing rings include the compounds described below (cyclic structures represented by the chemical formulae), triazole derivatives represented by the following general formula (10), and imidazole derivatives represented by the following general formula (11). In addition, these may have the above-described various substituents, and may be subjected to hydrogen addition or elimination.

[Chem. 3]

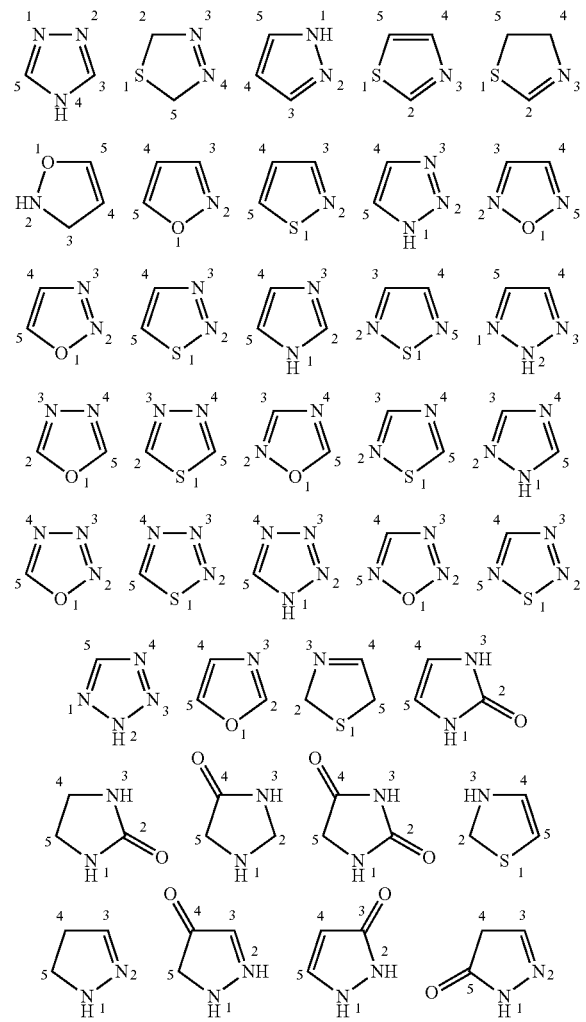

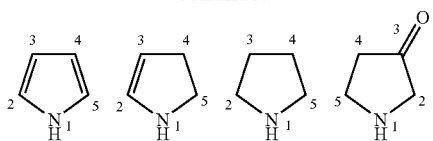

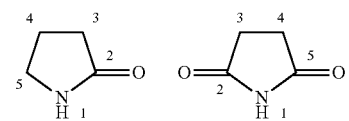

[Chem. 4]

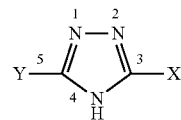

(10)

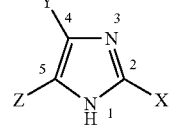

(11)

The substituents X, Y, and Z in the formulae (10) and (11) are each independently a hydrogen atom, an alkyl group having 1 to 30 carbon atoms, an aralkyl group having 7 to 20 carbon atoms, an aryl group having 6 to 20 carbon atoms, or an amino group. Note that one of X and Y in the above-described formula (10) is not a hydrogen atom, and similarly at least one of X, Y, and Z in the above-described formula (11) is not a hydrogen atom.

In addition to a hydrogen atom and an amino group, specific examples of the substituents X, Y, and Z include, linear chainlike alkyl groups such as a methyl group, an ethyl group, a propyl group, a butyl group, a pentyl group, an octyl group, a dodecyl group, and a stearyl group; branched alkyl groups such as an isopropyl group, an isobutyl group, a s-butyl group, a t-butyl group, an isopentyl group, a neopentyl group, a t-pentyl group, a 1-methylbutyl group, a 1-methylheptyl group, and a 2-ethylhexyl group; aralkyl groups such as a benzyl group and a phenethyl group; aryl groups such as a phenyl group, tolyl groups (o-, m-, and p-), a dimethylphenyl group, and a mesityl group; and the like.

Of these examples, the substituents X, Y, and Z are each preferably an alkyl group, especially, a butyl group, an octyl group, a dodecyl group, an isopropyl group, or a 2-ethylhexyl group, because the obtained thermoplastic elastomer composition of the present invention has good processability.

Meanwhile, preferred examples of the nitrogen-containing 6-membered rings include the compounds described below. These compounds may also have the above-described various substituents (for example, the substituents which may be possessed by the above-described nitrogen-containing heterocycles), or may also be subjected to hydrogen addition or hydrogen elimination.

[Chem. 5]

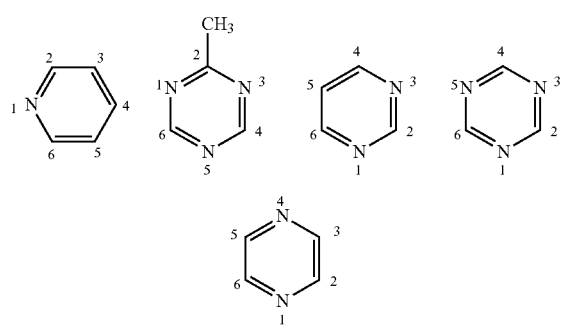

In addition, it is also possible to use condensation products of any one of the above-described nitrogen-containing heterocycles with a benzene ring or condensation products of any ones of the nitrogen-containing heterocycles, and specific preferred examples thereof include condensed rings shown below. These condensed rings may also have the above-described various substituents, and may also be subjected to addition or elimination of hydrogen atoms.

[Chem. 6]

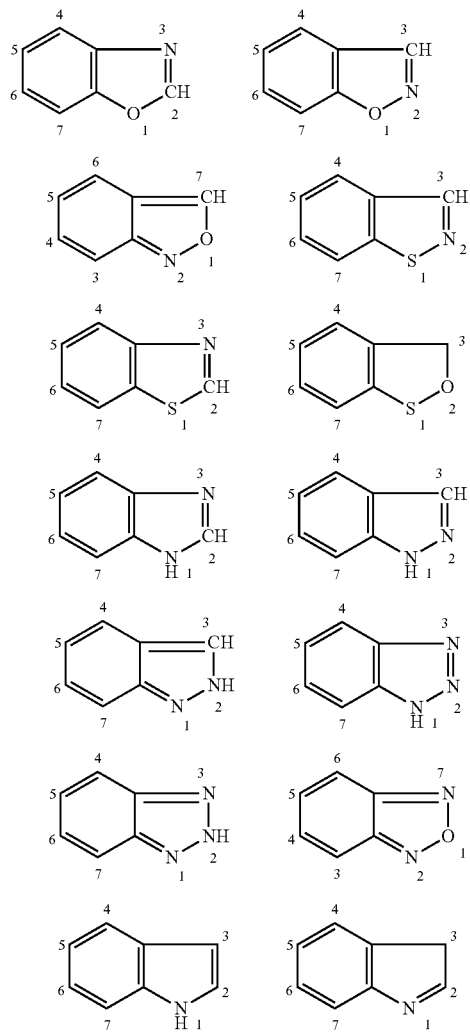

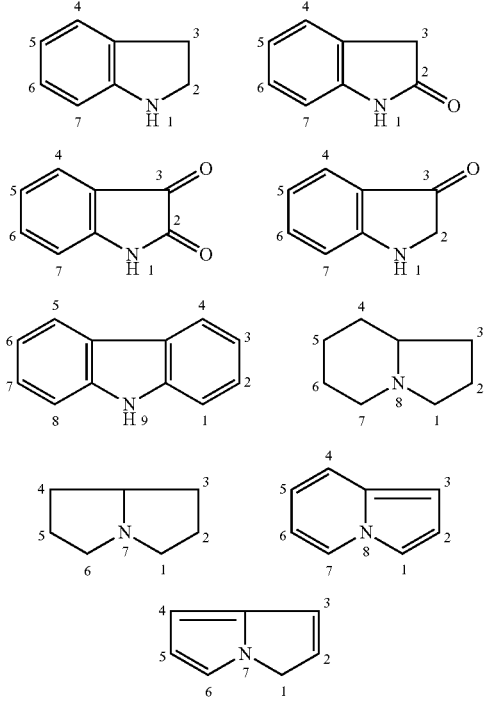

Among others, the nitrogen-containing heterocycle is preferably at least one selected from a triazole ring, an isocyanurate ring, a thiadiazole ring, a pyridine ring, an imidazole ring, a triazine ring, and a hydantoin ring, and is preferably at least one selected from a triazole ring, a thiadiazole ring, a pyridine ring, an imidazole ring, and a hydantoin ring, because the obtained thermoplastic elastomer composition of the present invention is excellent in recyclability, compression set, hardness, and mechanical strengths, especially, tensile strength.

In addition, when the side chain (a) contains both the above-described carbonyl-containing group and the above-described nitrogen-containing heterocycle, the above-described carbonyl-containing group and the above-described nitrogen-containing heterocycle may be introduced to the main chain as side chains independent from each other, and are preferably introduced to the main chain as a single side chain in which the above-described carbonyl-containing group and the above-described nitrogen-containing heterocycle are linked to each other through another group. Accordingly, as the side chain (a), it is preferable that a side chain containing a hydrogen-bond cross-linkable moiety having the above-described carbonyl-containing group and the above-described nitrogen-containing heterocycle be introduced to the main chain as a single side chain, and it is more preferable that a side chain containing a structural portion represented by the following general formula (1):

[Chem. 7]

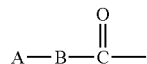 (1)

[in the formula (1), A is a nitrogen-containing heterocycle, and B is a single bond; an oxygen atom, an amino group NR'

(R' is a hydrogen atom or an alkyl group having 1 to 10 carbon atoms), a sulfur atom; or an organic group optionally containing any of the atoms or groups] be introduced to the main chain as a single side chain. Accordingly, the hydrogen-bond cross-linkable moiety of the side chain (a) preferably contains a structural portion represented by the above-described general formula (1).

Here, specific examples of the nitrogen-containing heterocycle A in the above-described formula (1) include the nitrogen-containing heterocycles listed as examples above. In addition, specific examples of the substituent B in the above-described formula (1) include a single bond; an oxygen atom, a sulfur atom, or an amino group NR' (where R' is a hydrogen atom or an alkyl group having 1 to 10 carbon atoms); an alkylene or aralkylene group having 1 to 20 carbon atoms and optionally containing any of the atoms or groups; an alkylene ether group (alkyleneoxy group, for example, —O—CH$_2$CH$_2$ group), an alkyleneamino group (for example, —NH—CH$_2$CH$_2$ group or the like), or an alkylene thioether group (alkylenethio group, for example, —S—CH$_2$CH$_2$ group) having 1 to 20 carbon atoms and having any of the atoms or groups at a terminal; an aralkylene ether group (aralkyleneoxy group), aralkyleneamino group, or aralkylene thioether group having 1 to 20 carbon atoms and having any of them at a terminal; and the like.

Here, examples of the alkyl group having 1 to 10 carbon atoms in the above-described amino group NR' include a methyl group, an ethyl group, a propyl group, a butyl group, a pentyl group, a hexyl group, a heptyl group, an octyl group, a nonyl group, a decyl group, isomers thereof, and the like. The oxygen atom, the sulfur atom, and the amino group NR'; as well as the oxygen atoms, amino groups NR', and sulfur atoms in the alkylene ether group, alkyleneamino group, alkylene thioether group, aralkylene ether group, aralkyleneamino group, aralkylene thioether group having 1 to 20 carbon atoms and having any of the atoms or groups at a terminal, and the like serving as the substituent B in the above-described formula (1) preferably form a conjugated system, such as an ester group, an amide group, an imide group, or a thioester group, in combination with the adjacent carbonyl group.

Of these examples, the substituent B is preferably an oxygen atom, sulfur atom, or amino group forming a conjugated system; or an alkylene ether group, an alkyleneamino group, or an alkylene thioether group having 1 to 20 carbon atoms, having any of the atoms or groups at a terminal, and forming a conjugated system, and particularly preferably an amino group (NH), an alkyleneamino group (—NH—CH$_2$ group, —NH—CH$_2$CH$_2$ group, or —NH—CH$_2$CH$_2$CH$_2$ group), an alkylene ether group (—O—CH$_2$ group, —O—CH$_2$CH$_2$ group, or —O—CH$_2$CH$_2$CH$_2$ group), forming a conjugated system.

In addition, when the side chain (a) is a side chain containing a hydrogen-bond cross-linkable moiety having the above-described carbonyl-containing group and the above-described nitrogen-containing heterocycle, the hydrogen-bond cross-linkable moiety having the above-described carbonyl-containing group and the above-described nitrogen-containing heterocycle is more preferably a single side chain represented by the following formula (2) or (3), which is introduced to the main chain of the above-described polymer at the α position or β position of the side chain.

[Chem. 8]

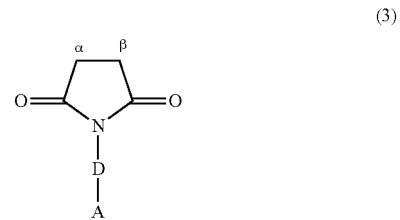

[In the formula, A is a nitrogen-containing heterocycle, B and D are each independently a single bond; an oxygen atom, an amino group NR' (where R' is a hydrogen atom or an alkyl group having 1 to 10 carbon atoms), or a sulfur atom; or an organic group optionally containing any of the atoms or groups.]

Here, the nitrogen-containing heterocycle A is basically the same as the nitrogen-containing heterocycle A of the above-described formula (1), and the substituents B and D are each independently basically the same as the substituent B in the above-described formula (1). Note that, among the examples listed for the substituent B in the above-described formula (1), the substituent D in the above-described formula (3) is preferably a single bond; an alkylene or aralkylene group having 1 to 20 carbon atoms, optionally containing an oxygen atom, a nitrogen atom, or a sulfur atom, and forming a conjugated system, and is particularly preferably a single bond. Specifically, it is preferable to form an alkyleneamino group or an aralkyleneamino group having 1 to 20 carbon atoms and optionally containing an oxygen atom, a nitrogen atom, or a sulfur atom, together with the imide nitrogen of the above-described formula (3), and it is particularly preferable that the nitrogen-containing heterocycle be directly bonded (through a single bond) to the imide nitrogen of the above-described formula (3). Specific examples of the above-described substituent D include a single bond; the above-described alkylene ether, aralkylene ether group, or the like having 1 to 20 carbon atoms and having an oxygen atom, a sulfur atom, or an amino group at a terminal; a methylene group, an ethylene group, a propylene group, a butylene group, a hexylene group, a phenylene group, and a xylylene group, isomers thereof, and the like.

In addition, when the side chain (a) is a side chain containing a hydrogen-bond cross-linkable moiety having the above-described carbonyl-containing group and the above-described nitrogen-containing heterocycle, the hydrogen-bond cross-linkable moiety of the side chain (a) preferably contains a structural portion represented by the following general formula (101):

[Chem. 9]

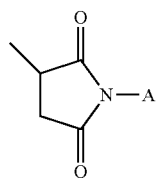

(101)

[in the formula (101), A is a nitrogen-containing heterocycle]. The nitrogen-containing heterocycle A in the formula (101) is basically the same as the nitrogen-containing heterocycle A of the above-described formula (1). In addition, from the viewpoints of high modulus and high strength at break, the hydrogen-bond cross-linkable moiety of the side chain (a) is more preferably one having the structure represented by the following general formula (102):

[Chem. 10]

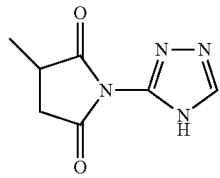

(102)

Moreover, the side chain (a) is particularly preferably a group represented by the above-described general formula (102).

The ratio of the above-described carbonyl-containing group to the above-described nitrogen-containing heterocycle of the above-described thermoplastic elastomer is preferably, but not particularly limited to, 2:1, because complementary interaction is more likely to be created, and because such a thermoplastic elastomer is easy to produce.

The side chain (a) containing a hydrogen-bond cross-linkable moiety having a carbonyl-containing group and/or a nitrogen-containing heterocycle is preferably introduced at a ratio (introduction ratio) of 0.1 to 50% by mole, and more preferably introduced at a ratio of 1 to 30% by mole, relative to 100% by mole of the main chain portion. If the introduction ratio of the side chain (a) is lower than 0.1% by mole, the tensile strength upon the cross-linking may be insufficient in some cases. Meanwhile, if the introduction ratio exceeds 50% by mole, the cross-linking density increases, so that the rubber elasticity may be lost in some cases. Specifically, it is preferable that the introduction ratio be within the above-described range, because the interaction between side chains of the above-described thermoplastic elastomer leads to efficient formation of cross-linkages between molecules, so that the tensile strength is high upon cross-linking, and the recyclability is excellent.

When a side chain (a-i) containing a hydrogen-bond cross-linkable moiety having the above-described carbonyl-containing group and a side chain (a-ii) containing a hydrogen-bond cross-linkable moiety having the above-described nitrogen-containing heterocycle are each independently introduced as the side chain (a), the above-described introduction ratio is calculated by taking a set of the side chain (a-i) containing a carbonyl-containing group and the side chain (a-ii) containing a nitrogen-containing heterocycle as a single side chain (a) based on the ratio between these side chains. Note that when any one of the side chains (a-i) and (a-ii) is in excess, the above-described introduction ratio can be obtained based on the excessive side chain.

In addition, for example, when the main chain portion is ethylene-propylene rubber (EPM), the above-described introduction ratio is such that the amount of monomers to which the side chain portion is introduced is about 0.1 to 50 units per 100 ethylene and propylene monomer units.

In addition, the side chain (a) is preferably a side chain (a) introduced as a side chain of a polymer by using, as a polymer (elastomeric polymer-forming material) which forms the main chain after reaction, a polymer (an elastomeric polymer having a cyclic acid anhydride group in a side chain) having a cyclic acid anhydride group (more preferably a maleic anhydride group) as a functional group, and reacting the functional group (cyclic acid anhydride group) with a compound (a compound capable of introducing a nitrogen-containing heterocycle) that forms a hydrogen-bond cross-linkable moiety upon a reaction with the cyclic acid anhydride group, to form a hydrogen-bond cross-linkable moiety. The compound capable of introducing a nitrogen-containing heterocycle may be one of the nitrogen-containing heterocycles listed as examples above itself, or may be a nitrogen-containing heterocycle having a substituent (for example, a hydroxy group, a thiol group, an amino group, or the like) that reacts with a cyclic acid anhydride group such as maleic anhydride.

Here, the position at which the nitrogen-containing heterocycle is bonded in the side chain (a) is described. Note that the nitrogen heterocycle is referred to as a "nitrogen-containing n-membered ring compound (n≥3)" for convenience.

The bonding positions ("positions 1 to n") described below are based on the IUPAC nomenclature. For example, in a case of a compound having three nitrogen atoms having unshared electron pairs, the bonding position is determined according to the order based on the IUPAC nomenclature. Specifically, the bonding positions are shown in the 5-membered, 6-membered, and condensed nitrogen-containing heterocycles listed as examples above.

In the side chain (a), the bonding position of the nitrogen-containing n-membered ring compound which is bonded to the copolymer directly or through an organic group is not particularly limited, and may be any bonding position (position 1 to position n). Preferably, the bonding position is position 1 or position 3 to position n of the nitrogen-containing n-membered ring compound.

When the nitrogen-containing n-membered ring compound contains one nitrogen atom (for example, a pyridine ring or the like), position 3 to position (n−1) are preferable, because intramolecular chelate formation easily occurs, and the composition formed therefrom is excellent in physical properties such as tensile strength. By the selection of the bonding position of the nitrogen-containing n-membered ring compound, the elastomeric polymer tends to easily undergo cross-linking among molecules of the elastomeric polymer by hydrogen bonds, ionic bonding, coordinate bonds, or the like, and tends to be excellent in recyclability and excellent in mechanical properties, especially, tensile strength.

<Side Chain (b): Side Chain Containing Covalent-Bond Cross-Linking Moiety>

In the present description, the "side chain (b) containing a covalent-bond cross-linking moiety" means that a covalent-bond cross-linking moiety (a functional group or the like capable of forming at least one bond selected from the group consisting of amide, ester, lactone, urethane, ether, thiourethane, and thioether upon a reaction with "a compound that forms a covalent bond" such as an amino group-containing compound described later) is chemically stably bonded (covalently bonded) to an atom (generally, a carbon atom) forming the main chain of an elastomeric polymer. Here, the side chain (b) is one containing a covalent-bond cross-linking moiety. Note that when the side chain (b) further has a group capable of forming a hydrogen bond to form a cross-linkage by a hydrogen bond between side chains, while having the covalent-bonding moiety, such a side chain (b) is used as a side chain (c) described later (note that, when both a hydrogen donor and a hydrogen acceptor, which allow the formation of a hydrogen bond between side chains of the elastomer, are not contained, for example, when only a side chain simply containing an ester group (—COO—) is present in the system, such a group does not function as the hydrogen-bond cross-linkable moiety, because two ester groups (—COO—) do not form a hydrogen bond. Meanwhile, for example, when each side chain of the elastomer contains a structure having both a moiety serving as a hydrogen donor and a moiety serving as a hydrogen acceptor in a hydrogen bond, such as a carboxy group or a triazole ring, a hydrogen bond is formed between the side chains of the elastomer, and hence a hydrogen-bond cross-linkable moiety is considered to be contained. In addition, for example, when an ester group and a hydroxy group are coexistent in side chains of an elastomer, and these groups form a hydrogen bond between the side chains, the moiety forming the hydrogen bond serves as a hydrogen-bond cross-linkable moiety. For this reason, the side chain (b) may be used as the side chain (c) in some cases depending on the structure of the side chain (b) itself, the structure of the side chain (b) and the type of the substituent of another side chain, or the like). In addition, the "covalent-bond cross-linking moiety" used herein is a moiety which cross-links polymer molecules (elastomer molecules) to each other by a covalent bond.

The side chain (b) containing a covalent-bond cross-linking moiety is not particularly limited, and is preferably, for example, one containing a covalent-bond cross-linking moiety formed by a reaction of an elastomeric polymer having a functional group in a side chain (the polymer for forming a main chain portion) with a compound that forms a covalent-bond cross-linking moiety upon a reaction with the functional group (a compound that forms a covalent bond). The cross-linkage at the covalent-bond cross-linking moiety of the side chain (b) is preferably formed by at least one bond selected from the group consisting of amide, ester, lactone, urethane, ether, thiourethane, and thioether. For this reason, the functional group of the polymer constituting the main chain is preferably a functional group capable of forming at least one bond selected from the group consisting of amide, ester, lactone, urethane, ether, thiourethane, and thioether.

Examples of the "compound that forms a covalent-bond cross-linking moiety (a compound that forms a covalent bond)" include polyamine compounds having two or more amino and/or imino groups in one molecule (when both amino and imino groups are present, the total of these groups is two or more); polyol compounds having two or more hydroxy groups in one molecule; polyisocyanate compounds having two or more isocyanate (NCO) groups in one molecule; polythiol compounds having two or more thiol groups (mercapto groups) in one molecule; and the like. The "compound that forms a covalent-bond cross-linking moiety (the compound that forms a covalent bond)" herein can be a compound capable of introducing both the hydrogen-bond cross-linkable moiety and the covalent-bond cross-linking moiety depending on the type of the substituent of the compound, the degree of the progress of the reaction in a case where a reaction is carried out by using such as compound, or the like (for example, when a covalent bond cross-linking moiety is formed by using a compound having three or more hydroxy groups, two hydroxy groups react with functional groups of an elastomeric polymer having a functional group in a side chain, and the remaining one hydroxy group is left as a hydroxy group in some cases depending on the degree of the progress of the reaction, and in this case, a moiety that forms a hydrogen-bond cross-linking can also be introduced). For this reason, "compounds that form a covalent-bond cross-linking moiety (compounds that forms a covalent bond)" listed as examples herein also include "compounds that form both a hydrogen-bond cross-linkable moiety and a covalent-bond cross-linking moiety." From such a viewpoint, for the formation of the side chain (b), the side chain (b) may be formed by selecting a compound from the "compounds that form a covalent-bond cross-linking moiety (compounds that forms a covalent bond)" according to the target design, as appropriate, controlling the degree of the progress of the reaction, as appropriate, or the like. Note that when the compound that forms a covalent-bond cross-linking moiety has a heterocycle, it is also possible to simultaneously produce a hydrogen-bond cross-linking moiety more efficiently, and it is possible to efficiently form a side chain having the covalent-bond cross-linking moiety as the side chain (c) described later. For this reason, specific examples of such compounds having a heterocycle are described especially together with the side chain (c) as preferred compounds for producing the side chain (c). Note that because of its structure, the side chain (c) can also be regarded as a preferred mode of side chains such as the side chain (a) and the side chain (b).

Examples of the polyamine compound usable as the "compound that forms a covalent-bond cross-linking moiety (the compound that forms a covalent bond)" include alicyclic amines, aliphatic polyamines, aromatic polyamines, nitrogen-containing heterocyclic amines, and the like shown below.

Specific examples of the alicyclic amines include 1-amino-3-aminomethyl-3,5,5-trimethylcyclohexane, bis-(4-aminocyclohexyl)methane, diaminocyclohexane, di-(aminomethyl)cyclohexane, and the like.

In addition, examples of the aliphatic polyamines include, but are not particularly limited to, methylenediamine, ethylenediamine, propylenediamine, 1,2-diaminopropane, 1,3-diaminopentane, hexamethylenediamine, diaminoheptane, diaminododecane, diethylenetriamine, diethylaminopropylamine, N-aminoethylpiperazine, triethylenetetramine, N,N'-dimethylethylenediamine, N,N'-diethylethylenediamine, N,N'-diisopropylethylenediamine, N,N'-dimethyl-1,3-propanediamine, N,N'-diethyl-1,3-propanediamine, N,N'-diisopropyl-1,3-propanediamine, N,N'-dimethyl-1,6-hexanediamine, N,N'-diethyl-1,6-hexanediamine, N,N',N"-trimethylbis(hexamethylene)triamine, and the like.

Examples of the aromatic polyamines and the nitrogen-containing heterocyclic amines include, but are not particularly limited to, diaminotoluene, diaminoxylene, tetramethylxylylenediamine, tris(dimethylaminomethyl)phenol, m-phenylenediamine, diaminodiphenylmethane, diaminodiphenyl sulfone, 3-amino-1,2,4-triazole, and the like.

In addition, one or more hydrogen atoms in each of the polyamine compounds may be substituted by an alkyl group, an alkylene group, an aralkylene group, an oxy group, an acyl group, a halogen atom, or the like, or the skeleton of each polyamine compound may contain a heteroatom such as an oxygen atom or a sulfur atom.

In addition, one of the polyamine compounds may be used alone, or two or more thereof may be used in combination. When two or more thereof are used in combination, the mixing ratio can be adjusted to any ratio according to the application for which the thermoplastic elastomer (composition) of the present invention is used, or physical properties required for the thermoplastic elastomer (composition) of the present invention, and the like.

Among the polyamine compounds listed as examples above, hexamethylenediamine, N,N'-dimethyl-1,6-hexanediamine, diaminodiphenyl sulfone, and the like are preferable, because they provide high effects of improvement in compression set and mechanical strengths, especially, tensile strength.

The molecular weights or skeletons of the polyol compounds are not particularly limited, as long as the polyol compounds have two or more hydroxy groups. Examples of the polyol compounds include polyether polyols, polyester polyols, and other polyols shown below, mixed polyols thereof, and the like.

Specific examples of the polyether polyols include polyols each obtained by addition of at least one selected from ethylene oxide, propylene oxide, butylene oxide, and styrene oxide to at least one selected from polyols such as ethylene glycol, diethylene glycol, propylene glycol, dipropylene glycol, glycerin, 1,1,1-trimethylolpropane, 1,2,5-hexanetriol, 1,3-butanediol, 1,4-butanediol, 4,4'-dihydroxyphenylpropane, 4,4'-dihydroxyphenylmethane, and pentaerythritol; polyoxytetramethylene oxide; and the like. One of these polyether polyols may be used alone, or two or more thereof may be used in combination.

Specific examples of the polyester polyols include condensation polymers of one, two, or more low-molecular weight polyols such as ethylene glycol, propylene glycol, butanediol, pentanediol, hexanediol, cyclohexanedimethanol, glycerin, 1,1,1-trimethylolpropane, and others with one, two, or more low-molecular weight carboxylic acids or oligomeric acids such as glutaric acid, adipic acid, pimelic acid, suberic acid, sebacic acid, terephthalic acid, isophthalic acid, dimer acids, and others; ring-opening polymers of propiolactone, valerolactone, and the like; and the like. One of these polyester polyols may be used alone, or two or more thereof may be used in combination.

Specific examples of the other polyols include polymer polyols, polycarbonate polyols; polybutadiene polyols; hydrogenated polybutadiene polyols; acrylic polyols; low-molecular weight polyols such as ethylene glycol, diethylene glycol, propylene glycol, dipropylene glycol, butanediol, pentanediol, hexanediol, polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl)stearylamine), and polypropylene glycol stearylamine (for example, N,N-bis(2-methyl-2-hydroxyethyl)stearylamine); and the like. One of these polyols may be used alone, or two or more thereof may be used in combination.

Examples of the polyisocyanate compounds include diisocyanate compounds including aromatic polyisocyanates such as 2,4-tolylene diisocyanate (2,4-TDI), 2,6-tolylene diisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethylxylylene diisocyanate (TMXDI), tolidine diisocyanate (TODI), and 1,5-naphthalene diisocyanate (NDI), aliphatic polyisocyanates such as hexamethylene diisocyanate (HDI), trimethylhexamethylene diisocyanate (TM-HDI), lysine diisocyanate, and norbornane diisocyanatomethyl (NBDI), alicyclic polyisocyanates such as trans-cyclohexane-1,4-diisocyanate, isophorone diisocyanate (IPDI), $H_6XDI$ (hydrogenated XDI), $H_{12}MDI$ (hydrogenated MDI), and $H_6TDI$ (hydrogenated TDI), and the like; polyisocyanate compounds such as polymethylene polyphenylene polyisocyanate; carbodiimide-modified polyisocyanates of these isocyanate compounds; isocyanurate-modified polyisocyanate of these isocyanate compounds; urethane prepolymers obtained by reactions of these isocyanate compounds with the polyol compounds listed as examples above; and the like. One of these polyisocyanate compounds may be used alone, or two or more thereof may be used in combination.

The molecular weight, the skeleton, or the like of each of the polythiol compounds is not particularly limited, as long as the polythiol compounds have two or more thiol groups. Specific examples of the polythiol compounds include methanedithiol, 1,3-butanedithiol, 1,4-butanedithiol, 2,3-butanedithiol, 1,2-benzenedithiol, 1,3-benzenedithiol, 1,4-benzenedithiol, 1,10-decanedithiol, 1,2-ethanedithiol, 1,6-hexanedithiol, 1,9-nonanedithiol, 1,8-octanedithiol, 1,5-pentanedithiol, 1,2-propanedithiol, 1,3-propadithiol, toluene-3,4-dithiol, 3,6-dichloro-1,2-benzenedithiol, 1,5-naphthalenedithiol, 1,2-benzenedimethanethiol, 1,3-benzenedimethanethiol, 1,4-benzenedimethanethiol, 4,4'-thiobisbenzenethiol, 2,5-dimercapto-1,3,4-thiadiazole, 1,8-dimercapto-3,6-dioxaoctane, 1,5-dimercapto-3-thiapentane, 1,3,5-triazine-2,4,6-trithiol (trimercapto-triazine), 2-di-n-butylamino-4,6-dimercapto-s-triazine, trimethylolpropane tris(β-thiopropionate), trimethylolpropane tris(thioglycollate), polythiols (THIOKOL or thiol-modified polymers (resins, rubbers, and the like)), and the like. One of these polythiol compounds may be used alone, or two or more thereof may be used in combination.

Functional groups of the polymer constituting the main chain which react with the "compound that forms a covalent-bond cross-linking moiety (compound that forms a covalent bond)" are preferably functional groups which can form at least one bond selected from the group consisting of amide, ester, lactone, urethane, thiourethane, and thioether. Preferred examples of such functional groups include cyclic acid anhydride groups, hydroxy groups, amino groups, carboxy groups, isocyanate groups, thiol groups, and the like.

Note that the elastomeric polymer (B) having the side chain (b) has, in a portion of the side chain (b), at least one cross-linkage at the covalent-bond cross-linking moiety, specifically, at least one cross-linkage by a covalent bond formed by a reaction of the functional group with the above-described "compound that forms a covalent-bond cross-linking moiety (compound that forms a covalent bond)" in one molecule. Particularly when the cross-linking is formed by at least one bond selected from the group consisting of lactone, urethane, ether, thiourethane, and thioether, the elastomeric polymer (B) preferably has two or more cross-linkages, more preferably 2 to 20 cross-linkages, and further preferably 2 to 10 cross-linkages.

In addition, the cross-linkage at the covalent-bond cross-linking moiety of the side chain (b) preferably contains a tertiary amino bond (—N═) or an ester bond (—COO—), because the compression set and the mechanical strengths (elongation at break and strength at break) of the obtained thermoplastic elastomer (composition) can be improved more easily. Note that, in this case, when an elastomer having a side chain containing a group capable of forming a hydrogen bond with the tertiary amino bond (—N═) or the ester bond (—COO—) is contained (for example, in a case where another elastomer having a side chain containing a hydroxy group or the like is present, or other cases), the covalent-bond cross-linking moiety can function as a side chain (c) described later. For example, in a case of an elastomeric polymer (B) having the side chain (a) as the side chain (a') (i.e., in a case where the elastomeric polymer (B) is an elastomeric polymer having both the side chains (a) and (b)), when the cross-linkage at the covalent-bond cross-linking moiety has the tertiary amino bond and/or the ester bond, these groups and groups in the side chain (a) (side chain having a carbonyl-containing group and/or a nitrogen-containing heterocycle) presumably form hydrogen bonds (interact with each other), making it possible to further improve the cross-linking density. Note that from the viewpoint of forming the side chain (b) having a structure containing a tertiary amino bond (—N═) or an ester bond (—COO—), the "compound that forms a covalent-bond cross-linking moiety (compound that forms a covalent bond)" is preferably polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl) stearylamine), or polypropylene glycol stearylamine (for example, N,N-bis(2-methyl-2-hydroxyethyl)stearylamine), among those listed as examples above.

Note that even when the above-described compound that forms a covalent-bond cross-linking moiety (compound that forms a covalent bond) is used, a hydrogen-bond cross-linking moiety is also introduced in some cases, depending on the degree of the progress of the reaction, the type of substituent, the stoichiometric ratio of the raw materials used, and the like. Hence, preferred structures of the covalent-bond cross-linking moiety are described together with preferred structures of a covalent-bond cross-linking moiety in the side chain (c).

<Side Chain (c): Side Chain Containing Both Hydrogen-Bond Cross-Linkable Moiety and Covalent-Bond Cross-Linking Moiety>

The side chain (c) contains both a hydrogen-bond cross-linkable moiety and a covalent-bond cross-linking moiety in a single side chain. The hydrogen-bond cross-linkable moiety contained in the side chain (c) is the same as the hydrogen-bond cross-linkable moiety described for the side chain (a'), and preferred ones thereof are the same as those for the hydrogen-bond cross-linkable moiety in the side chain (a). In addition, as the covalent-bond cross-linking moiety contained in the sidechain (c), the same covalent-bond cross-linking moiety as that in the side chain (b) can be used (the same cross-linkages can be used as preferred cross-linkage thereof).

The side chain (c) is preferably one formed by a reaction of an elastomeric polymer having a functional group in a side chain (the polymer for forming a main chain portion) with a compound that forms both a hydrogen-bond cross-linkable moiety and a covalent-bond cross-linking moiety upon a reaction with the functional group (a compound that introduces both a hydrogen-bond cross-linkable moiety and a covalent-bond cross-linking moiety). The compound that forms both a hydrogen-bond cross-linkable moiety and a covalent-bond cross-linking moiety (compound that introduces both a hydrogen-bond cross-linkable moiety and a covalent-bond cross-linking moiety) is preferably a compound that has a heterocycle (particularly preferably a nitrogen-containing heterocycle) and is capable of forming a covalent-bond cross-linking moiety (a compound that forms a covalent bond), and, especially, the compound is more preferably a heterocycle-containing polyol, a heterocycle-containing polyamine, a heterocycle-containing polythiol, or the like.

Note that, as the heterocycle-containing polyols, polyamines, and polythiols, it is possible to use, as appropriate, the same polyols, polyamines, and polythiols described for the above-described "compound capable of forming a covalent-bond cross-linking moiety (compound that forms a covalent bond)," except that a heterocycle (particularly preferably a nitrogen-containing heterocycle) is present. In addition, examples of the heterocycle-containing polyols include, but are not particularly limited to, bis or tris(2-hydroxyethyl)isocyanurate, Kojic acid, dihydroxydithiane, and tris(hydroxyethyl)triazine. Meanwhile, examples of the heterocycle-containing polyamines include, but are not particularly limited to, acetoguanamine, piperazine, bis(aminopropyl)piperazine, benzoguanamine, and melamine. Moreover, examples of the heterocycle-containing polythiols include dimercaptothiadiazole, and tris-[(3-mercaptopropionyloxy)-ethyl] isocyanurate. Accordingly, the side chain (c) is preferably one obtained by a reaction of an elastomeric polymer having a functional group in a side chain (the polymer for forming a main chain portion) with a heterocyclic-containing polyol, polyamine, or polythiol, or the like.

Note that the functional group of the polymer constituting a main chain that reacts with the "compound that forms both a hydrogen-bond cross-linkable moiety and a covalent-bond cross-linking moiety (the compound that introduces both a hydrogen-bond cross-linkable moiety and a covalent-bond cross-linking moiety)" is preferably a functional group capable of forming at least one bond selected from the group consisting of amide, ester, lactone, urethane, thiourethane, and thioether. Preferred examples of such a functional group include a cyclic acid anhydride group, a hydroxy group, an amino group, a carboxy group, an isocyanate group, a thiol group, and the like.

In addition, the elastomeric polymer (B) having the side chain (c) has at least one cross-linkage at the covalent-bond cross-linking moiety in a portion of the side chain (c) in one molecule. Especially when the cross-linking is formed by at least one bond selected from the group consisting of lactone, urethane, ether, thiourethane, and thioether, the elastomeric polymer (B) has preferably two or more cross-linkages, more preferably 2 to 20 cross-linkages, and further preferably 2 to 10 cross-linkages. In addition it is preferable that the cross-linkage at the covalent-bond cross-linking moiety of the side chain (c) contain a tertiary amino bond (—N═) or an ester bond (—COO—), because the compression set and the mechanical strengths (elongation at break and strength at break) of the obtained thermoplastic elastomer (composition) are further improved.

(Regarding Structures Preferred as Covalent-Bond Cross-Linking Moieties in Side Chains (b) and (c))

Regarding the side chains (b) and/or (c), suppose a case where the cross-linkage at the covalent-bond cross-linking moiety contains a tertiary amino bond (—N═) or an ester bond (—COO—), and the binding site of such a bond also functions as a hydrogen-bond cross-linkable moiety. Such a case is preferable because the compression set and the mechanical strengths (elongation at break and strength at break) of the obtained thermoplastic elastomer (composition) are improved to higher levels. When a tertiary amino bond (—N═) or an ester bond (—COO—) in a side chain having a covalent-bond cross-linking moiety forms a hydrogen bond with another side chain as described above, the covalent-bond cross-linking moiety containing a tertiary amino bond (—N═) or an ester bond (—COO—) also comprises a hydrogen-bond cross-linkable moiety, and can function as the side chain (c).

Suppose, for example, a case where the elastomeric polymer (B) has the side chain (a) as the side chain (a'), and has a covalent-bond cross-linking moiety containing the tertiary amino bond and/or the ester bond. In such a case, when the tertiary amino bond and/or the ester bond forms a hydrogen bond (interacts) with a group in the side chain (a), the cross-linking density can be further improved, presumably. Here, preferred examples of the compound that can form a covalent-bond cross-linking moiety containing the tertiary amino bond and/or the ester bond upon a reaction with a functional group of the polymer constituting a main chain (compound capable of forming both a hydrogen-bond cross-linkable moiety and a covalent-bond cross-linking moiety) include polyethylene glycol laurylamine (for example, N,N-bis(2-hydroxyethyl)laurylamine), polypropylene glycol laurylamine (for example, N,N-bis(2-methyl-2-hydroxyethyl)laurylamine), polyethylene glycol octylamine (for example, N,N-bis(2-hydroxyethyl)octylamine), polypropylene glycol octylamine (for example, N,N-bis(2-methyl-2-hydroxyethyl)octylamine), polyethylene glycol stearylamine (for example, N,N-bis(2-hydroxyethyl) stearylamine), and polypropylene glycol stearylamine (for example, N,N-bis(2-methyl-2-hydroxyethyl)stearylamine).

The above-described cross-linkage at the covalent-bond cross-linking moiety in the side chain (b) and/or the side chain (c) is preferably one containing at least one structure represented by any one of the following general formulae (4) to (6), and is more preferably one in which G in the formulae contains a tertiary amino bond or an ester bond (note that when a structure shown below contains a hydrogen-bond cross-linkable moiety, the side chain having the structure is used as a side chain (c)).

[Chem. 11]

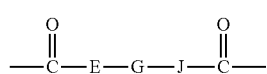

(4)

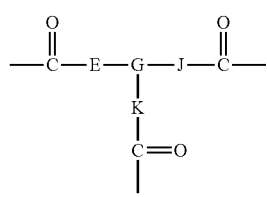

(5)

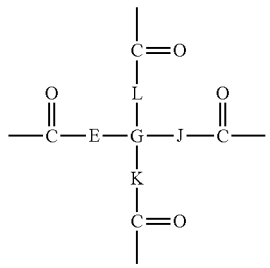

(6)

In the above-described general formulae (4) to (6), E, J, K, and L are each independently a single bond; an oxygen atom, an amino group NR' (where R' is a hydrogen atom or an alkyl group having 1 to 10 carbon atoms), or a sulfur atom; or an organic group optionally containing any of the atoms or groups, and G is a linear chainlike, branched chainlike, or cyclic hydrocarbon group having 1 to 20 carbon atoms and optionally containing an oxygen atom, a sulfur atom, or a nitrogen atom.

Here, the substituents E, J, K, and L are each independently basically the same as the substituent B in the above-described general formula (1).

In addition, examples of the substituent G include alkylene groups such as a methylene group, an ethylene group, a 1,3-propylene group, a 1,4-butylene group, a 1,5-pentylene group, a 1,6-hexylene group, a 1,7-heptylene group, a 1,8-octylene group, a 1,9-nonylene group, a 1,10-decylene group, a 1,11-undecylene group, and a 1,12-dodecylene group; N,N-diethyldodecylamine-2,2'-diyl, N,N-dipropyldodecylamine-2,2'-diyl, N,N-diethyloctylamine-2,2'-diyl, N,N-dipropyloctylamine-2,2'-diyl, N,N-diethylstearylamine-2,2'-diyl, and N,N-dipropylstearylamine-2,2'-diyl; a vinylene group; divalent alicyclic hydrocarbon groups such as a 1,4-cyclohexlene group; divalent aromatic hydrocarbon groups such as a 1,4-phenylene group, a 1,2-phenylene group, a 1,3-phenylene group, and a 1,3-phenylenebis(methylene) group; trivalent hydrocarbon groups such as propane-1,2,3-triyl, butane-1,3,4-triyl, trimethylamine-1,1',1"-triyl, and triethylamine-2,2',2"-triyl; trivalent cyclic hydrocarbons containing an oxygen atom, a sulfur atom, or a nitrogen atom such as an isocyanurate group and a triazine group; tetravalent hydrocarbon groups represented by the following formulae (12) and (13); substituents formed by combining any ones of them; and the like.

[Chem. 12]

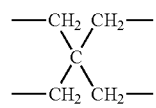

(12)

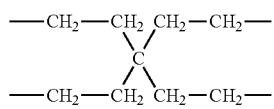

(13)

Moreover, the above-described cross-linkage at the covalent-bond cross-linking moiety of the side chain (c) preferably contains at least one structure represented by anyone of the following formulae (7) to (9), which is bonded to the main chain of the above-described elastomeric polymer at the α position or the β position, and more preferably contains at least one structure represented by any one of the following formulae (7) to (9), in which G contains a tertiary amino group (the structures shown in the formulae (7) to (9) contain hydroxy groups and carbonyl groups, and can be considered as structures containing both a hydrogen-bond cross-linkable moiety and a covalent-bond cross-linking moiety, and a side chain having such a structure can function as the side chain (c)). In addition, G in each formula is preferably an isocyanurate group (isocyanurate ring), from the viewpoints of high heat resistance, and high strength because of hydrogen bonds.

[Chem. 13]

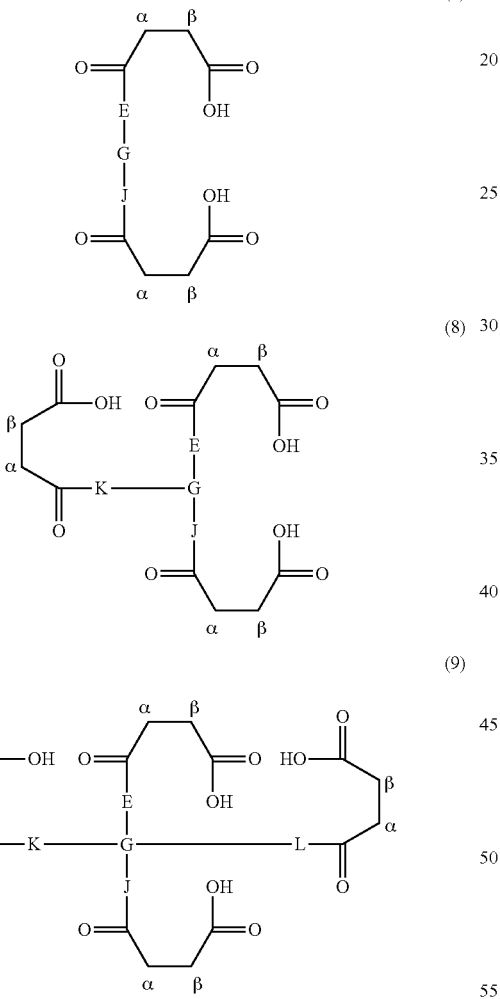

In the formulae (7) to (9), the substituents E, J, K, and L are each independently basically the same as the substituents E, J, K, and L in the above-described formulae (4) to (6), and the substituent G is basically the same as the substituent G in the above-described formula (4).

In addition, specific preferred examples of the structure represented by any one of the formulae (7) to (9) include compounds represented by the following formula (14) to (25):

[Chem. 14]

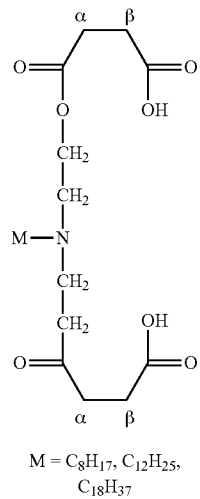

$M = C_8H_{17}, C_{12}H_{25}, C_{18}H_{37}$

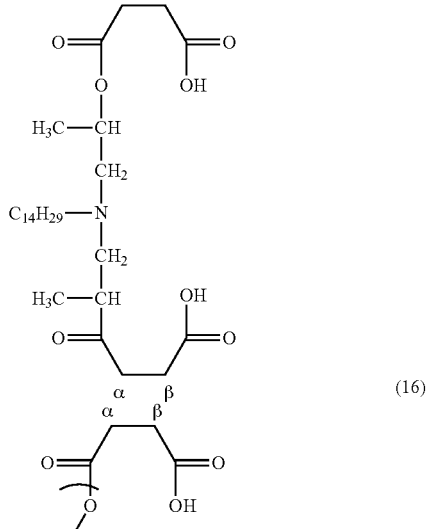

(In the formulae, l represents an integer of 1 or greater.)

[Chem. 15]
(18)
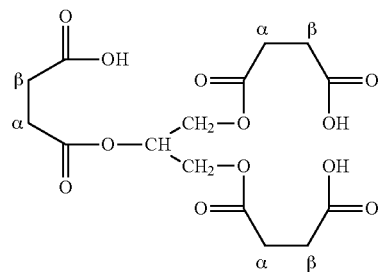
(19)
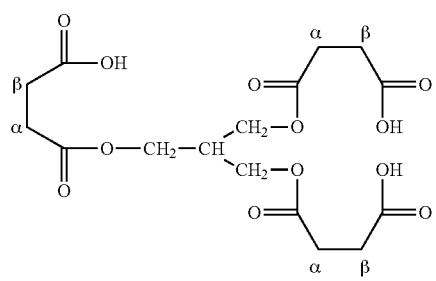
(20)
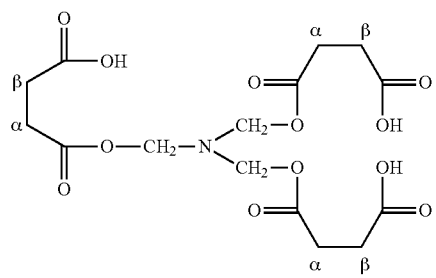
(21)
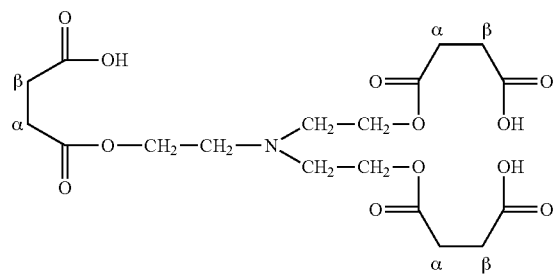
[Chem. 16]
(22)
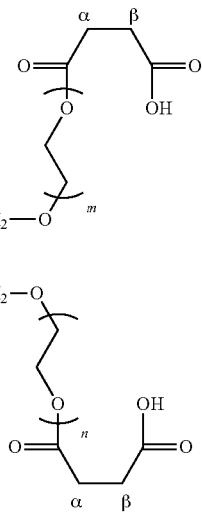
(23)
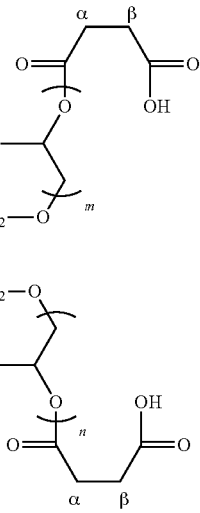
(In the formulae, l, m, and n each independently represent an integer of 1 or greater.)
[Chem. 17]
(24)

(25)

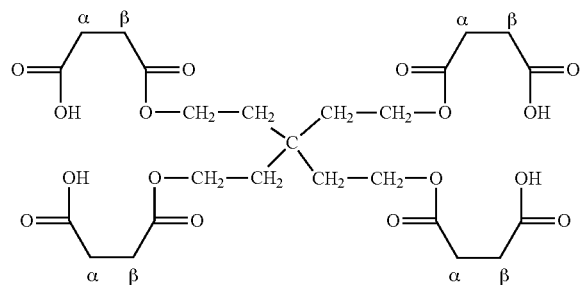

In addition, a cross-linkage at the above-described covalent-bond cross-linking moiety in each of the side chains (b) and (c) is preferably formed by a reaction of a cyclic acid anhydride group with a hydroxy group or an amino group and/or an imino group. For example, when a polymer forming a main chain portion after the reaction has a cyclic acid anhydride group (for example, a maleic anhydride group) as a functional group, the cross-linkage may be formed by a reaction of the cyclic acid anhydride group of the polymer with the compound that forms a covalent-bond cross-linking moiety having a hydroxy group or an amino group and/or an imino group (compound that forms a covalent bond), to form a moiety cross-linked by the covalent bond, thereby cross-linking polymer molecules.

In addition, in such side chains (b) and (c), the cross-linkage at the covalent-bond cross-linking moiety is more preferably formed by at least one bond selected from the group consisting of amide, ester, lactone, urethane, ether, thiourethane, and thioether.

Hereinabove, the side chain (a'), the side chain (a), the side chain (b), and the side chain (c) are described. The groups (structures) and the like of the side chains in the polymers can be identified by ordinarily used analytic techniques such as NMR and IR spectrometry.

In addition, the elastomeric polymer (A) is an elastomeric polymer having the side chain (a) and having a glass-transition point of 25° C. or below, whereas the elastomeric polymer (B) is an elastomeric polymer containing a hydrogen-bond cross-linkable moiety and a covalent-bond cross-linking moiety in a side chain and having a glass-transition point of 25° C. or below (a polymer having both the side chain (a') and the side chain (b) as side chains, or a polymer containing at least one side chain (c) in a side chain, or the like). As the elastomer component, one of the elastomeric polymers (A) and (B) may be used alone, or a mixture of two or more thereof may be used.

Note that the elastomeric polymer (B) may be either a polymer having both a side chain (a') and a side chain (b), or a polymer having a side chain (c). From the viewpoint that a stronger hydrogen bond is formed, the hydrogen-bond cross-linkable moiety contained in the side chain of the elastomeric polymer (B) is preferably a hydrogen-bond cross-linkable moiety having a carbonyl-containing group and/or a nitrogen-containing heterocycle (more preferably a hydrogen-bond cross-linkable moiety having a carbonyl-containing group and a nitrogen-containing heterocycle).

In addition, the at least one elastomer component selected from the group consisting of the elastomeric polymers (A) and (B) is preferably at least one selected from the group consisting of reaction products of a maleic anhydride-modified elastomeric polymer with at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, and polyether polyols. Note that examples of the maleic anhydride-modified elastomeric polymer include, but are not particularly limited to, known maleic anhydride-modified elastomeric polymers such as maleic anhydride-modified ethylene-propylene rubber, maleic anhydride-modified ethylene-butene rubber, maleic anhydride-modified isoprene rubber, maleic anhydride-modified polyethylene, and maleic anhydride-modified polypropylene.

A method for producing such an elastomeric polymer (A) or (B) is not particularly limited, and a known method can be employed, as appropriate, by which at least one selected from the group consisting of the side chain (a); the side chain (a') with the side chain (b); and the side chain (c) as described above can be introduced as a side chain of an elastomeric polymer having a glass-transition point of 25° C. or below. For example, as the method for producing the elastomeric polymer (B), it is also possible to employ a method described in Japanese Unexamined Patent Application Publication No. 2006-131663. In addition, to obtain the elastomeric polymer (B) comprising the side chain (a') and the side chain (b) as described above, for example, these side chains may be simultaneously introduced to an elastomeric polymer having a cyclic acid anhydride group (for example, a maleic anhydride group) serving as a functional group in a side chain by using a mixture (mixed raw material) of a compound that forms a covalent-bond cross-linking moiety upon a reaction with the cyclic acid anhydride group (a compound that forms a covalent bond) and a compound that forms a hydrogen-bond cross-linkable moiety upon a reaction with the cyclic acid anhydride group (a compound capable of introducing a nitrogen-containing heterocycle).

In addition, as a method for producing the elastomeric polymers (A) and (B), it is possible to employ, for example, a method in which an elastomeric polymer having a functional group (for example, a cyclic acid anhydride group or the like) in a side chain is used, and the elastomeric polymer is reacted with at least one raw material compound of a compound that forms a hydrogen-bond cross-linkable moiety upon a reaction with the functional group, and a mixed raw material of a compound that forms a hydrogen-bond cross-linkable moiety upon a reaction with the functional group and a compound that forms a covalent-bond cross-linking moiety upon a reaction with the functional group, to produce an elastomeric polymer having the side chain (a); an elastomeric polymer having the side chain (a') with the side chain (b); and/or an elastomeric polymer having the side chain (c) (the elastomeric polymers (A) and (B)). Note that conditions (temperature condition, atmosphere conditions, or the like) employed for the reaction are not particularly limited, and may be set, as appropriate, according to the types of the functional group and the compound to be reacted with the functional group (compound that forms a hydrogen-bond cross-linkable moiety and/or a compound that forms a covalent-bond cross-linking moiety). Note that the elastomeric polymer (A) may also be produced by polymerization of a monomer having a hydrogen bonding moiety.

The elastomeric polymer having such a functional group (for example, a cyclic acid anhydride group) in a side chain is preferably a polymer that can form a main chain of the above-described elastomeric polymers (A) and (B) and having a functional group in a side chain. Here, the "elastomeric polymer containing a functional group in a side chain" refers to an elastomeric polymer having a functional group (the above-described functional group or the like, for example, a cyclic acid anhydride group or the like) chemically stably bonded (covalently bonded) to an atom forming a main chain, and it is possible to preferably use one obtained by a reaction of an elastomeric polymer (for example, a known natural polymer or synthetic polymer) with a compound capable of introducing a functional group.

In addition, the functional group is preferably a functional group capable of forming at least one bond selected from the group consisting of amide, ester, lactone, urethane, ether, thiourethane, and thioether, among which a cyclic acid anhydride group, a hydroxy group, an amino group, a carboxy group, an isocyanate group, a thiol group, or the like is preferable. The functional group is particularly preferably a cyclic acid anhydride group, from the viewpoint that the clay can be dispersed more efficiently in the composition. In addition, the cyclic acid anhydride group is preferably a succinic anhydride group, a maleic anhydride group, a glutaric anhydride group, or a phthalic anhydride group.

Especially, a maleic anhydride group is more preferable, from the viewpoint that it can be easily introduced to a side chain of a polymer and can be easily obtained industrially. In addition, when the functional group is a cyclic acid anhydride group, the functional group may be introduced to the elastomeric polymer (for example, a known natural polymer or synthetic polymer) by using, for example, a cyclic acid anhydride such as succinic anhydride, maleic anhydride, glutaric anhydride, phthalic anhydride, and an derivative thereof, as a compound enabling the introduction of the functional group.

Note that the compound that forms a hydrogen-bond cross-linkable moiety upon a reaction with the functional group is not particularly limited, and it is preferable to use the above-described "compound that forms a hydrogen-bond cross-linkable moiety (a compound capable of introducing a nitrogen-containing heterocycle)." In addition, the compound that forms a covalent-bond cross-linking moiety upon a reaction with the functional group is not particularly limited, and it is preferable to use the above-described "compound that forms a covalent-bond cross-linking moiety (compound that forms a covalent bond)." Moreover, as the compound that forms a hydrogen-bond cross-linkable moiety (a compound capable of introducing a nitrogen-containing heterocycle) and the compound that forms a covalent-bond cross-linking moiety (a compound that forms a covalent bond), a compound that forms both a hydrogen-bond cross-linkable moiety and a covalent-bond cross-linking moiety upon a reaction with the functional group (for example, a polyol, polyamine, or polythiol containing a nitrogen-containing heterocycle, or the like) can also be used preferably.

In addition, when a method in which an elastomeric polymer having a side chain in a functional group (for example, cyclic acid anhydride group) is used, and the elastomeric polymer is reacted with at least one raw material compound of a compound that forms a hydrogen-bond cross-linkable moiety upon a reaction with the functional group, and a mixed raw material of a compound that forms a hydrogen-bond cross-linkable moiety upon a reaction with the functional group and a compound that forms a covalent-bond cross-linking moiety upon a reaction with the functional group, to produce the elastomeric polymer (A) having the side chain (a), or the elastomeric polymer (B) containing a hydrogen-bond cross-linkable moiety and a covalent-bond cross-linking moiety in a side chain is employed as a method for producing an elastomer component (elastomeric polymers (A) and (B)), it is possible to employ a method in which, before the reaction of the elastomeric polymer having a functional group in a side chain with the raw material compound, an clay is mixed with the elastomeric polymer having a functional group in a side chain, and then the raw material compound is added, followed by a reaction, to form the composition simultaneously with the preparation of the elastomer component (a method in which a clay is added first).

Note that because the dispersibility of the clay is further improved, and a higher level of tensile stress (modulus) can be obtained, it is preferable to prepare the composition simultaneously with the preparation of the elastomer component by employing the above-described method in which the clay is added first at the time of the production of the elastomer components (elastomeric polymers (A) and (B)). In addition, as the method in which the clay is added first, it is more preferable to employ a method for producing a thermoplastic elastomer composition of the present invention described later.

(Clay)

The clay according to the present invention is not particularly limited, and a known clay (viscosity mineral or the like) can be used, as appropriate. Examples of the clay include naturally occurring clays, synthetic clays, and organically modified clays.

Of these clays, at least one selected from the group consisting of clays mainly containing silicon and magnesium, and organically modified clays is preferable.

In addition, in the present invention, a clay mainly containing silicon and magnesium refers to a clay in which main components of metals in metal oxides serving as components of the clay are silicon (Si) and magnesium (Mg), and may contain other metal oxides (aluminum (Al), iron (Fe), and the like) as sub components. The clay mainly containing silicon and magnesium is not particularly limited, and a known one can be used, as appropriate. Because of its small particle diameter, the use of a clay mainly containing silicon and magnesium makes it possible to increase reinforcing properties. In addition, the clay mainly containing silicon and magnesium is preferably a clay having a smectite structure, from the viewpoint of the availability.

In addition, examples of the clay mainly containing silicon and magnesium include stevensite, hectorite, saponite, talc, and the like, among which stevensite, hectorite, or saponite is more preferably used from the viewpoint of the dispersibility.

In addition, the clay mainly containing silicon and magnesium is preferably a synthetic clay. As the synthetic clay, a commercially available one can also be used, and, for example, it is possible to use, as appropriate, one manufactured by KUNIMINE INDUSTRIES CO., LTD. under the trade name of "Sumecton SA" or "Sumecton ST," manufactured by Mizusawa Industrial Chemicals, Ltd. under the trade name of "IONITE," or manufactured by Co-Op Chemical Co., Ltd. under the trade name of "Lucentite," or the like.

In addition, the organically modified clay is preferably, but not particularly limited to, one formed by organically modifying a clay with an organically modifying agent. The clay before the organic modification is not particularly limited, and may be a so-called clay mineral. Examples thereof include montmorillonite, saponite, hectorite, beidellite, stevensite, nontronite, vermiculite, halloysite, mica, fluorinated mica, kaolinite, pyrophyllite, and the like. In addition, the clay may be a natural product or a synthetic product.

In addition, the organically modifying agent is not particularly limited, and a known organically modifying agent capable of organically modifying a clay can be used, as appropriate. For example, it is possible to use hexylammonium ions, octylammonium ions, 2-ethylhexylammonium ions, dodecylammonium ions, laurylammonium ions, octadecylammonium ions, dioctyldimethylammonium ions, trioctylammonium ions, dioctadecyldimethylammonium ions, trioctylammonium ions, dioctadecyldimethylammonium ions, trioctadecylammonium ions, or the like.

In addition, from the viewpoint of single-layer dispersibility, a quaternary ammonium salt of a clay can be used preferably as the organically modified clay. Examples of the quaternary ammonium salt of the organically modified clay which can be preferably used include, but are not particularly limited to, trimethylstearylammonium salts, salts of oleylbis(2-hydroxylethyl), methylammonium salts, dimethylstearylbenzylammonium salts, dimethyloctadecylammonium salts, and mixtures of two or more thereof. Note that as the quaternary ammonium salt of an organically modified clay, a dimethylstearylbenzylammonium salt, a dimethyloctadecylammonium salt, or a mixture thereof can be used more preferably, and a mixture of a dimethylstearylbenzylammonium salt and a dimethyloctadecylammonium salt can be used further preferably, from the viewpoint of improvement in tensile strength and heat resistance.

In addition, a commercially available one can be used as the organically modified clay, and, for example, those manufactured by KUNIMINE INDUSTRIES CO., LTD. under the trade name of "Kunfil-D36," "Kunfil-B1," "Kunfil-HY," and the like, as well as those manufactured by HOJUN Co., Ltd. under the trade name of "S-BEN series (C, E, W, WX, N-400, NX, NX80, NZ, NZ70, NE, NEZ, NO12S, and NO12," and "ORGANITE series (D, T), and the like, can be used, as appropriate. Among the commercially available organically modified clays, those manufactured by KUNIMINE INDUSTRIES CO., LTD. under the trade name of "Kunfil-D36" and manufactured by HOJUN Co., Ltd. under the trade name of "S-BEN series WX" can be used preferably.

As described above, the clay according to the present invention is preferably a clay mainly containing silicon and magnesium or an organically modified clay from the viewpoint of high dispersibility, and especially, an organically modified clay is particularly preferably used, because a higher level of tensile stress (modulus) can be obtained.

(Composition)

The thermoplastic elastomer composition of the present invention contains the elastomer component and the clay.

Note that although it is not exactly clear why the thermoplastic elastomer composition of the present invention can exhibit a sufficiently high level of tensile stress and a sufficiently high heat resistance, the present inventors speculate as follows. Specifically, first, the elastomer component in the present invention contains an elastomeric polymer containing a side chain having at least a hydrogen-bond cross-linkable moiety (a polymer containing at least one of the side chain (a); the side chain (a') with the side chain (b); and the side chain (c) in a side chain). For this reason, when such an elastomeric polymer is used in combination with a clay, interaction between the clay and hydrogen-bond cross-linkable moieties occurs (by the formation of new hydrogen bonds, or the like), so that the elastomer component undergoes plane cross-linking by utilizing the surface of the clay. The present inventors speculate that the formation of the plane cross-linking then makes it possible to suppress the stress concentration at cross-linking points, so that an extremely high level of tensile strength can be expressed, and a sufficiently high heat resistance stemming from the structure can be expressed. Note that, in the present invention, it is possible to retain flowability (formability) by the hydrogen bonds formed by hydrogen-bond cross-linkable moieties in side chains. In addition, a higher mechanical strength, sufficient self-repairing properties, and the like can also be expressed according to the constitution. Moreover, when an elastomer component containing a covalent-bond cross-linking moiety in a side chain is contained (for example, when the elastomeric polymer (B) is contained) in the present invention, the flowability of rubber molecule chains can be controlled by the side chain containing a covalent-bond cross-linking moiety. The present inventors speculate that, for this reason, resistance to compression set can also be expressed at a higher level, when an elastomer component containing a covalent-bond cross-linking moiety in a side chain (for example, elastomeric polymer (B)) is used. Moreover, when a hydrogen-bond cross-linkable moiety and a covalent-bond cross-linking moiety are present in the elastomer component (in a case where the elastomeric polymer (B) is contained, a case where a mixture of the elastomeric polymer (B) with another elastomeric polymer is contained, a case where a mixture of the elastomeric polymer (A) and the elastomeric polymer (B) is contained, a case where a mixture of the elastomeric polymer (A) with an elastomeric polymer having a side chain (b) other than the elastomeric polymer (B) is used, or the like), the suppression of flowing by covalent bonds (improvement in mechanical strength) during use and flowability (formability) by hydrogen bonds due to cleavage during heating can be expressed simultaneously because of the presence of the hydrogen-bond cross-linkable moiety and the covalent-bond cross-linking moiety. The present inventors speculate that, for this reason, properties suitable for the application can be exhibited, as appropriate, by changing, as appropriate, the constitution according to the type of the side chain.

Note that, the above-described elastomeric polymer having a side chain (b) other than the elastomeric polymer (B) can be obtained by a method in which an elastomeric polymer having a functional group (for example, cyclic acid anhydride group) in a side chain is used, and the elastomeric polymer is reacted with a compound that forms a covalent-bond cross-linking moiety upon a reaction with the functional group (compound that forms a covalent bond) to produce the elastomeric polymer having the side chain (b). Note that, also in this case, the above-described "compound that forms a covalent-bond cross-linking moiety (compound that forms a covalent bond)" can be used as the compound that forms a covalent-bond cross-linking moiety (compound that forms a covalent bond).

In addition, the thermoplastic elastomer composition of the present invention contains the elastomer component and the clay, wherein an amount of the clay contained is 20 parts by mass or less relative to 100 parts by mass of the elastomer component. If the amount of the clay contained exceeds the upper limit, the tensile properties decrease. The amount of the clay contained in the thermoplastic elastomer composition is more preferably 0.1 to 10 parts by mass, further preferably 0.5 to 5 parts by mass, and particularly preferably 1 to 3 parts by mass relative to 100 parts by mass of the elastomer component. If the amount of the clay contained is less than the lower limit, the amount of the clay contained is so small that a sufficient effect tends not to be obtained. Meanwhile, if the amount of the clay contained exceeds the upper limit, the cross-linking is so strong that the elongation and the strength tend to decrease rather, making it difficult to use the thermoplastic elastomer composition for various applications (deteriorating the practicability).

In addition, the clay is preferably such that the clay in a single-layer morphology (single-layered clay) be present in the composition. The presence of such a clay in the single-layered morphology can be confirmed by observing the surface of the composition under a transmission electron microscope (TEM).

Moreover, regarding the thermoplastic elastomer composition of the present invention, when randomly selected three or more measurement points in a size of 5.63 $\mu m^2$ on the surface of the thermoplastic elastomer composition are observed under a transmission electron microscope (TEM), 50% or more (more preferably 70% or more, further preferably 80 to 100%, and particularly preferably 85 to 100%) of all the clay based on the number is preferably present as the single-layered clay in all the measurement points. If the ratio of the single-layered clay present is less than the lower limit, the elongation at break and the strength at break tend to be lowered. Note that the ratio (proportion) of such a single-layered clay present can be determined as follows. Specifically, a transmission electron microscope (for example, one manufactured by JEOL Ltd. under the trade name of "JEM-2010") is used; 10 g of the thermoplastic elastomer composition is prepared as a sample; three or more measurement points in a size of 5.63 $\mu m^2$ on the surface of the thermoplastic elastomer composition are each observed; the number of the single-layered clay and the number of the multi-layered clay are determined in each TEM image obtained by such observation; the ratio (proportion) of the single-layered clay present relative to all the clay is calculated for each of the measurement points (each of the TEM images) based on these numbers to determine the above-described ratio. Note that the interlayer distance of montmorillonite having a multi-layered structure before taking the single-layer morphology is about 9.8 angstrom, whereas the interlayer distances of ordinary organically modified clays are about 20 to 40 angstrom (2 to 4 nm). In addition, when an ordinary organically modified clay is dispersed in an organic solvent and single-layers are formed, the interlayer distance thereof is 50 angstrom (>5 nm) or more. Hence, layers may be determined as single-layers based on the fact that the interlayer distance of layers observed in a TEM image is wider than such an interlayer distance. As described above, layers may be determined to be in a single-layer state, for example, based on the fact that the intervals of the layers are 5 nm or more, and, in some cases, layers may be determined to be in a single-layer state based on the fact that the layers have intervals of several tens of nanometers or more, although it depends on the type of the clay.

Note that, in a case where the single-layered clay is contained at the above-described proportion (the ratio of presence) in the composition, the clay take a state of being contained more dispersedly than in a case where a multi-layered clay is directly dispersed (this is because the multi-layered clay is decomposed to form a single-layered clay), and hence the clay can be dispersed in the composition with a higher dispersibility. Note that when the clay is multi-layered in the composition, the clay may work as a foreign substance depending on the dispersing state or the like, making it difficult to obtain a higher level of tensile strength than that in the case of the single-layered clay. For this reason, the clay in a single-layer state is preferably contained at the above-described ratio, and this causes the clay to be more dispersed, making it possible to efficiently improve the mechanical strength. In addition, a method for causing the single-layered clay to be contained at the above-described proportion (the ratio of presence) is not particularly limited, and the single-layered clay can be contained at the above-described ratio more efficiently by employing the method for producing a thermoplastic elastomer composition of the present invention described later to produce a thermoplastic elastomer composition.

In addition, the thermoplastic elastomer composition of the present invention is preferably such that when randomly selected three or more measurement points in a size of 5.63 $\mu m^2$ on the surface of the thermoplastic elastomer composition are observed under a transmission electron microscope, 1 to 100 (more preferably 3 to 80, and further preferably 5 to 50) be dispersed per $\mu m^2$ in all the measurement points. If the number of single layers of the clay is less than the lower limit, the amount of the clay is so small that a sufficient effect tends not to be obtained. Note that the number of the single layers of the clay can be determined by obtaining a TEM image by the same method as that for measuring the ratio of presence (proportion) of the single-layered clay.

When the thermoplastic elastomer composition of the present invention is a thermoplastic elastomer composition containing the elastomeric polymer (A) as an elastomer component, properties stemming from the side chain (a) can be provided into the composition, so that, especially, the elongation at break, the strength at break, and the flowability can be improved. Meanwhile, the thermoplastic elastomer composition containing an elastomeric polymer (B) as an elastomer component makes it possible to improve especially the compression set, because properties stemming from the covalent-bond cross-linking moiety in the side chain can be provided into the composition. Note that the thermoplastic elastomer composition containing the elastomeric polymer (B) as an elastomer component can also exhibit resistance to compression set, while retaining flowability (formability), and can also exhibit more efficiently desired properties according to the application by changing, as appropriate, the type of the side chain, the type of the polymer (B), or the like, because not only properties stemming from the covalent-bond cross-linking moiety, but also properties stemming from the hydrogen-bond cross-linkable moiety (the hydrogen-bond cross-linkable moiety described for the side chain (a')) can be provided into the composition.

In addition, regarding the thermoplastic elastomer composition of the present invention, the thermoplastic elastomer composition containing the elastomeric polymer (A) as an elastomer component and the thermoplastic elastomer composition containing the elastomeric polymer (B) as an elastomer component may be produced separately, and then mixed with each other to prepare a thermoplastic elastomer composition containing the elastomeric polymers (A) and (B) as elastomer components. In addition, in the present invention, it is only necessary that at least the elastomeric polymers (A) and (B) be contained as the elastomer component. From the viewpoint of utilizing properties of covalent-bond cross-linking moieties more efficiently by causing a covalent-bond cross-linking moiety to be present in the composition, an additional elastomeric polymer having a side chain (b) other than the elastomeric polymer (B) may be mixed for use. For example, when an additional elastomeric polymer having a side chain (b) other than the elastomeric polymer (B) is used in combination in a case where the elastomeric polymer (A) is used as an elastomer component, it is also possible to provide, owing to the side chains contained in the composition, substantially the same properties as those of a thermoplastic elastomer composition utilizing the elastomeric polymer (B) containing a hydrogen-bond cross-linkable moiety and a covalent-bond cross-linking moiety in a side chain. In addition, when the thermoplastic elastomer composition containing the elastomeric polymers (A) and (B) as elastomer components is produced, or when a thermoplastic elastomer composition containing the elastomeric polymer (A) and the additional elastomeric polymer having a side chain (b) other than the elastomeric polymer (B) is produced, desired properties can also be exhibited, as appropriate, by changing, as appropriate, the ratio of these components (for example, the components including the elastomeric polymer (A) and the elastomeric polymer (B)).

In addition, when the thermoplastic elastomer composition of the present invention contains the elastomeric polymers (A) and (B) as elastomer components, the content ratio of the elastomeric polymer (A) to the elastomeric polymer (B) is preferably 1:9 to 9:1, and more preferably 2:8 to 8:2 in terms of the mass ratio ([polymer (A)]:[polymer (B)]). If the content ratio of the polymer (A) is less than the lower limit, the flowability (formability) and the mechanical strength tend to be insufficient. Meanwhile, if the content ratio of the polymer (A) exceeds the upper limit, the compression set tends to decrease.

Moreover, when the thermoplastic elastomer composition of the present invention contains the elastomeric polymer (A) and an additional elastomeric polymer having a side chain (b) other than the elastomeric polymer (B) (hereinafter, sometimes referred to as "elastomeric polymer (C)") as elastomer components, the content ratio of the elastomeric polymer (A) to the elastomeric polymer (C) is preferably 1:9 to 9:1, and more preferably 2:8 to 8:2 in terms of mass ratio ([elastomeric polymer (A)]:[elastomeric polymer (C)]). If the content ratio of the polymer (A) is less than the lower limit, the flowability (formability) and the mechanical strength tend to be insufficient. Meanwhile, if the content ratio of the polymer (A) exceeds the upper limit, the compression set tends to decrease.

In addition, regarding the thermoplastic elastomer composition of the present invention, when both the side chain (a') and the side chain (b) are present in the composition, the total amount of the side chain (a') and the total amount of the side chain (b) are preferably 1:9 to 9:1, and more preferably 2:8 to 8:2 based on the mass ratio. If the total amount of the side chain (a') is less than the lower limit, the flowability (formability) and the mechanical strength tend to be insufficient. Meanwhile, if the total amount of the side chain (a') exceeds the upper limit, the compression set tends to decrease. Note that such a side chain (a') is a concept including the side chain (a). For this reason, also when only the side chain (a) is contained as the side chain (a'), it is preferable that both the side chain (a) and the side chain (b) be present in the composition at the above-described mass ratio.

If necessary, the thermoplastic elastomer composition of the present invention can contain various additives such as polymers other than the elastomer components, reinforcing agents (bulking agents), hydrogen bond-reinforcing agents (bulking agents), bulking agents to which an amino group is introduced (hereinafter, simply referred to as "amino group-introduced bulking agent"), amino group-containing compounds other than the amino group-introduced bulking agents, metal element-containing compounds (hereinafter, simply referred to as "metal salts"), maleic anhydride-modified polymers, anti-aging agents, antioxidants, pigments (dyes), plasticizers, thixotropy-imparting agents, ultraviolet absorbers, flame retardants, solvents, surfactants (including leveling agents), dispersing agents, dehydrating agents, corrosion inhibitors, tackiness agents, antistats, and fillers; and the like, unless the object of the present invention is not impaired. These additives or the like are not particularly limited, and commonly used ones (known ones) can be used, as appropriate. For example, anti-aging agents, antioxidants, pigments (dyes), and plasticizers described below can be used, as appropriate.

As the polymers other than the elastomer components, other elastomeric polymers having a side chain (b) other than the elastomeric polymer (B) can be used preferably.

Meanwhile, examples of the reinforcing agents (bulking agents) include carbon black, silica, calcium carbonate, and the like. As the silica, Wet-process silica is preferably used.

As the anti-aging agents, for example, hindered phenol-based compounds, aliphatic and aromatic hindered amine-based compounds, and other compounds can be used, as appropriate. In addition, as the antioxidants, for example, butylhydroxytoluene (BHT), butylhydroxyanisole (BHA), and the like can be used, as appropriate. Meanwhile, as the pigments, for example, inorganic pigments such titanium dioxide, zinc oxide, ultramarine, red iron oxide, lithopone, lead, cadmium, iron, cobalt, aluminum, hydrochloric acid salts, and sulfuric acid salts, organic pigments such as azo pigments and copper phthalocyanine pigments, and the like can be used, as appropriate.

Meanwhile, as the plasticizers, for example, derivatives of benzoic acid, phthalic acid, trimellitic acid, pyromellitic acid, adipic acid, sebacic acid, fumaric acid, maleic acid, itaconic acid, citric acid, and the like, as well as polyester, polyether, or epoxy-based plasticizers, and the like can be used, as appropriate. Note that, as the additives and the like, those listed as examples in Japanese Unexamined Patent Application Publication No. 2006-131663 may also be used, as appropriate.

Note that when the thermoplastic elastomer composition of the present invention contains additional components (for example, the above-described additives or the like) other than the elastomer component and the clay, the amount of the additional components contained is not particularly limited. Regarding the polymers and the reinforcing materials (bulking agents), the amount is preferably 300 parts by mass or less, and more preferably 20 to 200 parts by mass, relative to 100 parts by mass of the elastomer component. If the amount of the additional components contained is less than the lower limit, the effect of the use of the additional components tends to be expressed insufficiently. Meanwhile, if the amount exceeds the upper limit, the effect of the elastomer serving as a substrate tends to be less influential, so that physical properties tend to be lowered, although it depends on the type of the components used.

In addition, when the above-described additional components are the other additives (when the above-described additional components are other than the polymers and the reinforcing materials (bulking agents)), the amount of the additional components contained is preferably 20 parts by mass or less, and more preferably 0.1 to 10 parts by mass relative to 100 parts by mass of the elastomer component. If the amount of the additional components contained is less than the lower limit, the effect of the use of the additional components tends to be expressed insufficiently. Meanwhile, if the amount of the additional components contained exceeds the upper limit, the additional components adversely affect the reaction of the elastomer serving as a substrate, so that physical properties tend to be lowered rather.

When the thermoplastic elastomer composition of the present invention is heated (for example, heated to 100 to 250° C.), dissociation of hydrogen bonds formed at the hydrogen-bond cross-linkable moieties and other cross-linking structures and the like occur, so that the thermoplastic elastomer composition softens to provide flowability. This is presumably because the heating weakens the interaction (interaction mainly by hydrogen bonds) between side chains created intermolecularly or intramolecularly. Note that an elastomer component containing at least a hydrogen-bond cross-linkable moiety in a side chain is contained in the present invention. Hence, when the flowability is provided by the heating, and then the thermoplastic elastomer composition is left, the dissociated hydrogen bonds again form the bonds to harden the thermoplastic elastomer composition. Hence, it is also possible to cause the thermoplastic elastomer composition to express recyclability more efficiently depending on the constitution.

The thermoplastic elastomer composition of the present invention can be used for, for example, various rubber applications by utilizing the rubber elasticity. The use of the thermoplastic elastomer composition of the present invention as a hot-melt adhesive or an additive contained in a hot-melt adhesive is preferable, because the heat resistance and the recyclability can be improved. The thermoplastic elastomer composition of the present invention can be used preferably for applications such as automotive rubber components, hoses, belts, sheets, antivibration rubbers, rollers, lining, rubber-lined cloth, sealing materials, gloves, fenders, rubbers for medical applications (syringe gaskets, tubes, catheters), gaskets (for home appliances and for architectural applications), asphalt modifiers, hot-melt adhesives, boots, grips, toys, shoes, sandals, keypads, gears, PET bottle cap liners, and the like.

Specific examples of the above-described automotive rubber components include tire portions such as tread, carcass, sidewall, inner-liner, under-tread, and belt portions of tires; radiator grilles, side molding, garnishes (pillar, rear, and cowl top), aero parts (airdams and spoilers), wheel covers, weather strips, cowbelt grilles, air outlet louvers, air scoops, hood bulges, parts of ventilation ports, barrier parts (overfenders, side-seal panels, molding (window, hood, and door belt)), marks in the exterior; parts for interiors and window frames such as weather strips for doors, lights, and wipers, glass runs, and glass run channels; air duct hoses, radiator hoses, and brake hoses; parts for lubricating oil systems such as crankshaft seals, valve stem seals, head cover gaskets, A/T oil cooler hoses, transmission oil seals, P/S hoses, and P/S oil seals; parts for fuel systems such as fuel hoses, emission control hoses, inlet filler hoses, and diaphragms; antivibration parts such as engine mounts and in-tank pump mounts; boots such as CVJ boots and rack and pinion boots; air conditioning parts such as A/C hoses and A/C seals; parts for belts such as timing belts and belts for auxiliaries; sealers such as windshield sealers, vinyl plastisol sealers, anaerobic sealers, body sealers, and spot weld sealers; and the like.

In addition, when the thermoplastic elastomer composition of the present invention is contained as a rubber modifier, for example, an anti-flowing agent in a resin or rubber that undergoes cold flow at room temperature, the flow during extrusion and cold flow can be prevented.

The thermoplastic elastomer composition of the present invention can exhibit a sufficiently high level of tensile stress and a sufficiently high heat resistance. Note that it is possible to cause the thermoplastic elastomer composition to exhibit properties necessary for the application (for example, properties such as self-repairing properties and/or resistance to compression set), as appropriate, by changing the constitution, as appropriate. Specifically, the thermoplastic elastomer composition of the present invention can exhibit a sufficiently high level of tensile stress and a sufficiently high heat resistance, and can additionally exhibit sufficient resistance to compression set and/or sufficient self-repairing properties according to the constitution. Changing the constitution, as appropriate, as described above makes it possible to cause the thermoplastic elastomer composition to exhibit, as appropriate, properties required for the application of the thermoplastic elastomer composition in a balanced manner. Hence, when the thermoplastic elastomer composition is used for any of the above-described various applications, it is preferable to use the thermoplastic elastomer composition, with the types of components (constitution) in the composition being changed, as appropriate, considering the properties necessary for the application.

Hereinabove, the thermoplastic elastomer composition of the present invention is described. Next, a method for producing a thermoplastic elastomer composition of the present invention is described below, which can be preferably used as a method for producing the above-described thermoplastic elastomer composition of the present invention.

[Method for Producing Thermoplastic Elastomer Composition]

A method for producing a thermoplastic elastomer composition of the present invention comprises:

a first step of mixing a clay into an elastomeric polymer having a cyclic acid anhydride group in a side chain to obtain a mixture; and a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining the thermoplastic elastomer composition, wherein the thermoplastic elastomer composition comprises:

at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; and a clay, and in the first step, the clay is mixed into the elastomeric polymer having a cyclic acid anhydride group in a side chain at such a ratio that the amount of the clay contained in the thermoplastic elastomer composition is 20 parts by mass or less relative to 100 parts by mass of the elastomer component. The first step and the second step are described separately below.

(First Step)

The first step is a step of mixing a clay into an elastomeric polymer having a cyclic acid anhydride group in a side chain to obtain a mixture.

Here, the "elastomeric polymer having a cyclic acid anhydride group in a side chain" refers to an elastomeric polymer in which a cyclic acid anhydride group is chemically stably bonded (covalently bonded) to an atom forming the main chain of the polymer. For example, it is preferable to use a product obtained by a reaction of a polymer that can form a main chain portion of the elastomeric polymer (A) or (B) with a compound capable of introducing a cyclic acid anhydride group.

Note that the polymer that can form a main chain portion is not particularly limited, as long as the polymer is generally a natural polymer or synthetic polymer having a glass-transition point of room temperature (25° C.) or lower (as long as the polymer is a so-called elastomer).

Examples of the polymers that can form the main chain portions of the elastomeric polymers (A) and (B) include diene-based rubbers such as natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (IIR), and ethylene-propylene-diene rubber (EPDM), and hydrogenated products thereof; olefin-based rubbers such as ethylene-propylene rubber (EPM), ethylene-acrylic rubber (AEM), ethylene-butene rubber (EBM), chlorosulfonated polyethylene, acrylic rubber, fluororubber, polyethylene rubber, and polypropylene rubber; epichlorohydrin rubber; polysulfide rubber; silicone rubber; urethane rubber; and the like.

In addition, the polymer that can form the main chain portion of the elastomeric polymer (A) or (B) may also be an elastomeric polymer containing a resin component, and examples thereof include optionally hydrogenated polystyrene-based elastomeric polymers (for example, SBS, SIS, SEBS, and the like), polyolefin-based elastomeric polymers, polyvinyl chloride-based elastomeric polymers, polyurethane-based elastomeric polymers, polyester-based elastomeric polymers, polyamide-based elastomeric polymers, and the like.

Moreover, the polymer that can form the main chain portion of the elastomeric polymer (A) or (B) preferably comprises at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers. In addition, the polymer is preferably a diene-based rubber from the viewpoints of the ease of introduction of a maleic anhydride group preferred as the cyclic acid anhydride group, and the like, and is preferably an olefin-based rubber from the viewpoint of anti-ageing properties.

Meanwhile, examples of the compound capable of introducing a cyclic acid anhydride group include cyclic acid anhydrides such as succinic anhydride, maleic anhydride, glutaric anhydride, phthalic anhydride, and derivatives thereof.

In addition, the cyclic acid anhydride group of the elastomeric polymer having a cyclic acid anhydride group in a side chain used in the first step is preferably a succinic anhydride group, a maleic anhydride group, a glutaric anhydride group, or a phthalic anhydride group. Especially, a maleic anhydride group is more preferable, from the viewpoints that the raw material has high reactivity and further the raw material is industrially readily available.

Moreover, the elastomeric polymer having a cyclic acid anhydride group in a side chain used in the first step may be produced by a commonly used method, for example, by a method of graft polymerization of a cyclic acid anhydride onto a polymer that can form the main chain portion of the elastomeric polymer (A) or (B) under commonly employed conditions, for example, by stirring under heating or the like. In addition, it is also possible to use a commercially available product as the elastomeric polymer having a cyclic acid anhydride group in a side chain used in the first step.

Examples of commercially available products of the elastomeric polymer having a cyclic acid anhydride group in a side chain include maleic anhydride-modified isoprene rubbers such as LIR-403 (manufactured by KURARAY CO., LTD.) and LIR-410A (prototype provided by KURARAY CO., LTD.); modified isoprene rubbers such as LIR-410 (manufactured by KURARAY CO., LTD.); carboxy-modified nitrile rubbers such as Krynac 110, 221, and 231 (manufactured by Polysar Rubber Corporation); carboxy-modified polybutenes such as CPIB (manufactured by Nippon Petrochemicals Co., Ltd.) and HRPIB (prototype provided by the laboratory of Nippon Petrochemicals Co., Ltd.); maleic anhydride-modified ethylene-propylene rubbers such as Nucrel (manufactured by DUPONT-MITSUI POLYCHEMICALS CO., LTD), Yukaron (manufactured by Mitsubishi Chemical Corporation), TAFMER M (for example, MP0610 (manufactured by Mitsui Chemicals, Inc.), and MP0620 (manufactured by Mitsui Chemicals, Inc.)); maleic anhydride-modified ethylene-butene rubbers such as TAFMER M (for example, MA8510, MH7010, MH7020 (manufactured by Mitsui Chemicals, Inc.), MH5010, MH5020 (manufactured by Mitsui Chemicals, Inc.), and MH5040 (manufactured by Mitsui Chemicals, Inc.)); maleic anhydride-modified polyethylenes such as Adtex series (maleic anhydride-modified EVA, maleic anhydride-modified EMA (manufactured by Japan Polypropylene Corporation)), HPR series (maleic anhydride-modified EEA, maleic anhydride-modified EVA (manufactured by DuPont-Mitsui Polyolefin)), Bondfast series (maleic anhydride-modified EMA (manufactured by Sumitomo Chemical Company, Limited)), Dumilan series (maleic anhydride-modified EVOH (manufactured by Takeda Pharmaceutical Company Limited) Bondine (ethylene-acrylic acid ester-maleic anhydride ternary copolymer (manufactured by ATOFINA)), Tuftec (maleic anhydride-modified SEBS, M1943 (manufactured by Asahi Kasei Corporation)), Kraton (maleic anhydride-modified SEBS, FG1901, FG1924 (manufactured by Kraton Polymers)), Tufprene (maleic anhydride-modified SBS, 912 (manufactured by Asahi Kasei Corporation)), Septon (maleic anhydride-modified SEPS (manufactured by KURARAY CO., LTD.)), Rexpearl (maleic anhydride-modified EVA, ET-182G, 224M, 234M (manufactured by Japan Polypropylene Corporation)), and Auroren (maleic anhydride-modified EVA, 200S, 250S (manufactured by NIPPON PAPER Chemicals CO., LTD.)); maleic anhydride-modified polypropylenes such as ADMER (for example, QB550, LF128 (manufactured by Mitsui Chemicals, Inc.)); and the like.

In addition, the elastomeric polymer having a cyclic acid anhydride group in a side chain is preferably a maleic anhydride-modified elastomeric polymer. The maleic anhydride-modified elastomeric polymer is not particularly limited, and, for example, it is possible to use, as appropriate, a known maleic anhydride-modified elastomeric polymer such as maleic anhydride-modified ethylene-propylene rubber, maleic anhydride-modified ethylene-butene rubber, maleic anhydride-modified isoprene rubber, maleic anhydride-modified polyethylene, or maleic anhydride-modified polypropylene. Meanwhile, from the viewpoints of high molecular weight and high strength, the elastomeric polymer having a cyclic acid anhydride group in a side chain is more preferably a maleic anhydride-modified ethylene-propylene rubber, or a maleic anhydride-modified ethylene-butene rubber.

Moreover, the same clay described for the above-described thermoplastic elastomer composition of the present invention can be used preferably as the clay used in the first step.

In the first step, the clay is mixed into the elastomeric polymer having a cyclic acid anhydride group in a side chain to obtain a mixture. In the mixture preparation step, the clay is mixed into the elastomeric polymer having a cyclic acid anhydride group in a side chain preferably at such a ratio that the amount of the clay contained in the finally obtained thermoplastic elastomer composition can be 20 parts by mass or less (more preferably 0.1 to 10 parts by mass, further preferably 0.5 to 5 parts by mass, and particularly preferably 1 to 3 parts by mass) relative to 100 parts by mass of the elastomer component. If the amount of the clay contained exceeds the upper limit, the cross-linking is so strong that the elongation and the strength tend to be lowered rather. On the other hand, if the amount of the clay contained is less than the lower limit, the amount of the clay is so small that the effect obtained by using the clay tends to be lowered.

In addition, the amount of the clay contained in the mixture is preferably 20 parts by mass or less, more preferably 0.5 to 5 parts by mass, and further preferably 1 to 3 parts by mass, relative to 100 parts by mass of the elastomeric polymer having a cyclic acid anhydride group in a side chain. If the content is less than the lower limit, the amount of the clay is so small that the effect obtained by using the clay tends to be lowered. Meanwhile, if the content exceeds the upper limit, the cross-linking is so strong that the elongation and the strength tend to be lowered rather. Note that when the clay is used at such a content, the amount of the clay contained in the finally obtained thermoplastic elastomer composition takes a value within the above-described range.

Moreover, the amount of the clay used for forming such a mixture is preferably such that the clay be contained at such a ratio that the amount of the clay is 0.01 g to 2.0 g (more preferably 0.02 to 1.0 g) per millimole of the cyclic acid anhydride group in the elastomeric polymer having a cyclic acid anhydride group in a side chain. If the ratio of the clay to the acid anhydride group is less than the lower limit, the amount is so small that the effect tends to be lowered. Meanwhile, if the ratio exceeds the upper limit, the cross-linking is so strong that the elongation and the strength tend to be lowered rather. Note that when the clay is contained within such a range of ratio, the clay introduced into the mixture is efficiently decomposed, so that the single-layered clay tends to be produced efficiently, and the dispersibility of the clay tends to be higher.

In addition, when the clay is added to obtain the mixture, it is preferable to add the clay after the elastomeric polymer having a cyclic acid anhydride group in a side chain is plasticized to make the clay sufficiently dispersed. In addition, a method for plasticizing an elastomeric polymer having a cyclic acid anhydride group in a side chain as described above is not particularly limited, and it is possible to employ, as appropriate, a method of mastication using rolls, a kneader, an extruder, an all-purpose mixer, or the like at a temperature which allows the plasticization (for example, about 100 to 250° C.), or the like. The conditions such as temperature for performing the plasticization of the elastomeric polymer having a cyclic acid anhydride group in a side chain are not particularly limited, and may be set, as appropriate, according to the type of the elastomeric polymer having a cyclic acid anhydride group in a side chain.

In addition, a mixing method to obtain the mixture is not particularly limited, as long as the clay is mixed to be sufficiently dispersed, and a known method or the like can be employed, as appropriate. For example, a method can be employed in which the clay is mixed with rolls, a kneader, an extruder, an all-purpose mixer, or the like.

Note that, unless the object of the present invention is impaired, the mixture can contain additional components including various additives such as polymers other than the above-described elastomer components, reinforcing agents (bulking agents), bulking agents to which an amino group is introduced (hereinafter, simply referred to as "amino group-introduced bulking agents"), amino group-containing compounds other than the amino group-introduced bulking agents, metal element-containing compounds (hereinafter, simply referred to as "metal salts"), maleic anhydride-modified polymers, anti-aging agents, antioxidants, pigments (dyes), plasticizers, thixotropy-imparting agents, ultraviolet absorbers, flame retardants, solvents, surfactants (including leveling agents), dispersing agents, dehydrating agents, corrosion inhibitors, tackiness agents, antistats, fillers, and the like. These additives or the like are not particularly limited, and commonly used ones can be used, as appropriate.

The amount of such additional components contained is preferably 500 parts by mass or less, and more preferably 20 to 400 parts by mass relative to 100 parts by mass of the elastomer component, when the additional components are polymers and reinforcing materials (bulking agents). If the amount of the additional components contained is less than the lower limit, the effect of the use of the additional components tends to be expressed insufficiently. Meanwhile, if the amount contained exceeds the upper limit, the effect of the elastomer serving as the substrate tends to be less influential, so that physical properties tend to be lowered, although it depends on the types of the components used.

Meanwhile, when the additional components are the other additives (when the additional components are other than the polymers and reinforcing materials (bulking agents)), the amount of the additional components contained is preferably 20 parts by mass or less, and more preferably 0.1 to 10 parts by mass relative to 100 parts by mass of the elastomer component. If the amount of the additional components contained is less than the lower limit, the effect of the use of the additional components tends to be expressed insufficiently. Meanwhile, if the amount of the additional components contained exceeds the upper limit, the reaction of the elastomer serving as the substrate is adversely affected, so that physical properties tend to be lowered rather.

(Second Step)

The second step is a step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining the thermoplastic elastomer composition.

As the compound (I) that forms a hydrogen-bond cross-linkable moiety upon a reaction with the cyclic acid anhydride group, the same compound as the compound that forms a hydrogen-bond cross-linkable moiety (the compound capable of introducing a nitrogen-containing heterocycle) described for the above-described thermoplastic elastomer composition of the present invention can be used preferably. For example, the compound (I) may be the nitrogen-containing heterocycle described for the above-described thermoplastic elastomer composition of the present invention itself, or may be a compound in which a substituent (for example, a hydroxy group, a thiol group, an amino group, or the like) that reacts with a cyclic acid anhydride group of maleic anhydride or the like is bonded to the above-described nitrogen-containing heterocycle (a nitrogen-containing heterocycle having the above-described substituent). Note that, as the compound (I), a compound that forms both a hydrogen-bond cross-linkable moiety and a covalent-bond cross-linking moiety (a compound capable of simultaneously introducing both a hydrogen-bond cross-linkable moiety and a covalent-bond cross-linking moiety) may be used (note that a side chain having both a hydrogen-bond cross-linkable moiety and a covalent-bond cross-linking moiety can be considered as a preferred mode of the side chain having a hydrogen-bond cross-linkable moiety).

In addition, the compound (I) is not particularly limited, and it is possible to select and use, as appropriate, a preferred compound among the above-described compounds (I) according to the type of the side chain (the side chain (a) or the side chain (a')) in the target polymer. The compound (I) is preferably triazole, pyridine, thiadiazole, imidazole, isocyanurate, triazine, and hydantoins optionally having at least one substituent selected from hydroxy groups, thiol groups, and amino groups, more preferably triazole, pyridine, thiadiazole, imidazole, isocyanurate, triazine, and hydantoin having the above-described substituent, further preferably triazole, isocyanurate, or triazine having the above-described substituent, and particularly preferably triazole having the above-described substituent from the viewpoint that a higher reactivity can be obtained. Note that examples of the triazole, pyridine, thiadiazole, imidazole, and hydantoin optionally having the substituents include 4H-3-amino-1,2,4-triazole, aminopyridine, aminoimidazole, aminotriazine, aminoisocyanurate, hydroxypyridine, hydroxyethyl isocyanurate, and the like.

Meanwhile, as the compound (II) that forms a covalent-bond cross-linking moiety upon a reaction with the cyclic acid anhydride group, a compound which is the same as the "compound that forms a covalent-bond cross-linking moiety (the compound that forms a covalent bond)" described for the above-described thermoplastic elastomer composition of the present invention can be used preferably (compounds preferred as the compound (II) are also the same). In addition, as the compound (II), a compound that forms both a hydrogen-bond cross-linkable moiety and a covalent-bond cross-linking moiety (a compound capable of simultaneously introducing both a hydrogen-bond cross-linkable moiety and a covalent-bond cross-linking moiety) may also be used (note that a side chain having both a hydrogen-bond cross-linkable moiety and a covalent-bond cross-linking moiety can be considered as a preferred mode of the side chain having a covalent-bond cross-linking moiety).

The compound (II) is preferably tris(hydroxyethyl) isocyanurate, sulfamide, or polyether polyol, more preferably tris(hydroxyethyl) isocyanurate or sulfamide, and further preferably tris(hydroxyethyl) isocyanurate, from the viewpoint of resistance to compression set.

Accordingly, the raw material compound comprising at least one of the compound (I), and the mixed raw material of the compound (I) and the compound (II) is preferably at least one compound selected from triazoles optionally having at least one substituent selected from hydroxy groups, thiol groups, and amino groups; pyridines optionally having at least one substituent selected from hydroxy groups, thiol groups, and amino groups; thiadiazoles optionally having at least one substituent selected from hydroxy groups, thiol groups, and amino groups; imidazoles optionally having at least one substituent selected from hydroxy groups, thiol groups, and amino groups; isocyanurates optionally having at least one substituent selected from hydroxy groups, thiol groups, and amino groups; triazines optionally having at least one substituent selected from hydroxy groups, thiol groups, and amino groups; hydantoins optionally having at least one substituent selected from hydroxy groups, thiol groups, and amino groups; tris(hydroxyethyl) isocyanurate; sulfamides; and polyether polyols.

In addition, as the compound (I) and/or (II), it is preferable to use a compound that reacts with the cyclic acid anhydride group to form both a hydrogen-bond cross-linkable moiety and a covalent-bond cross-linking moiety (a compound capable of simultaneously introducing both a hydrogen-bond cross-linkable moiety and a covalent-bond cross-linking moiety), because both a hydrogen-bond cross-linkable moiety and a covalent-bond cross-linking moiety can be introduced into the composition more efficiently. As the compound that forms both a hydrogen-bond cross-linkable moiety and a covalent-bond cross-linking moiety, the above-described heterocycle-containing polyol, the above-described heterocycle-containing polyamine, or the above-described heterocycle-containing polythiol can be used preferably, of which tris(hydroxyethyl) isocyanurate is particularly preferable.

In addition, the amount of the compound (I) and the compound (II) added (the total amount thereof: when only one compound is used, the amount of the one compound) is not particularly limited. In a case where active hydrogen of an amine, an alcohol, or the like is contained in the compound, the amount of the compound (I) and the compound (II) is such that the resulting amount of the active hydrogen of an amine, an alcohol, or the like in the compound is preferably 20 to 250% by mole, more preferably 50 to 150% by mole, and further preferably 80 to 120% by mole relative to 100% by mole of the cyclic acid anhydride group. If the amount added is less than the lower limit, the amount of the side chain introduced is reduced, making it difficult to obtain a sufficiently high level of cross-linking density, so that physical properties such as tensile strength tend to be lowered. Meanwhile, if the amount added exceeds the upper limit, the amount of the compound used is so large that many branches tends to be formed, and the cross-linking density tends to be rather lowered.

In addition, regarding the amount of the compound (I) and the compound (II) added, the total amount thereof (when only one compound is used, the amount of the one compound) is preferably 0.1 to 10 parts by mass, more preferably 0.3 to 7 parts by mass, and further preferably 0.5 to 5.0 parts by mass, relative to 100 parts by mass of the polymer (an elastomeric polymer having a cyclic acid anhydride group in a side chain) in the mixture. If the amount of the compound (I) and the compound (II) added (the amount based on parts by mass) is less than the lower limit, the amount is so small that the cross-linking density does not increase, and desired physical properties tend not to be expressed. Meanwhile, if the amount exceeds the upper limit, the amount is so large that many branches tends to be formed, and the cross-linking density tends to be lowered.

When both the compound (I) and the compound (II) are used, the order of addition of the compound (I) and the compound (II) is not particularly limited, and either one may be added first. In addition, when both the compound (I) and the compound (II) are used, the compound (I) may be reacted with part of the cyclic acid anhydride groups in the elastomeric polymer having a cyclic acid anhydride group in a side chain. This also makes it possible to form a covalent-bond cross-linking moiety by a reaction of unreacted cyclic acid anhydride groups (cyclic acid anhydride groups not reacted) with the compound (II). Herein, the "part" is preferably 1% by mole or more and 50% by mole of less relative to 100% by mole of the cyclic acid anhydride group. Within this range, the effect of the introduction of the group derived from the compound (I) (for example, a nitrogen-containing heterocycle or the like) tends to be sufficiently expressed in the obtained elastomeric polymer (B), and the recyclability thereof tends to be further improved. Note that the compound (II) is preferably reacted with the cyclic acid anhydride group such that the cross-linkages formed by the covalent bonds can be in a suitable number (for example, 1 to 3 in one molecule).

When the polymer is reacted with the raw material compound (compound (I) and/or compound (II)), the cyclic acid anhydride group of the polymer undergoes ring-opening, so that the cyclic acid anhydride group and the raw material compound (the compound (I) and/or compound (II)) are chemically bonded to each other. A temperature condition for the reaction (ring-opening of the cyclic acid anhydride group) of the polymer with the raw material compound (the compound (I) and/or compound (II)) is not particularly limited, and may be adjusted to a temperature at which the compound and the cyclic acid anhydride group can react with each other according to the types of the compound and the cyclic acid anhydride group. The temperature condition is preferably 100 to 250° C., and more preferably 120 to 230° C., from the viewpoint that the reaction is allowed to proceed in a moment by softening.

Such a reaction results in the formation of at least a hydrogen-bond cross-linkable moiety at a site where the compound (I) has reacted with the cyclic acid anhydride group. Hence, it is possible to cause a side chain of the polymer to contain a hydrogen-bond cross-linkable moiety (a moiety having a carbonyl-containing group and/or a nitrogen-containing heterocycle, more preferably a moiety having a carbonyl-containing group and a nitrogen-containing heterocycle). The side chain formed (introduced) by the reaction can be one containing the structure represented by the above-described formula (2) or (3).

In addition, at a site where the compound (II) has reacted with a cyclic acid anhydride group during the reaction, at least a covalent-bond cross-linking moiety is formed. Hence, a side chain of the polymer can be one containing a covalent-bonding cross-linking portion (a side chain (b) or a side chain (c)). Thus, side chains formed by such a reaction can be those containing the structures represented by the above-described formulae (7) to (9).

Note that groups (structures) of side chains in such polymers, specifically, unreacted cyclic acid anhydride groups, the structures represented by the above-described formulae (2), (3), and (7) to (9), and the like can be identified by ordinarily used analytic techniques such as NMR or IR spectroscopy.

Such a reaction makes it possible to obtain a thermoplastic elastomer composition comprising:

at least one elastomer component selected from the group consisting of elastomeric polymers (A) each of which has the side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; and a clay.

In addition, the amount of the clay contained in such a thermoplastic elastomer composition is 20 parts by mass or less relative to 100 parts by mass of the elastomer component. Note that the elastomeric polymer (A) and the elastomeric polymer (B) in the thus obtained thermoplastic elastomer composition are the same as the elastomeric polymer (A) and the elastomeric polymer (B) described for the above-described thermoplastic elastomer composition of the present invention, except that the side chain (a), the side chain (a'), the side chain (b), and the side chain (c) in each polymer are each derived by a reaction with a cyclic acid anhydride group (for example, a side chain containing the structure represented by the above-described formulae (2), (3), and (7) to (9), or the like).

Note that, according to the present invention, it is possible to efficiently produce a thermoplastic elastomer composition having a sufficiently high level of tensile stress (modulus) and a sufficient heat resistance. Although it is not exactly clear why such an effect is achieved by the present invention, the present inventors speculate as follows. Specifically, first, in the present invention, the thermoplastic elastomer composition is produced by modifying the elastomeric polymer having a cyclic acid anhydride group in a side chain (hereinafter, sometimes referred to as "acid anhydride-containing polymer"). By dispersing the clay in the acid anhydride polymer in advance as described above, the acid anhydride groups and the clay interact with each other to facilitate the delamination of layers of the clay. Especially when the clay is an organically modified clay preferably used in the present invention, an organic material such as an ammonium salt present between layers interacts with the acid anhydride. Hence, the layers tend to be more easily delaminated. In addition, after the clay is dispersed, the raw material compound (which functions as a cross-linking agent forming cross-linking, and hereinafter which is sometimes referred to as a "cross-linking agent") is added. Consequently, the cross-linking agent reacts with acid anhydride groups, and at least hydrogen-bond cross-linkable moieties (for example, carboxylic acid groups, or the like) are generated in the system. For this reason, interaction by hydrogen bonds with the clay is caused, and further the clay is dispersed in the elastomer. The present inventors speculate that, for this reason, the clay is sufficiently dispersed in the thermoplastic elastomer composition obtained by the present invention, and the clay interacts with the hydrogen-bond cross-linkable moieties to form uniform plane cross-linking moieties, so that the thermoplastic elastomer composition obtained by the present invention has a sufficiently high level of tensile stress (modulus) and a sufficient heat resistance.

In addition, as described above, the thermoplastic elastomer composition obtained by the present invention can be such that a single-layered clay is contained in the composition. Moreover, the thus obtained thermoplastic elastomer composition can also be such that, when randomly selected three or more measurement points in a size of 5.63 µm² on a surface of the thermoplastic elastomer composition are observed under a transmission electron microscope (TEM), 50% or more (more preferably 70% or more, further preferably 80 to 100%, and particularly preferably 85 to 100%) of all the clay based on the number is present as the single-layered clay in all the measurement points. If the ratio of such a single-layered clay present is less than the lower limit, the elongation at break and the strength at break tend to be lowered.

Note that the method for producing a thermoplastic elastomer composition of the present invention makes it possible to more efficiently adjust the ratio of the clay (single-layered clay) present in the single-layer morphology in the thermoplastic elastomer composition to the above-described preferred ratio. Regarding this point, the present inventors speculate that the clay interacts with cyclic acid anhydride groups in the above-described first step, making it possible to more efficiently delaminate layers of the clay having the multi-layered structure, and in turn making it possible to disperse (finely disperse) the clay in the single-layer state, so that the clay in the single-layer morphology (single-layered clay) is present at a higher ratio in the composition, which makes it possible for the composition to contain the single-layered clay at the above-described preferred ratio. Note that the presence of the clay in such a single-layered morphology can be confirmed by observing the surface of the obtained composition under a transmission electron microscope (TEM).

In addition, in the present invention, it is also possible to, for example, separately produce a thermoplastic elastomer composition containing an elastomeric polymer (A) as an elastomer component and a thermoplastic elastomer composition containing an elastomeric polymer (B) as an elastomer component, followed by mixing to prepare an thermoplastic elastomer composition containing the elastomeric polymers (A) and (B) as elastomer components. Meanwhile, when a thermoplastic elastomer composition containing a combination of the elastomeric polymers (A) and (B) as elastomer components is produced, it is also possible to cause a desired property to be exhibited by changing the ratio of the elastomeric polymer (A) and the elastomeric polymer (B), as appropriate, to change, as appropriate, the ratio between the hydrogen-bond cross-linkable moieties and the covalent-bond cross-linking moieties present in the composition and the like.

The thus obtained thermoplastic elastomer composition can be preferably used for, for example, various rubber applications by utilizing its rubber elasticity, and, for example, can be used preferably for applications such as hot-melt adhesives, or additives added thereto, automotive rubber components, hoses, belts, sheets, antivibration rubbers, rollers, linings, rubber-lined cloth, sealing materials, gloves, fenders, rubbers for medical applications (syringe gaskets, tubes, catheters), gaskets (for home appliances and for architectural applications), asphalt modifiers, hot-melt adhesives, boots, grips, toys, shoes, sandals, keypads, gears, and PET bottle cap liners.

EXAMPLES

Hereinafter, the present invention is described more specifically on the basis of Examples and Comparative Examples; however, the present invention is not limited to Examples below.

First, methods for evaluating properties of thermoplastic elastomer compositions obtained in Examples and Comparative Examples are described.

<JIS-A Hardness>

Each of the thermoplastic elastomer compositions obtained in Examples 1 to 15 and Comparative Examples 1 to 5 was used. The thermoplastic elastomer composition was hot pressed at 200° C. for 10 minutes, and then a flat plate sample of 2 mm in thickness, 15 cm in length, and 15 cm in width was prepared. Then, the sample was measured for the JIS-A hardness according to JIS K6253 (published in 2012).

<Tensile Properties>

Each of the thermoplastic elastomer compositions obtained in Examples 1 to 13 and Comparative Examples 1 to 5 was used. First, the thermoplastic elastomer composition was hot pressed at 200° C. for 10 minutes to prepare a sheet having a thickness of 1 mm. From the thus obtained sheet, test pieces in the No. 3 dumbbell shape were punched out, and subjected to a tensile test at a tensile speed of 500 mm/minute according to JIS K6251 (published in 2010) to measure the 100% modulus (M100) [MPa], the strength at break ($T_B$) [MPa], and the elongation at break ($E_B$) [%] at room temperature (25° C.).

<Compression Set (C-Set)>

Each of the thermoplastic elastomer compositions obtained in Examples 1 to 13 and Comparative Examples 1 to 5 was used. First, the thermoplastic elastomer composition was hot pressed at 200° C. for 10 minutes to prepare a sheet having a thickness of 2 mm. From the thus obtained sheet, seven pieces having a disk shape were punched out, and stacked on each other. Then, a height (thickness) of the stack is made to be 12.5±5 mm, the stack was compressed by 25% with a dedicated jig, and left at 70° C. for 22 hours. After that, the compression set was measured according to JIS K6262 (published in 2013). Note that the compressor used was one manufactured by DUMBBELL CO., LTD. under the trade name of "Vulcanized Rubber Compression Set Test Machine SCM-1008 L".

<5% Weight Loss Temperature>

Each of the thermoplastic elastomer compositions obtained in Examples 1 to 13 and Comparative Examples 1 to 5 was used. The measuring instrument used was a thermogravimetric analyzer (TGA), and the measurement was conducted at a rate of temperature rise of 10° C./min. The temperature at which the weight loss reached 5% of the initial weight was measured. Note that the measurement sample used was approximately 10 mg.

<Self-Repairing Properties>

The thermoplastic elastomer compositions obtained in Examples 1 to 3 and Comparative Examples 1 to 5 were each measured for self-repairing properties as described below. Specifically, first, the thermoplastic elastomer composition was hot pressed at 200° C. for 10 minutes, and then a flat plate sample of 1 m in thickness, 2 cm in length, and 2 cm in width was prepared. A cut of 5 mm in length was made on the sheet (a cut was made in a direction parallel to the longitudinal direction from the central portion of a lateral side to the center of the sheet). Next, the temperature of the sheet having the cut was raised to 60° C., and then raised stepwise from 60° C. to 140° C. with increments of 20° C. per step. Every time the temperature rose by 20° C., the sheet was left for 10 minutes (the temperature was sequentially raised from 60° C. to the temperatures of 80° C., 100° C., 120° C., and 140° C. with increments of 20° C., and the sheet was left for 10 minutes at each temperature). Whether the cut portion adhered was observed, and the temperature at which the cut portion adhered was recorded.

Example 1

First, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed into a pressure kneader, and plasticized by mastication at 200° C. for 2 minutes. Then, 5 g of an organically modified clay (manufactured by KUNIMINE INDUSTRIES CO., LTD. under the trade name of "Kunfil D-36") was further added, followed by kneading at 200° C. for 4 minutes to obtain a mixture. Subsequently, 1.26 g of 4H-3-amino-1,2,4-triazole (ATA: aminotriazole) was added to the mixture, followed by mixing at 200° C. for 8 minutes to prepare a thermoplastic elastomer composition. Table 1 shows the evaluation results of the properties of the obtained thermoplastic elastomer composition, and the like.

Note that, from the results of an infrared spectroscopic analysis of the raw material compound used, it can be understood that maleic anhydride groups in the maleic anhydride-modified ethylene-butene copolymer reacted with 4H-3-amino-1,2,4-triazole (ATA) to form an elastomeric polymer having a side chain containing the structure represented by the above-described formula (102) in the composition. It was also found that the elastomeric polymer had a glass-transition point of 25° C. or below, which was attributable to the main chain made of ethylene and butene.

Example 2

First, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed into a pressure kneader, and plasticized by mastication at 200° C. for 2 minutes. Then, 5 g of an organically modified clay (manufactured by KUNIMINE INDUSTRIES CO., LTD. under the trade name of "Kunfil D-36") was further added, followed by kneading at 200° C. for 4 minutes to obtain a mixture. Subsequently, 1.31 g of tris(hydroxyethyl) isocyanurate (manufactured by NISSEI CORPORATION under the trade name of "TANAC") was added to the mixture, followed by mixing at 200° C. for 8 minutes to prepare a thermoplastic elastomer composition. Table 1 shows the evaluation results of the properties of the obtained thermoplastic elastomer composition, and the like.

Note that, from the results of the infrared spectroscopic analysis of the raw material compound used, it can be understood that maleic anhydride groups in the maleic anhydride-modified ethylene-butene copolymer reacted with tris(hydroxyethyl) isocyanurate to form an elastomeric polymer mainly having a side chain containing the structure represented by the following formula (28) (hereinafter, simply referred to as "side chain (iii)" in some cases), among a side chain containing the structure represented by the following formula (26) (hereinafter, simply referred to as "side chain (i)" in some cases), a side chain containing the structure represented by the following formula (27) (hereinafter, simply referred to as "side chain (ii)" in some cases), and the side chain (iii) in the composition (note that, considering the stoichiometry based on the raw materials used, it is obvious that the side chain (iii) was mainly formed among the side chains (i) to (iii), but the side chain (i) and/or the side chain (ii) may be formed depending on the position of the side chain in the polymer or the like. Hereinbelow, an elastomeric polymer in which the main type of the side chain formed by the reaction can be considered to be the side chain (iii) on the basis of the raw materials used is sometimes simply referred to as an "elastomeric polymer mainly having a side chain (iii)"). In addition, it was found that the elastomeric polymer had a glass-transition point of 25° C. or below, which was attributable to the main chain made of ethylene and butene.

[Chem. 18]

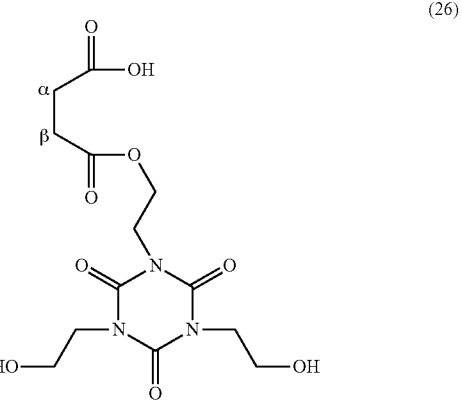

(26)

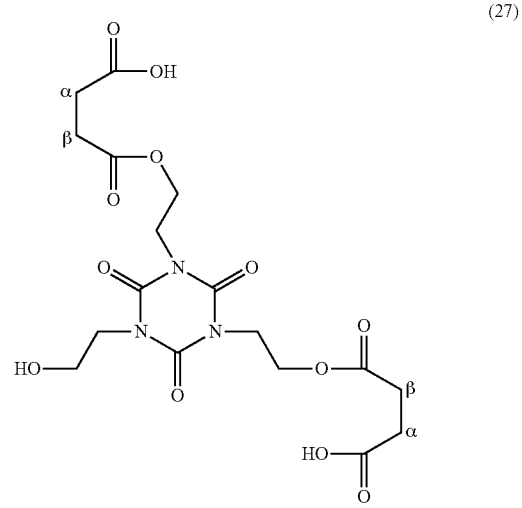

(27)

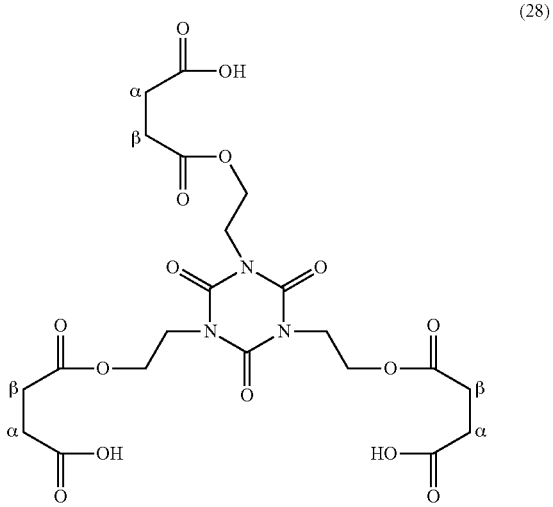

(28)

[in the formulae (26) to (28), the carbons indicated by α and β indicate that the carbon at either position (the α position or the β position) is bonded to the main chain of the elastomeric polymer].

Example 3

Into a pressure kneader, 50 g of the thermoplastic elastomer composition obtained in Example 1 and 50 g of the thermoplastic elastomer composition obtained in Example 2 were placed, followed by mixing at 200° C. for 8 minutes to prepare a thermoplastic elastomer. Table 1 shows the evaluation results of the properties of the obtained thermoplastic elastomer composition, and the like.

Comparative Example 1

Into a pressure kneader, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed, and plasticized by mastication at 200° C. for 2 minutes. Then, 5 g of an organically modified clay (manufactured by KUNIMINE INDUSTRIES CO., LTD. under the trade name of "Kunfil D-36") was further added, followed by kneading at 200° C. for 4 minutes to form a mixture. The mixture was employed as a thermoplastic elastomer composition for comparison (a composition containing an organically modified clay and a maleic anhydride-modified ethylene-butene copolymer). Table 1 shows the evaluation results of the properties of the obtained thermoplastic elastomer composition, and the like.

Comparative Example 2

Into a pressure kneader, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed, and plasticized by mastication at 200° C. for 2 minutes. Then, 1.26 g of 4H-3-amino-1,2,4-triazole (ATA) was added, followed by mixing at 200° C. for 8 minutes to prepare a thermoplastic elastomer composition for comparison (a composition containing an elastomeric polymer having a side chain containing the structure represented by the above-described formula (102) and the anti-aging agent: organically modified clay-free). Table 1 shows the evaluation results of the properties of the obtained thermoplastic elastomer composition, and the like.

Comparative Example 3

Into a pressure kneader, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed, and plasticized by mastication at 200° C. for 2 minutes. Then, 1.31 g of tris(hydroxyethyl) isocyanurate (manufactured by NISSEI CORPORATION under the trade name of "TANAC") was added, followed by mixing at 200° C. for 8 minutes to prepare a thermoplastic elastomer composition for comparison (a composition containing an elastomeric polymer mainly having the above-described side chain (iii) (note that the side chain (i) and/or the side chain (ii) may be present), and the anti-aging agent: organically modified clay-free). Table 1 shows the evaluation results of the properties of the obtained thermoplastic elastomer composition, and the like.

Comparative Example 4

Into a pressure kneader, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed, and plasticized by mastication at 200° C. for 2 minutes. Then, 0.63 g of 4H-3-amino-1,2,4-triazole (ATA) and 0.66 g of tris(hydroxyethyl) isocyanurate (manufactured by NISSEI CORPORATION under the trade name of "TANAC") were added, followed by mixing at 200° C. for 8 minutes to prepare a thermoplastic elastomer composition for comparison (a composition containing an elastomeric polymer mainly having a side chain containing the structure represented by the above-described formula (102) and the above-described side chain (iii) (note that the side chain (i) and/or the side chain (ii) may be present), and an anti-aging agent: organically modified clay-free). Table 1 shows the evaluation results of the properties of the obtained thermoplastic elastomer composition, and the like.

Comparative Example 5

An olefin-based thermoplastic elastomer manufactured by Mitsui Chemicals, Inc. (trade name: "Milastomer 7030NS") was directly used as a thermoplastic elastomer composition for comparison. Table 1 shows the evaluation results of the properties of the thermoplastic elastomer composition, and the like.

In Table 1 shown below, the maleic anhydride-modified ethylene-butene copolymer used for producing each composition was referred to as Polymer (I).

TABLE 1

| | | Example 1 | Example 2 | Example 3 | Comp. Ex. 1 | Comp. Ex. 2 | Comp. Ex. 3 | Comp. Ex. 4 | Comp. Ex. 5 |
|---|---|---|---|---|---|---|---|---|---|
| The presence or absence in composition | Organically modified clay | Present | Present | Present | Present | Absent | Absent | Absent | Absent |
| | Hydrogen-bond cross-linkable moiety | Present | Present | Present | Absent | Present | Present | Present | Absent |
| | Covalent-bond cross-linking moiety | Absent | Present | Present | Absent | Absent | Present | Present | Absent |
| Types of raw material compounds* (Unit: g) | Polymer (I) | 100 | 100 | — | 100 | 100 | 100 | 100 | — |
| | Organically modified clay | 5 | 5 | — | 5 | — | — | — | — |
| | Aminotriazole | 1.26 | — | — | — | 1.26 | — | 0.63 | — |
| | Tris(hydroxyethyl) isocyanurate | — | 1.31 | — | — | — | 1.31 | 0.66 | — |

TABLE 1-continued

|  |  | Example 1 | Example 2 | Example 3 | Comp. Ex. 1 | Comp. Ex. 2 | Comp. Ex. 3 | Comp. Ex. 4 | Comp. Ex. 5 |
|---|---|---|---|---|---|---|---|---|---|
|  | Anti-aging agent | 0.1 | 0.1 | — | 0.1 | 0.1 | 0.1 | 0.1 | — |
|  | Composition obtained in Example 1 | — | — | 50 | — | — | — | — | — |
|  | Composition obtained in Example 2 | — | — | 50 | — | — | — | — | — |
| Properties of composition | JIS-A hardness | 65.5 | 67 | 60 | 65 | 57 | 52 | 62 | 65.5 |
|  | 100% modulus (MPa) | 2.84 | 5.66 | 2.44 | 1.22 | 1.31 | 1.30 | 1.26 | 1.46 |
|  | Strength at break (MPa) | 5.44 | 9.67 | 5.89 | 5.5 | 4.82 | 1.34 | 4.96 | 5.83 |
|  | Elongation at break (%) | 554 | 295 | 167 | 1000 | 1025 | 108 | 265 | 515 |
|  | Compression set (%) | 83 | 2 | 15 | 85 | 90 | 2 | 28 | 36 |
|  | 5% weight loss temperature | 400° C. | 403° C. | 405° C. | 297° C. | 398° C. | 302° C. | 388 | 295° C. |
|  | Self-repairing properties | 100° C. | None | 140° C. | 80° C. | 80° C. | None | None | None |

In the table, * indicates that the sign - means 0 g (the raw material was not used).

As is apparent from the results shown in Table 1, it was found that a 5% weight loss temperature of 400° C. or above was achieved by each of the thermoplastic elastomer compositions of the present invention (Examples 1 to 3) each containing at least one elastomer component of an elastomeric polymer having a side chain containing the structure represented by the above-described formula (102) (a side chain containing a hydrogen-bond cross-linkable moiety having a carbonyl-containing group and a nitrogen-containing heterocycle) and having a glass-transition point of 25° C. or below, an elastomeric polymer mainly having a side chain containing the structure represented by the above-described formula (28) (side chain (iii): a side chain containing a hydrogen-bond cross-linkable moiety having carbonyl-containing groups and a nitrogen-containing heterocycle, and a covalent-bonding moiety) and having a glass-transition point of 25° C. or below (note that the polymer may contain a side chain containing the structure represented by the above-described formula (26) (side chain (i): a side chain containing a hydrogen-bond cross-linkable moiety having carbonyl-containing groups and a nitrogen-containing heterocycle); and/or a side chain containing the structure represented by the above-described formula (27) (side chain (ii): a side chain containing a hydrogen-bond cross-linkable moiety having carbonyl-containing groups and a nitrogen-containing heterocycle, and a covalent-bonding moiety)); and a clay (an organically modified clay was used), whereas the 5% weight loss temperatures of the thermoplastic elastomer compositions used in Comparative Examples 1 to 5 were 398° C. or below, indicating that the thermoplastic elastomer compositions of the present invention (Examples 1 to 3) had sufficiently high levels of heat resistance.

In addition, the thermoplastic elastomer compositions of the present invention (Examples 1 to 3) each achieved a 100% modulus value of 2.44 or higher, and the 100% modulus values were improved in comparison with the 100% modulus values (about 1.46 at the highest) of the thermoplastic elastomer compositions obtained in Comparative Examples 1 to 5. From these results, it was also found that the thermoplastic elastomer compositions of the present invention (Examples 1 to 3) had sufficient tensile stress.

In addition, a comparison is made between the thermoplastic elastomer compositions obtained in Examples 1 to 3 and the thermoplastic elastomer composition obtained in Comparative Example 1. This comparison showed that the tensile stress (100% modulus) was sufficiently improved, and the 5% weight loss temperature was dramatically improved in each of the cases where the elastomeric polymer having the side chain containing a hydrogen-bond cross-linkable moiety (side chain containing the structure represented by the above-described formula (102)) was used (the case of Example 1), where the elastomeric polymer mainly containing the above-described side chain (iii) was used (the case of Example 2), and where the mixture of these elastomeric polymers were used (the case of Example 3), which were different from one another in the type of the side chain of the elastomeric polymer in the composition.

In addition, another comparison is made between the thermoplastic elastomer composition obtained in Example 1 and the thermoplastic elastomer composition obtained in Comparative Example 2, which were different in terms of the presence or absence of the organically modified clay contained. This comparison showed that when the organically modified clay was introduced (Example 1), a sufficient tensile stress and a sufficient heat resistance were obtained, and the strength at break and the resistance to compression set were also sufficiently improved. In addition, still another comparison is made between the thermoplastic elastomer composition obtained in Example 2 and the thermoplastic elastomer composition obtained in Comparative Example 3, which were different in terms of the presence or absence of the organically modified clay contained. This comparison showed that when the organically modified clay was introduced (Example 2), a sufficient tensile stress and a sufficient heat resistance were obtained, and the strength at break was also dramatically improved. In addition, yet another comparison is made between the thermoplastic elastomer compositions obtained in Examples 1 to 3 and the thermoplastic elastomer composition obtained in Comparative Example 4. This comparison showed that a sufficient tensile stress and a sufficient heat resistance were obtained, and the organically modified clay contained sufficiently improved the strength at break.

From these results, according to the thermoplastic elastomer compositions of the present invention (Examples 1 to 3), it has been found that especially the heat resistance (the heat resistance using the 5% weight loss temperature as an index) and the tensile stress (especially, the tensile stress using the 100% modulus as an index) can be sufficiently improved.

Moreover, self-repairing properties were observed in the thermoplastic elastomer compositions obtained in Examples 1 and 3, and high levels of resistance to compression set were observed in the thermoplastic elastomer compositions obtained in Examples 2 and 3. Accordingly, it was also found that desired properties can be exhibited, as appropriate, in the thermoplastic elastomer compositions of the present invention (Examples 1 to 3) according to the constitution.

From the above-described results, it was found that the thermoplastic elastomer compositions of the present invention (Examples 1 to 3) were extremely excellent in heat resistance and tensile strength, which are necessary for a thermoplastic elastomer composition. In addition, from the evaluation results of the properties of the thermoplastic elastomer compositions of the present invention (Examples 1 to 3), it was also found that desired properties (self-repairing properties, resistance to compression set, and the like) can be exhibited, as appropriate, by changing the composition, as appropriate, according to the application.

Example 4

First, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed into a pressure kneader, and plasticized by mastication at 200° C. for 2 minutes. Then, 2 g of an organically modified clay (manufactured by KUNIMINE INDUSTRIES CO., LTD. under the trade name of "Kunfil D-36") was further added, followed by kneading at 200° C. for 4 minutes to obtain a mixture. Subsequently, 1.26 g of 4H-3-amino-1,2,4-triazole (ATA) was added to the mixture, followed by mixing at 200° C. for 8 minutes to prepare a thermoplastic elastomer composition. Table 2 shows the evaluation results of the properties of the obtained thermoplastic elastomer composition, and the like.

Note that, based on the raw material compounds used, it can be understood that maleic anhydride groups in the maleic anhydride-modified ethylene-butene copolymer reacted with 4H-3-amino-1,2,4-triazole (ATA) to form an elastomeric polymer having a side chain containing the structure represented by the above-described formula (102) in the composition. In addition, it was found that the elastomeric polymer had a glass-transition point of 25° C. or below, which was attributable to the main chain made of ethylene and butene.

Example 5

First, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed into a pressure kneader, and plasticized by mastication at 200° C. for 2 minutes. Then, 2 g of an organically modified clay (manufactured by KUNIMINE INDUSTRIES CO., LTD. under the trade name of "Kunfil D-36") was further added, followed by kneading at 200° C. for 4 minutes to obtain a mixture. Subsequently, 1.31 g of tris(hydroxyethyl) isocyanurate (manufactured by NISSEI CORPORATION under the trade name of "TANAC") was added to the mixture, followed by mixing at 200° C. for 8 minutes to prepare a thermoplastic elastomer composition. Table 2 shows the evaluation results of the properties of the obtained thermoplastic elastomer composition, and the like.

Note that, based on the raw material compounds used, it can be understood that maleic anhydride groups in the maleic anhydride-modified ethylene-butene copolymer reacted with tris(hydroxyethyl) isocyanurate to form an elastomeric polymer mainly having the above-described side chain (iii) in the composition (note that the side chain (i) and/or the side chain (ii) may be present). In addition, it was found that the elastomeric polymer had a glass-transition point of 25° C. or below, which was attributable to the main chain made of ethylene and butene.

Example 6

First, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed into a pressure kneader, and plasticized by mastication at 200° C. for 2 minutes. Then, 2 g of an organically modified clay (manufactured by KUNIMINE INDUSTRIES CO., LTD. under the trade name of "Kunfil D-36") was further added, followed by kneading at 200° C. for 4 minutes to obtain a mixture. Subsequently, 0.378 g of 4H-3-amino-1,2,4-triazole (ATA) and 0.917 μg of tris(hydroxyethyl) isocyanurate (manufactured by NISSEI CORPORATION under the trade name of "TANAC") were added to the mixture, followed by mixing at 200° C. for 8 minutes to prepare a thermoplastic elastomer composition. Table 2 shows the evaluation results of the properties of the obtained thermoplastic elastomer composition, and the like.

Note that, based on the raw material compounds used, it can be understood that maleic anhydride groups in the maleic anhydride-modified ethylene-butene copolymer reacted with 4H-3-amino-1,2,4-triazole (ATA) and tris(hydroxyethyl) isocyanurate respectively to form an elastomeric polymer mainly having a side chain containing the structure represented by the above-described formula (102) and the above-described side chain (iii) in the composition (note that the side chain (i) and/or the side chain (ii) may be present). In addition, it was found that the elastomeric polymer had a glass-transition point of 25° C. or below, which was attributable to the main chain made of ethylene and butene.

Example 7

First, 100 g of a maleic anhydride-modified ethylene-butene copolymer (manufactured by Mitsui Chemicals, Inc. under the trade name of "TAFMER MH5020") and 0.1 g of an anti-aging agent (manufactured by BASF under the trade name of "Irganox 1010") were placed into a pressure kneader, and plasticized by mastication at 200° C. for 2 minutes. Then, 2 g of an organically modified clay (manufactured by KUNIMINE INDUSTRIES CO., LTD. under the trade name of "Kunfil D-36") was further added, followed by kneading at 200° C. for 4 minutes to obtain a mixture. Subsequently, 0.252 g of 4H-3-amino-1,2,4-triazole (ATA) and 1.048 μg of tris(hydroxyethyl) isocyanurate (manufactured by NISSEI CORPORATION under the trade name of "TANAC") were added to the mixture, followed by mixing at 200° C. for 8 minutes to prepare a thermoplastic elastomer composition. Table 2 shows the evaluation results of the properties of the obtained thermoplastic elastomer composition, and the like.

Note that, based on the raw material compounds used, it can be understood that maleic anhydride groups in the maleic anhydride-modified ethylene-butene copolymer reacted with 4H-3-amino-1,2,4-triazole (ATA) and tris(hydroxyethyl) isocyanurate respectively to form an elastomeric polymer mainly having a side chain containing the structure represented by the above-described formula (102) and the above-described side chain (iii) in the composition (note that the side chain (i) and/or the side chain (ii) may be present). In addition, it was found that the elastomeric polymer had a glass-transition point of 25° C. or below, which was attributable to the main chain made of ethylene and butene.

Example 8

A thermoplastic elastomer composition was obtained by mixing 30 g of a thermoplastic elastomer composition obtained by employing the same method as that employed in Example 4 with 70 g of a thermoplastic elastomer composition obtained by employing the same method as that employed in Example 5. Table 2 shows the evaluation results of the properties of the obtained thermoplastic elastomer composition, and the like.

Example 9

A thermoplastic elastomer composition was obtained by mixing 20 g of a thermoplastic elastomer composition obtained by employing the same method as that employed in Example 4 with 80 g of a thermoplastic elastomer composition obtained by employing the same method as that employed in Example 5. Table 2 shows the evaluation results of the properties of the obtained thermoplastic elastomer composition, and the like.

Note that Table 2 also shows the results of the above-described Comparative Examples 2 and 3 for reference. In addition, in Table 2, the maleic anhydride-modified ethylene-butene copolymer used for producing each composition is referred to as Polymer (I).

of the amounts of the side chain derived from the aminotriazole and the side chain derived from tris(hydroxyethyl) isocyanurate were equal to each other, it was found that higher levels of strength at break were obtained in the cases where one elastomeric polymer having a side chain containing the structure represented by the above-described formula (102) and the above-described side chain (iii) (Examples 6 and 7) than in the cases where the two elastomeric polymers were mixed with each other to make a side chain containing the structure represented by the above-described formula (102) and the above-described side chain (iii) present in the thermoplastic elastomer composition (Examples 8 and 9).

In addition, as is apparent from the results shown in Table 2, when a comparison in constitution is made between the thermoplastic elastomer composition obtained in Example 4 and the thermoplastic elastomer composition obtained in Comparative Example 2, which were different only in the presence or absence of the organically modified clay contained, the comparison showed that the 5% weight loss temperature and the 100% modulus value were sufficiently improved, and the strength at break and the resistance to compression set were improved, when the organically modified clay was introduced (Example 4). In addition, when a comparison is made between the thermoplastic elastomer composition obtained in Example 5 and the thermoplastic elastomer composition obtained in Comparative Example 3, which were different in the presence or absence of the organically modified clay contained, the comparison showed that the 5% weight loss temperature and the 100% modulus value were sufficiently improved, and the strength at break

TABLE 2

|  |  | Example 4 | Example 5 | Example 6 | Example 7 | Example 8 | Example 9 | Comp. Ex. 2 | Comp. Ex. 3 |
| --- | --- | --- | --- | --- | --- | --- | --- | --- | --- |
| The presence or absence in composition | Organically modified clay | Present | Present | Present | Present | Present | Present | Absent | Absent |
|  | Hydrogen-bond cross-linkable moiety | Present | Present | Present | Present | Present | Present | Present | Present |
|  | Covalent-bond cross-linking moiety | Absent | Present | Present | Present | Present | Present | Absent | Present |
| Types of raw material compounds* (Unit: g) | Polymer (I) | 100 | 100 | 100 | 100 | — | — | 100 | 100 |
|  | Organically modified clay | 2 | 2 | 2 | 2 | — | — | — | — |
|  | Aminotriazole | 1.26 | — | 0.378 (30) | 0.252 (20) | — | — | 1.26 | — |
|  | Tris(hydroxyethyl) isocyanurate | — | 1.31 | 0.917 (70) | 1.048 (80) | — | — | — | 1.31 |
|  | Anti-aging agent | 0.1 | 0.1 | 0.1 | 0.1 | — | — | 0.1 | 0.1 |
|  | The same composition as in Example 4 | — | — | — | — | 30 | 20 | — | — |
|  | The same composition as in Example 5 | — | — | — | — | 70 | 80 | — | — |
| Properties of composition | JIS-A hardness | 59 | 56 | 56.5 | 57 | 53 | 47 | 57 | 52 |
|  | 100% modulus (MPa) | 3.10 | 2.23 | 2.52 | 2.08 | 1.64 | 1.84 | 1.31 | 1.30 |
|  | Strength at break (MPa) | 6.08 | 3.79 | 5.83 | 3.19 | 4.85 | 2.61 | 4.82 | 1.34 |
|  | Elongation at break (%) | 910 | 210 | 437 | 239 | 418 | 237 | 1025 | 108 |
|  | Compression set (%) | 87 | 42 | 54 | 48 | 50 | 56 | 90 | 2 |
|  | 5% weight loss temperature | 405° C. | 404° C. | 403° C. | 402° C. | 405° C. | 405 | 398° C. | 302° C. |

In the table, * indicates that the sign - means 0 g (the raw material was not used), and that the numeric values in the parenthesis are mass ratios.

As is apparent from the results shown in Table 2, examination of the cases (Examples 6 to 9) where a side chain derived from the aminotriazole and a side chain derived from tris(hydroxyethyl) isocyanurate were contained in the polymers contained in the compositions showed that the obtained compositions had generally the same properties, and no specific great difference in effect due to the difference in the production method or the like was detected. Note that when a comparison is made between each of the pairs of one of the thermoplastic elastomer compositions obtained in Examples 6 and 7 with the corresponding one of the thermoplastic elastomer compositions obtained in Examples 8 and 9, each pair of which had constitutions in which the ratio was also sufficiently improved when the organically modified clay was introduced (Example 5). From these results, it was found that the thermoplastic elastomer compositions of the present invention (Example 4 to 5) were especially extremely excellent in terms of heat resistance and tensile stress, which are necessary for a thermoplastic elastomer composition.

Examples 10 to 13

In each of Examples 10 to 13, a thermoplastic elastomer composition was produced by employing the same method as that shown below, except that the amounts of the raw material compounds (the maleic anhydride-modified ethylene-butene copolymer, the anti-aging agent, the organically modified clay, and tris(hydroxyethyl) isocyanurate) used were as shown in Table 3. Specifically, first, a maleic anhydride-modified ethylene-butene copolymer (manufactured by Mitsui Chemicals, Inc. under the trade name of "TAFMER MH5020") and an anti-aging agent (manufactured by BASF under the trade name of "Irganox 1010") were placed into a pressure kneader at the ratio shown in Table 3, and plasticized by mastication at 200° C. for 2 minutes. Then, an organically modified clay (manufactured by KUNIMINE INDUSTRIES CO., LTD. under the trade name of "Kunfil D-36") was further added at the ratio shown in Table 3, followed by kneading at 200° C. for 4 minutes to obtain a mixture. Subsequently, tris(hydroxyethyl) isocyanurate (manufactured by NISSEI CORPORATION under the trade name of "TANAC") was added to the mixture at the ratio shown in Table 3, followed by mixing at 200° C. for 8 minutes to prepare a thermoplastic elastomer composition. Table 3 shows the evaluation results of the properties of each of the obtained thermoplastic elastomer compositions, and the like.

Example 14

A thermoplastic elastomer composition was prepared in the same manner as in Example 13, except that montmorillonite (manufactured by KUNIMINE INDUSTRIES CO., LTD. under the trade name of "Kunipia F": a clay which does not mainly contain silicon or magnesium, but mainly contains silicon and aluminum) was used instead of the organically modified clay (manufactured by KUNIMINE INDUSTRIES CO., LTD. under the trade name of "Kunfil D-36"). Table 3 shows the evaluation results of the properties of each of the obtained thermoplastic elastomer compositions, and the like.

Example 15

A thermoplastic elastomer composition was prepared in the same manner as in Example 13, except that a synthetic clay (saponite: manufactured by KUNIMINE INDUSTRIES CO., LTD. under the trade name of "Sumecton SA"), which is a clay mainly containing silicon and magnesium, was used instead of the organically modified clay (manufactured by KUNIMINE INDUSTRIES CO., LTD. under the trade name of "Kunfil D-36"). Table 3 shows the evaluation results of the properties of each of the obtained thermoplastic elastomer compositions, and the like.

Note that, based on the raw material compounds used, it can be understood that maleic anhydride groups in the maleic anhydride-modified ethylene-butene copolymer reacted with tris(hydroxyethyl) isocyanurate to form an elastomeric polymer mainly having above-described side chain (iii) (note that the side chain (i) and/or the side chain (ii) may be present) in the compositions obtained in Examples 10 to 15. In addition, it was found that each of the elastomeric polymers had a glass-transition point of 25° C. or below, which was attributable to the main chain made of ethylene and butene.

In addition, Table 3 also shows the above-described results of Example 2 and Comparative Example 3 for reference. In addition, the maleic anhydride-modified ethylene-butene copolymer used for producing each composition is referred to as Polymer (I).

TABLE 3

|  |  | Example 10 | Example 11 | Example 12 | Example 13 | Example 14 | Example 15 | Example 2 | Comp. Ex. 3 |
|---|---|---|---|---|---|---|---|---|---|
| Types of raw material compounds* (Unit: g) | Polymer (I) | 100 | 100 | 100 | 100 | 100 | 100 | 100 | 100 |
| | Organically modified clay | 2.5 | 2.5 | 2.5 | 1 | — | — | 5 | — |
| | Clay (montmorillonite) | — | — | — | — | 1 | — | — | — |
| | Saponite (synthetic clay) | — | — | — | — | — | 1 | — | — |
| | Tris(hydroxyethyl) isocyanurate | 1.64 | 1.31 | 0.983 | 1.31 | 1.31 | 1.31 | 1.31 | 1.31 |
| | Anti-aging agent | 0.1 | 0.1 | 0.1 | 0.1 | 0.1 | 0.1 | 0.1 | 0.1 |
| Properties of composition | JIS-A hardness | 62.5 | 61.5 | 58 | 57.5 | 55 | 56 | 67 | 52 |
| | 100% modulus (MPa) | 4.51 | 3.14 | 2.45 | 2.48 | 2.26 | 2.27 | 5.66 | 1.30 |
| | Strength at break (MPa) | 7.78 | 6.78 | 4.69 | 3.88 | 3.92 | 4.12 | 9.67 | 1.34 |
| | Elongation at break (%) | 233 | 308 | 296 | 291 | 278 | 286 | 295 | 108 |
| | Compression set (%) | 5 | 2 | 39 | 38 | 40 | 41 | 2 | 2 |
| | 5% weight loss temperature | 405° C. | 404° C. | 404° C. | 406° C. | 407° C. | 405° C. | 403° C. | 302° C. |

In the table, * indicates that the sign - means 0 g (the raw material was not used).

As is apparent from the results shown in Table 3, it was found that the thermoplastic elastomer compositions of the present invention (Example 2 and Examples 10 to 15) had sufficiently high values of the 100% modulus and the 5% weight loss temperature, showing that the heat resistance using the 5% weight loss temperature as an index and the tensile stress using the 100% modulus as an index were sufficiently improved. Note that a comparison of constitution between the thermoplastic elastomer compositions obtained in Examples 2, 11, and 13 and the thermoplastic elastomer composition obtained in Comparative Example 3, which were different in the presence or absence of the organically modified clay contained, showed that the heat resistance and the tensile stress were sufficiently improved, the strength at break and the elongation at break were also improved, and the tensile strength was especially improved, when the organically modified clay was introduced (Examples 2, 11, and 13).

Note that it was found that each of the thermoplastic elastomer compositions obtained in Examples 2, and 10 to 15 were better in each of the 100% modulus, the strength at break, the elongation at break, and the 5% weight loss temperature than the thermoplastic elastomer composition obtained in Comparative Example 3.

Example 16

Into a pressure kneader, 100 g of a maleic anhydride-modified ethylene-propylene copolymer (manufactured by Mitsui Chemicals, Inc. under the trade name of "TAFMER MMP0620") and 0.1 g of an anti-aging agent (manufactured by BASF under the trade name of "Irganox 1010") were placed, and plasticized by mastication at 200° C. for 2 minutes. Then, 2 g of an organically modified clay (manufactured by KUNIMINE INDUSTRIES CO., LTD. under the trade name of "Kunfil D-36") was further added, followed by kneading at 200° C. for 4 minutes to obtain a mixture. Subsequently, 1.26 g of 4H-3-amino-1,2,4-triazole (ATA: aminotriazole) was added to the mixture, followed by mixing at 200° C. for 8 minutes to prepare a thermoplastic elastomer composition.

Note that, based on the raw material compounds used, it can be understood that maleic anhydride groups in the maleic anhydride-modified ethylene-propylene copolymer reacted with 4H-3-amino-1,2,4-triazole (ATA) to form an elastomeric polymer containing a side chain containing the structure represented by the above-described formula (102) in the composition. In addition, it was found that the elastomeric polymer had a glass-transition point of 25° C. or below, which was attributable to the main chain made of ethylene and butene.

Example 17

Into a pressure kneader, 100 g of a maleic anhydride-modified ethylene-propylene copolymer (manufactured by Mitsui Chemicals, Inc. under the trade name of "TAFMER MMP0620") was placed, and plasticized by mastication at 200° C. for 2 minutes. Then, 1.26 g of 4H-3-amino-1,2,4-triazole (ATA) was added, followed by mixing at 200° C. for 8 minutes. Then, 5 g of an organically modified clay (manufactured by KUNIMINE INDUSTRIES CO., LTD. under the trade name of "Kunfil D-36") was further added, followed by kneading at 200° C. for 4 minutes to prepare a thermoplastic elastomer composition.

Note that, based on the raw material compounds used, it can be understood that maleic anhydride groups in the maleic anhydride-modified ethylene-propylene copolymer reacted with 4H-3-amino-1,2,4-triazole (ATA) to form an elastomeric polymer having a side chain containing the structure represented by the above-described formula (102) in the composition. In addition, it was found that the elastomeric polymer had a glass-transition point of 25° C. or below, which was attributable to the main chain made of ethylene and butene.

[Evaluation of Properties of Thermoplastic Elastomer Compositions Obtained in Examples 16 and 17]
<Measurement of Modulus>

Each of the thermoplastic elastomer compositions obtained in Examples 16 and 17 were used. The composition was hot pressed at 200° C. for 10 minutes to prepare a sheet having a thickness of 1 mm. Subsequently, test pieces having the No. 3 dumbbell shape were punched out from the obtained sheet, and subjected to a tensile test at a tensile speed of 500 mm/minute according to JIS K6251 (published in 2010) to measure the 100% modulus [MPa], the 200% modulus [MPa], the 300% modulus [MPa], the 400% modulus [MPa], and the 500% modulus [MPa]. Table 4 shows the obtained results.

Note that, in Table 4, the maleic anhydride-modified ethylene-propylene copolymer used in Examples 16 and 17 is referred to as Polymer (II).

TABLE 4

| | | Example 16 | Example 17 |
|---|---|---|---|
| Types of raw material compounds (Unit: g) | Polymer (II) | 100 | 100 |
| | Organically modified clay | 5 | 5 |
| | Aminotriazole | 1.26 | 1.26 |
| Properties of composition | JIS-A hardness | 79 | 79 |
| | 100% modulus (MPa) | 0.62 | 0.27 |
| | 200% modulus (MPa) | 1.29 | 0.71 |
| | 300% modulus (MPa) | 1.79 | 1.12 |
| | 400% modulus (MPa) | 2.13 | 1.47 |
| | 500% modulus (MPa) | 2.40 | 1.79 |

As is apparent from the results shown in Table 4, it was found that the values of the modulus were higher, and a higher level of tensile strength was obtained in the case (Example 16) where the organically modified clay was mixed before the formation of the elastomeric polymer having a side chain containing the structure represented by the above-described formula (102) than in the case (Example 17) where the organically modified clay was mixed after the formation of the elastomeric polymer having a side chain containing the structure represented by the above-described formula (102). The present inventors speculate that these effects in the case (Example 16) where the organically modified clay was mixed before the formation of the elastomeric polymer having a side chain containing the structure represented by the above-described formula (102) were attributable to suppression of stress concentration, which was brought about because the maleic anhydride groups in the maleic anhydride-modified ethylene-propylene copolymer made the organically modified clay highly dispersed, and enabled the organically modified clay in a single-layer state to be dispersed more efficiently.

[Measurement of Thermoplastic Elastomer Compositions Obtained in Examples 1, 2, 11, 16, and 17 Under Transmission Electron Microscope]

Figure 2:
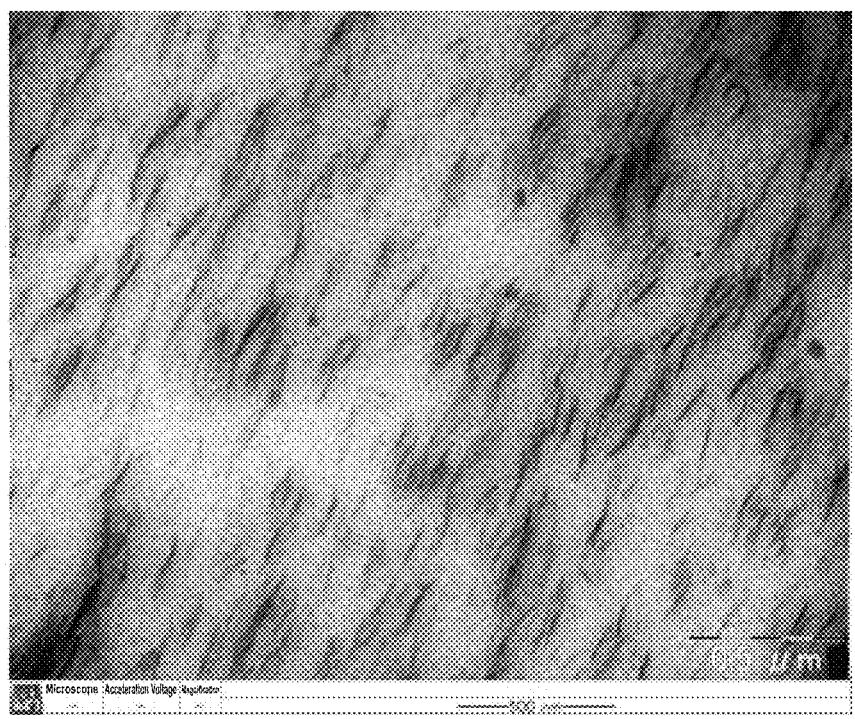
FIG. 2 is an electron micrograph (TEM photograph) showing a surface state of a thermoplastic elastomer composition obtained in Example 2.
Figure 3:
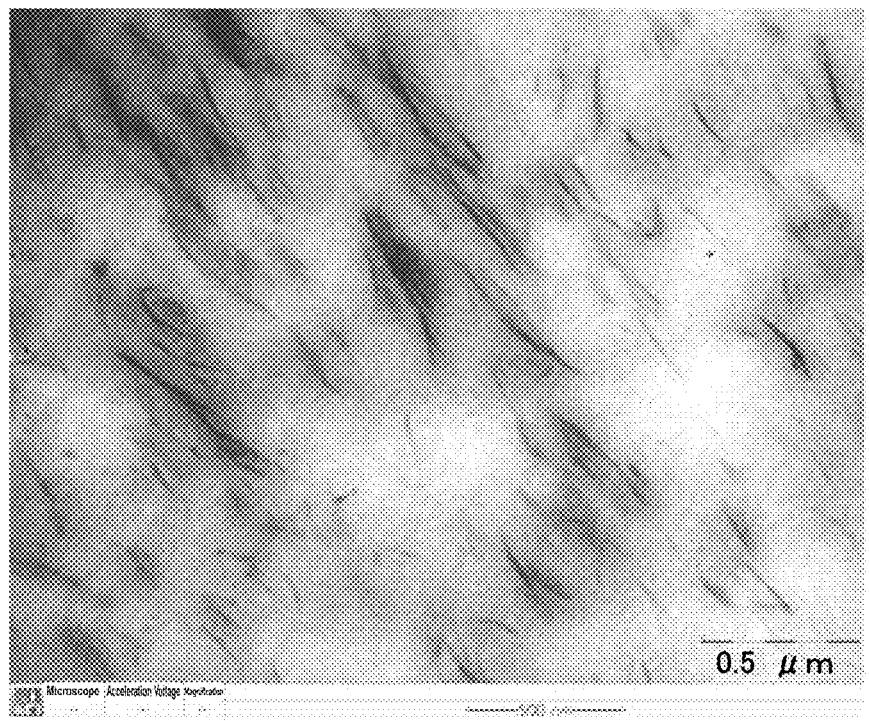
FIG. 3 is an electron micrograph (TEM photograph) showing a surface state of a thermoplastic elastomer composition obtained in Example 11.
Figure 4:
FIG. 4 is an electron micrograph (TEM photograph) showing a surface state of a thermoplastic elastomer composition obtained in Example 16.
Figure 5:
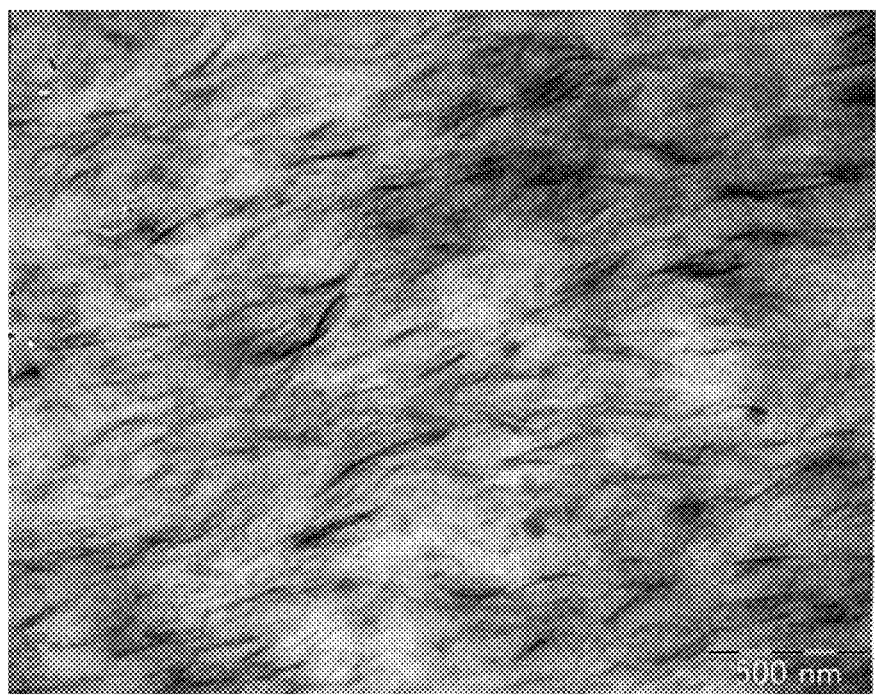
FIG. 5 is an electron micrograph (TEM photograph) showing a surface state of a thermoplastic elastomer composition obtained in Example 17.

10 g of each of the thermoplastic elastomer compositions obtained in Examples 1, 2, 11, 16, and 17 was prepared as sample, and the surface of each of the samples were observed by using a transmission electron microscope (manufactured by JEOL Ltd. under the trade name of "JEM-2010"). Specifically, by using the transmission electron microscope with a magnification of 50,000 fold, three measurement points in a size of 5.63 μm² were observed on the surface of 10 g (sample) of each of the thermoplastic elastomer compositions. FIG. 1 (Example 1), FIG. 2 (Example 2), FIG. 3 (Example 11), FIG. 4 (Example 16), and FIG. 5 (Example 17) respectively show the transmission electron microscopic images of the thermoplastic elastomer compositions obtained in Examples 1, 2, 11, 16, and 17.

As is apparent from the results shown in FIGS. 1 to 5, it was found that each of the thermoplastic elastomer compositions obtained in Examples 1, 2, 11, 16, and 17 contained the clay of single layers, and the clay was sufficiently uniformly dispersed in the single-layer state.

In addition, regarding each of the thermoplastic elastomer compositions obtained in Examples 1, 2, 11, 16, and 17, the number-based ratio of the single-layered clay relative to all the clay observed at each of the three measurement points was calculated for each measurement point. Consequently, as is apparent from the results shown in FIGS. 1 to 5, the ratio of the single-layered clay relative to all the clay was 90% or higher at each of the three measurement points in the thermoplastic elastomer composition obtained in Example 1; the ratio of the single-layered clay relative to all the clay was 90% or higher at each of the three measurement points in the thermoplastic elastomer composition obtained in Example 2; the ratio of the single-layered clay relative to all the clay was 90% or higher at each of the three measurement points in the thermoplastic elastomer composition obtained in Example 11, the ratio of the single-layered clay relative to all the clay was 90% or higher at each of the three measurement points in the thermoplastic elastomer composition obtained in Example 16, and the ratio of the single-layered clay relative to all the clay was 80% or higher at each of the three measurement points in the thermoplastic elastomer composition obtained in Example 17. Accordingly, it was found that the single-layered clay at a sufficient ratio was dispersed in each of the thermoplastic elastomer compositions obtained in Examples 1, 2, 11, 16, and 17. From these results, it was found that the single-layered clay was contained at a sufficiently high level of ratio and dispersed sufficiently uniformly in the thermoplastic elastomer composition obtained in each of Examples.

In addition, a comparison between the thermoplastic elastomer compositions obtained in Examples 16 and 17 showed that the introduction of the organically modified clay into the system before the formation of the elastomeric polymer having a side chain containing the structure represented by the above-described formula (102) (the addition of the clay before the addition of aminotriazole) further improved the amount of the single-layered clay contained. Considering these results and the values of modulus of Examples 16 and 17 together, it has been found that improvement in the ratio of the single-layered clay contained improves the value of modulus, and that further improving the amount of the single-layered clay contained makes it possible to improve the tensile stress to a higher level.

INDUSTRIAL APPLICABILITY

As described above, according to the present invention, it is possible to provide a thermoplastic elastomer composition which can have a sufficiently high level of tensile stress and a sufficiently high heat resistance and a method for producing the same. Note that, as described above, the thermoplastic elastomer composition of the present invention can exhibit tensile stress and heat resistance at sufficiently high levels, also can exhibit sufficient resistance to compression set and/or sufficient self-repairing properties depending on the constitution, and also can be caused to exhibit, as appropriate, properties required according to the application of the thermoplastic elastomer composition.

Accordingly, the thermoplastic elastomer composition of the present invention is excellent especially in tensile strength and heat resistance, and can exhibit various properties in a balanced manner according to the application. Hence, the thermoplastic elastomer composition of the present invention is useful as, for example, a material for producing products used in applications such as automobile-related products, hoses, belts, sheets, antivibration rubbers, rollers, lining, rubber-lined cloth, sealing materials, gloves, fenders, rubbers for medical applications (syringe gaskets, tubes, and catheters), gaskets (for home appliances and architectural applications), asphalt modifiers, hot-melt adhesives, boots, grips, toys, shoes, sandals, keypads, gears, and PET bottle cap liners, or the like.

The invention claimed is:

1. A thermoplastic elastomer composition, comprising:
   at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; and
   a clay, wherein
     the clay is an organically modified clay,
     an amount of the clay contained is 20 parts by mass or less relative to 100 parts by mass of the elastomer component, and
     when three or more randomly selected measurement points on a surface of the thermoplastic elastomer composition that are a size of 5.63 μm² are observed under a transmission electron microscope, a ratio of single-layered clay relative to all clay in a measurement point was 90% or higher in all of the measurement points.

2. The thermoplastic elastomer composition according to claim 1, wherein
   the hydrogen-bond cross-linkable moiety contained in the side chain of the elastomeric polymer (B) is a hydrogen-bond cross-linkable moiety having a carbonyl-containing group and/or a nitrogen-containing heterocycle.

3. The thermoplastic elastomer composition according to claim 1, wherein
   a cross-linkage at the covalent-bond cross-linking moiety contained in the side chain of the elastomeric polymer (B) is formed by at least one bond selected from the group consisting of amide, ester, lactone, urethane, ether, thiourethane, and thioether.

4. The thermoplastic elastomer composition according to claim 1, wherein
   the hydrogen-bond cross-linkable moiety of the side chain (a) contains a structural portion represented by the following general formula (1):

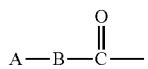
(I)

in the formula (1), A is a nitrogen-containing heterocycle, and B is a single bond; an oxygen atom, an amino group NR' (where R' is a hydrogen atom or an alkyl group having 1 to 10 carbon atoms), a sulfur atom; or an organic group optionally containing any of the atoms or groups.

5. The thermoplastic elastomer composition according to claim 1, wherein
the hydrogen-bond cross-linkable moiety of the side chain (a) contains a structural portion represented by the following general formula (101):

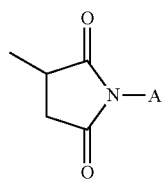
(101)

in the formula (101), A is a nitrogen-containing heterocycle.

6. The thermoplastic elastomer composition according to claim 1, wherein
the nitrogen-containing heterocycle is a 5-membered ring and/or a 6-membered ring.

7. The thermoplastic elastomer composition according to claim 1, wherein
the nitrogen-containing heterocycle is at least one selected from a triazole ring, a thiadiazole ring, a pyridine ring, an imidazole ring, a triazine ring, an isocyanurate ring, and a hydantoin ring.

8. The thermoplastic elastomer composition according to claim 1, wherein
a cross-linkage at the covalent-bond cross-linking moiety contained in the side chain of the elastomeric polymer (B) is formed by a reaction of a cyclic acid anhydride group with a hydroxy group or an amino group and/or an imino group.

9. The thermoplastic elastomer composition according to claim 1, wherein
main chains of the elastomeric polymers (A) and (B) each comprise at least one selected from diene-based rubbers, hydrogenated products of diene-based rubbers, olefin-based rubbers, optionally hydrogenated polystyrene-based elastomeric polymers, polyolefin-based elastomeric polymers, polyvinyl chloride-based elastomeric polymers, polyurethane-based elastomeric polymers, polyester-based elastomeric polymers, and polyamide-based elastomeric polymers.

10. The thermoplastic elastomer composition according to claim 1, wherein
the elastomer component is at least one selected from the group consisting of reaction products of a maleic anhydride-modified elastomeric polymer with at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, and polyether polyols.

11. A method for producing a thermoplastic elastomer composition, comprising:
a first step of mixing a clay into an elastomeric polymer having a cyclic acid anhydride group in a side chain to obtain a mixture; and
a second step of adding, to the mixture, at least one raw material compound of a compound (I) that forms a hydrogen-bond cross-linkable moiety upon a reaction with the cyclic acid anhydride group, and a mixed raw material of the compound (I) with a compound (II) that forms a covalent-bond cross-linking moiety upon a reaction with the cyclic acid anhydride group, to allow a reaction to proceed between the polymer and the raw material compound, thereby obtaining the thermoplastic elastomer composition, wherein
the thermoplastic elastomer composition comprises:
at least one elastomer component selected from the group consisting of elastomeric polymers (A) each of which has a side chain (a) containing a hydrogen-bond cross-linkable moiety having a carbonyl-containing group and/or a nitrogen-containing heterocycle and has a glass-transition point of 25° C. or below, and elastomeric polymers (B) each of which contains a hydrogen-bond cross-linkable moiety and a covalent-bond cross-linking moiety in a side chain and has a glass-transition point of 25° C. or below; and
a clay,
the clay is an organically modified clay,
in the first step, the clay is mixed into the elastomeric polymer having a cyclic acid anhydride group in a side chain at such a ratio that the amount of the clay contained in the thermoplastic elastomer composition is 20 parts by mass or less relative to 100 parts by mass of the elastomer component, and
when three or more randomly selected measurement points on a surface of the thermoplastic elastomer composition that are a size of 5.63 $\mu m^2$ are observed under a transmission electron microscope, a ratio of single-layered clay relative to all clay in a measurement point was 90% or higher in all of the measurement points.

12. The method for producing a thermoplastic elastomer composition according to claim 11, wherein
the elastomeric polymer having a cyclic acid anhydride group in a side chain is a maleic anhydride-modified elastomeric polymer.

13. The method for producing a thermoplastic elastomer composition according to claim 11, wherein
a compound that forms both a hydrogen-bond cross-linkable moiety and a covalent-bond cross-linking moiety upon a reaction with the cyclic acid anhydride group is used as the compound (I) and/or (II).

14. The method for producing a thermoplastic elastomer composition according to claim 12, wherein
the raw material compound is at least one compound selected from triazoles optionally having at least one substituent selected from hydroxy groups, thiol groups, and amino groups, pyridines optionally having at least one substituent selected from hydroxy groups, thiol groups, and amino groups, thiadiazoles optionally having at least one substituent selected from hydroxy groups, thiol groups, and amino groups, imidazoles optionally having at least one substituent selected from hydroxy groups, thiol groups, and amino groups, isocyanurates optionally having at least one substituent selected from hydroxy groups, thiol groups, and amino groups, triazines optionally having at least one substituent selected from hydroxy groups, thiol groups, and amino groups, hydantoins optionally having at least one substituent selected from hydroxy groups, thiol groups, and amino groups, tris(hydroxyethyl) isocyanurate, sulfamides, and polyether polyols,
the elastomer component is at least one selected from the group consisting of reaction products of the maleic anhydride-modified elastomeric polymer with the raw material compound.

15. The thermoplastic elastomer composition according to claim 1, wherein
the organically modified clay is a quaternary ammonium salt of the organically modified clay, and
the quaternary ammonium salt of the organically modified clay is at least one selected from the group consisting of trimethylstearylammonium salts, dimethylstearylbenzylammonium salts, dimethyloctadecylammonium salts, and mixtures of two or more thereof.

* * * * *